United States Patent [19]
Kondo et al.

[11] Patent Number: 5,526,272
[45] Date of Patent: Jun. 11, 1996

[54] DATA PREPARATION DEVICE AND METHOD FOR PREPARING DATA FOR MACHINING WORK

[75] Inventors: Satoshi Kondo, Kanagawa-ken; Hitoshi Yoshihara, Ibaraki-ken; Masahiro Ishizaki; Mitsuhiro Kitagawa, both of Kanagawa-ken, all of Japan

[73] Assignee: Canon Kabushiki Kaisha, Tokyo, Japan

[21] Appl. No.: 181,581

[22] Filed: Jan. 13, 1994

[30] Foreign Application Priority Data

Jan. 18, 1993 [JP] Japan .................................. 5-023328
Jan. 18, 1993 [JP] Japan .................................. 5-023334
Jan. 19, 1993 [JP] Japan .................................. 5-023556

[51] Int. Cl.$^6$ ............................................. G05B 19/4061
[52] U.S. Cl. ............................. 364/474.2; 364/474.18; 364/474.22; 364/474.29; 318/568.1
[58] Field of Search ........................... 364/474.2, 474.21, 364/474.26, 474.22, 474.29, 474.16, 474.17, 474.18, 191–193, 961; 318/568.1, 572; 395/90

[56] References Cited

U.S. PATENT DOCUMENTS

| | | | |
|---|---|---|---|
| 4,489,377 | 12/1984 | Mawyer et al. | 364/474.2 |
| 4,513,366 | 4/1985 | Munekata et al. | 364/474.2 |
| 4,745,558 | 5/1988 | Kishi et al. | 364/474.18 X |
| 4,758,961 | 7/1988 | Uemura et al. | 364/474.2 X |
| 4,837,703 | 6/1989 | Kakazu et al. | 364/474.2 X |
| 4,951,217 | 8/1990 | Clack | 364/474.2 |

*Primary Examiner*—Joseph Ruggiero
*Attorney, Agent, or Firm*—Robin, Blecker, Daley & Driscoll

[57] ABSTRACT

A data preparation device for preparation of data to be used in machining a work is arranged not only to prepare a relief shape by expanding a machining target shape inputted but also to prepare, as an interference critical shape, a shape which is higher than a machining height inputted and to prepare a machining area on the basis of the relief shape and the interference critical shape.

13 Claims, 50 Drawing Sheets

FIG.4(a)
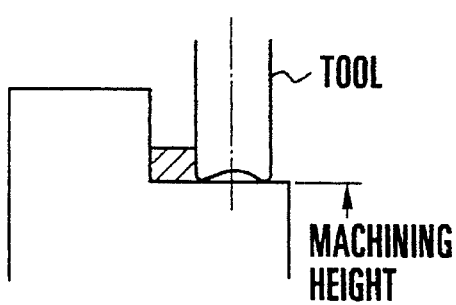
TOOL
MACHINING HEIGHT
FIG.4(b)
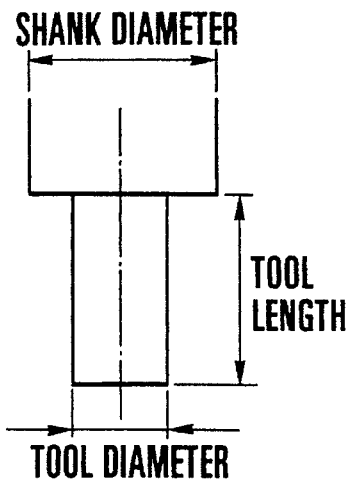
SHANK DIAMETER
TOOL LENGTH
TOOL DIAMETER
FIG.4(c)
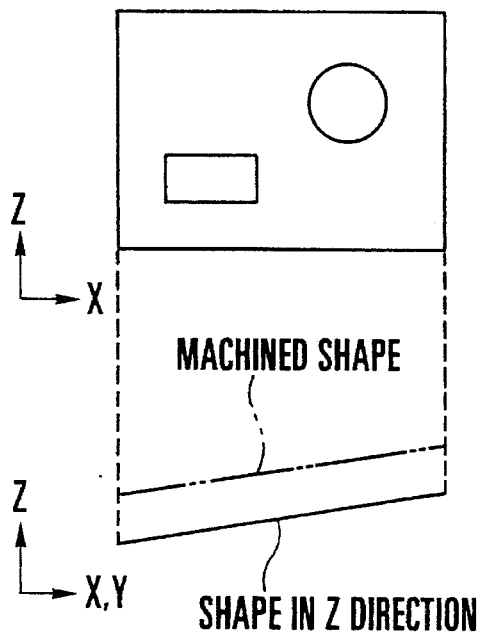
MACHINED SHAPE
SHAPE IN Z DIRECTION
FIG.4(d)
(EXAMPLE 1) MACHINING OBJECT SHAPE = WHOLE CLOSED AREA
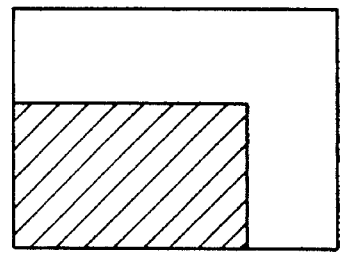
(EXAMPLE 2) MACHINING OBJECT SHAPE = PART OF CLOSED AREA
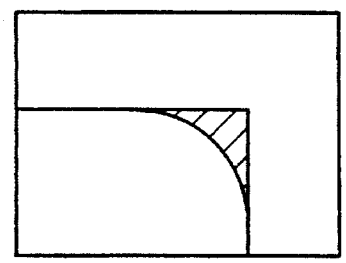
▰▰▰ MACHINING OBJECT SHAPE

MACHINING OBJECT SHAPE

MACHINING OBJECT SHAPE

—— MACHINING OBJECT SHAPE

----- OFFSET SHAPE

EXAMPLE OF CUTTING A PART OF AREA

EXAMPLE OF CUTTING WHOLE AREA

▨ SHAPE TO BE CUT

FIG.8
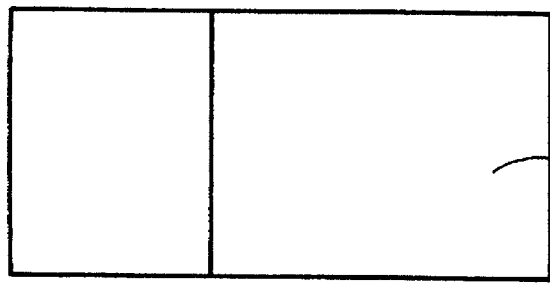
MACHINING OBJECT SHAPE
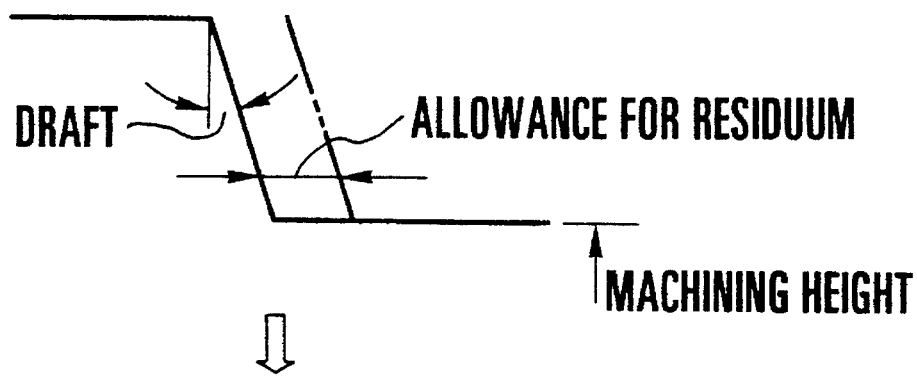
DRAFT
ALLOWANCE FOR RESIDUUM
MACHINING HEIGHT
⇩
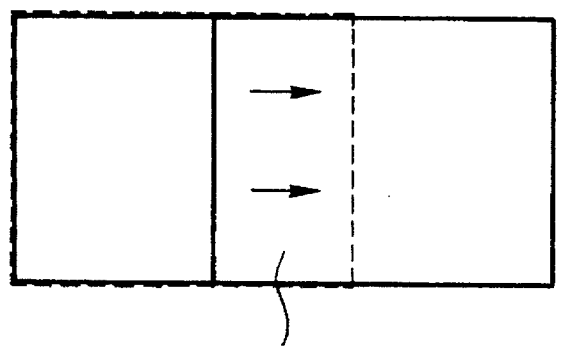
OFFSET SHAPE
OFFSETTING OF "DRAFT + ALLOWANCE FOR RESIDUUM"

FIG.11
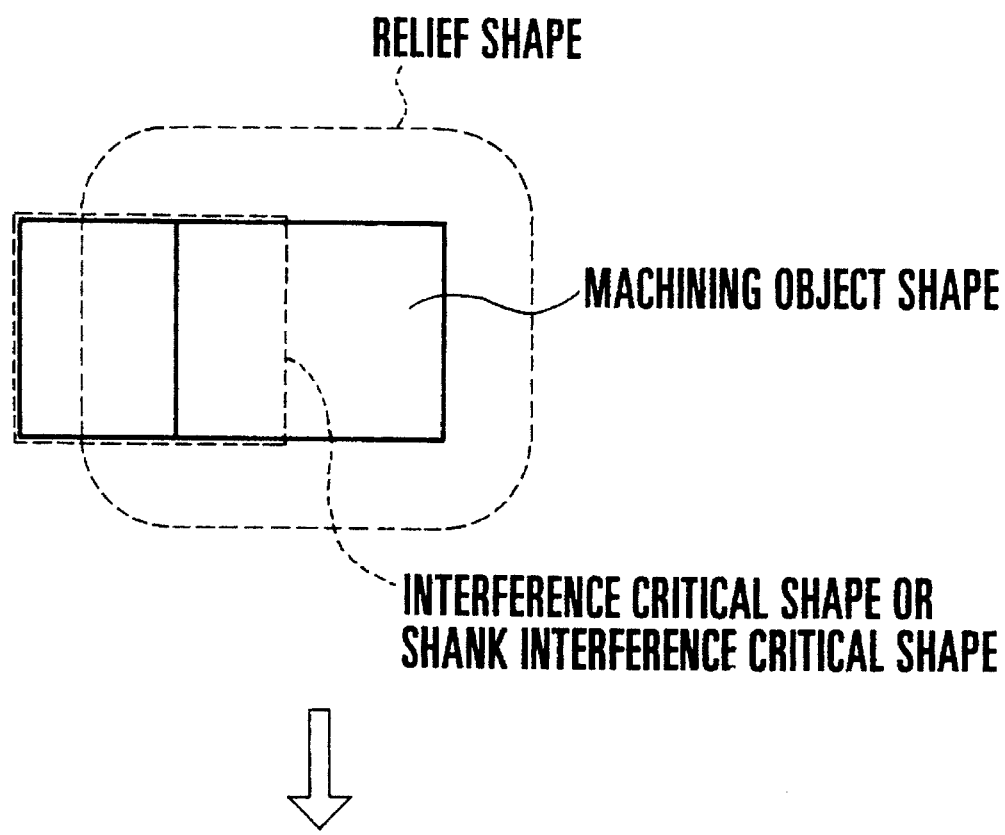
RELIEF SHAPE
MACHINING OBJECT SHAPE
INTERFERENCE CRITICAL SHAPE OR
SHANK INTERFERENCE CRITICAL SHAPE
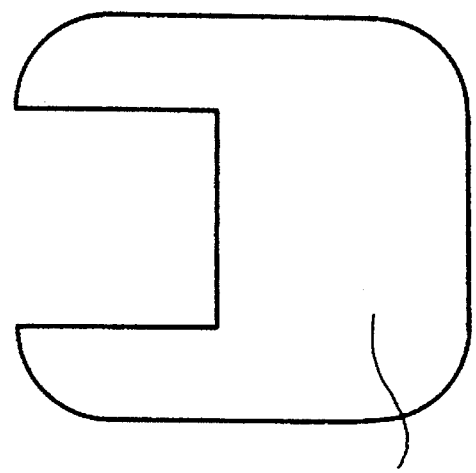
RELIEF SHAPE − INTERFERENCE CRITICAL SHAPE OR
SHANK INTERFERENCE CRITICAL SHAPE

FIG.12(d)
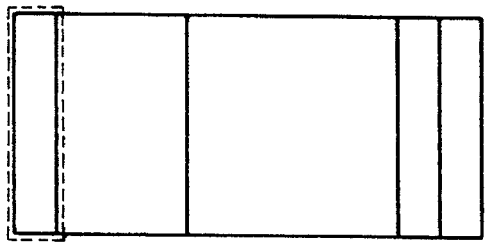
INTERFERENCE CRITICAL SHAPE 1
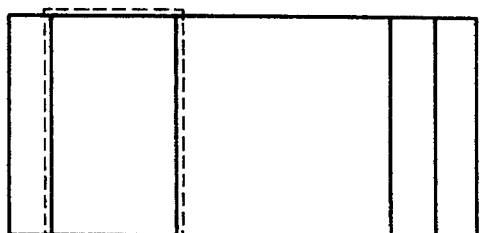
INTERFERENCE CRITICAL SHAPE 2
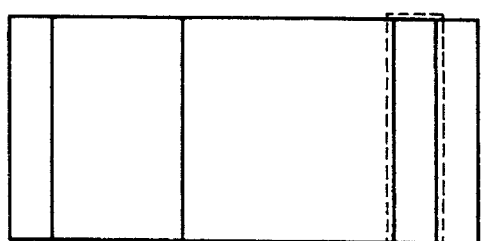
INTERFERENCE CRITICAL SHAPE 3
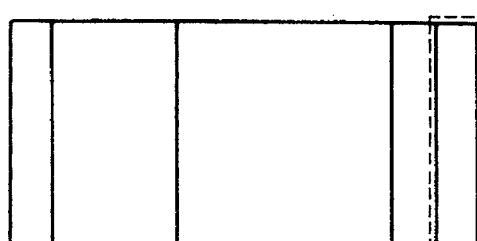
INTERFERENCE CRITICAL SHAPE 4
---- INTERFERENCE CRITICAL SHAPE
FIG.12(e)
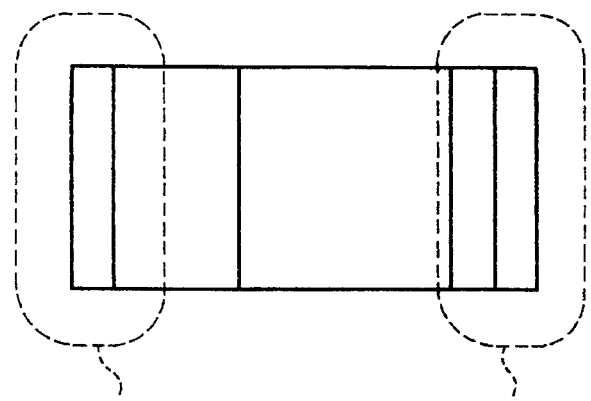
SHANK INTERFERENCE CRITICAL SHAPE 1    SHANK INTERFERENCE CRITICAL SHAPE 2
FIG.12(f)
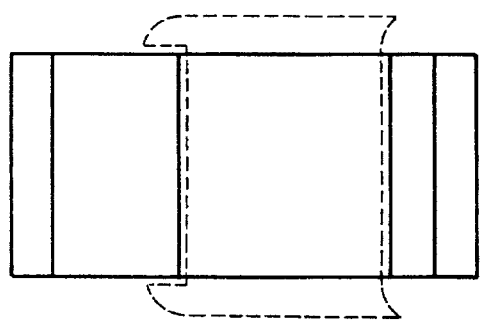
---- MACHINING AREA

—— MACHINING AREA
----- TOOL CENTER LOCUS
—·— CONTOUR PATH

—— MACHINING AREA
----- TOOL CENTER LOCUS

TOOL RADIUS — PREDETERMINED AMOUNT

—— MACHINING AREA
----- TOOL CENTER LOCUS

FIG.19
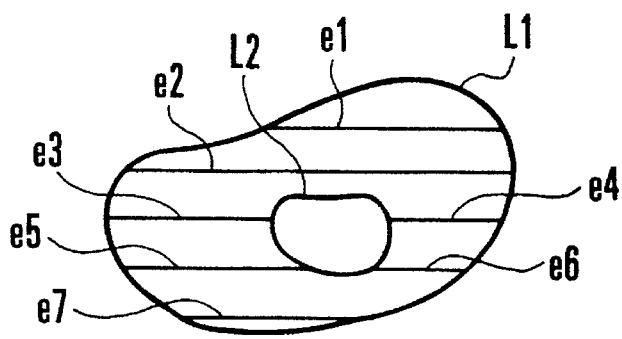
FILL-OUT CUTTING AREA : AREA ENCOMPASSED WITH CLOSED LOOPS L1 AND L2
HATCHING DATA ( FILL-OUT CUTTING PATH ) : LINE SEGMENTS e1 TO e7
FIG.20(a)
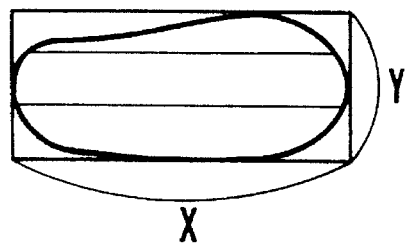
X > Y ⋯ HATCHING IN X DIRECTION
FIG.20(b)
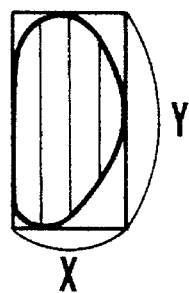
Y > X ⋯ HATCHING IN Y DIRECTION
FIG.21
CL DATA
| X | Y | Z | RELATED INFORMATION |
|---|---|---|---|
|   |   |   |   |

→ PROCESSED
----- UNPROCESSED

FIG.24
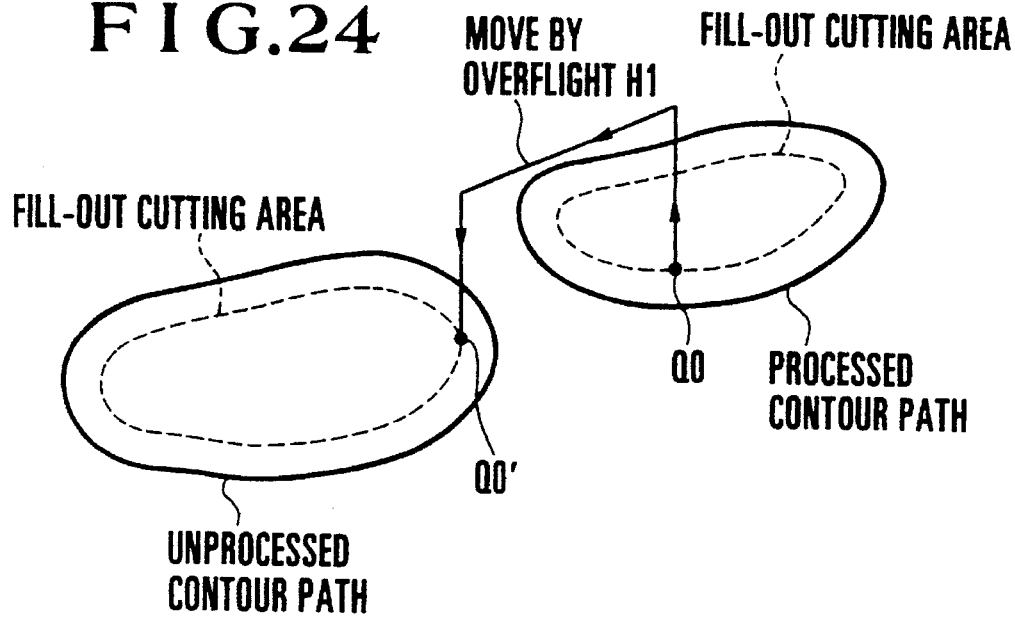
FIG.25A
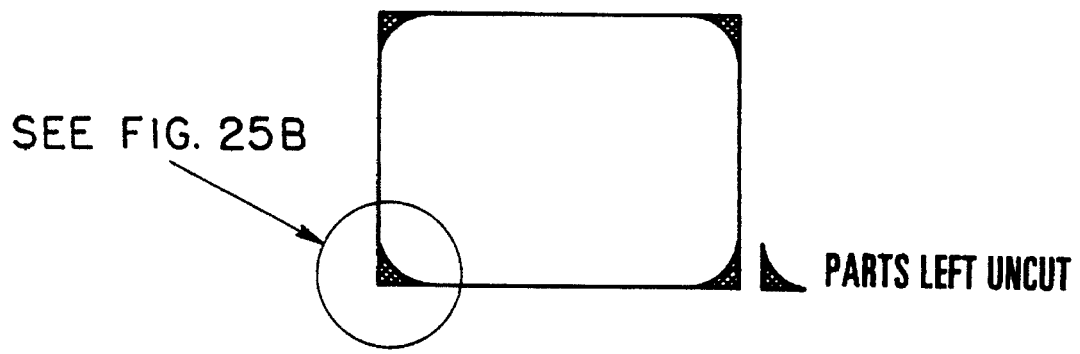
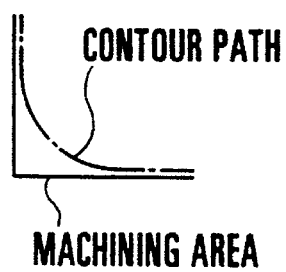
FIG. 25B

FIG.26

COMPOSITE CL DATA

| X | Y | Z | RELATED INFORMATION |
|---|---|---|---|
|   |   |   |   |
|   |   |   |   |
|   |   |   |   |
|   |   |   |   |
|   |   |   |   |
| ⋮ | ⋮ | ⋮ | ⋮ |
|   |   |   |   |

- FIRST CL DATA
- DATA FOR $P_{1e} \rightarrow P_{2s}$
- SECOND CL DATA
- DATA FOR $P_{2e} \rightarrow P_{3s}$
- n-TH CL DATA

CUT PART

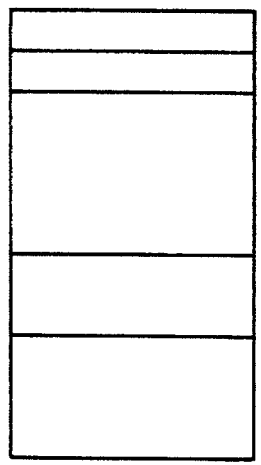
F I G. 44(a)
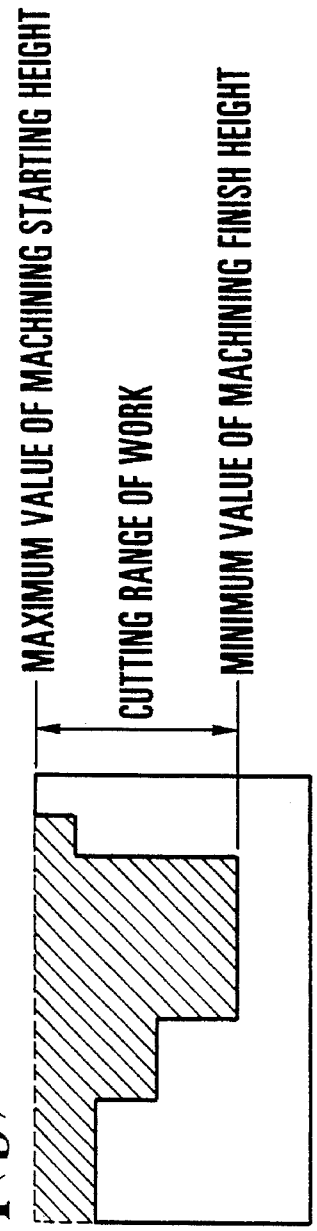
F I G. 44(b)
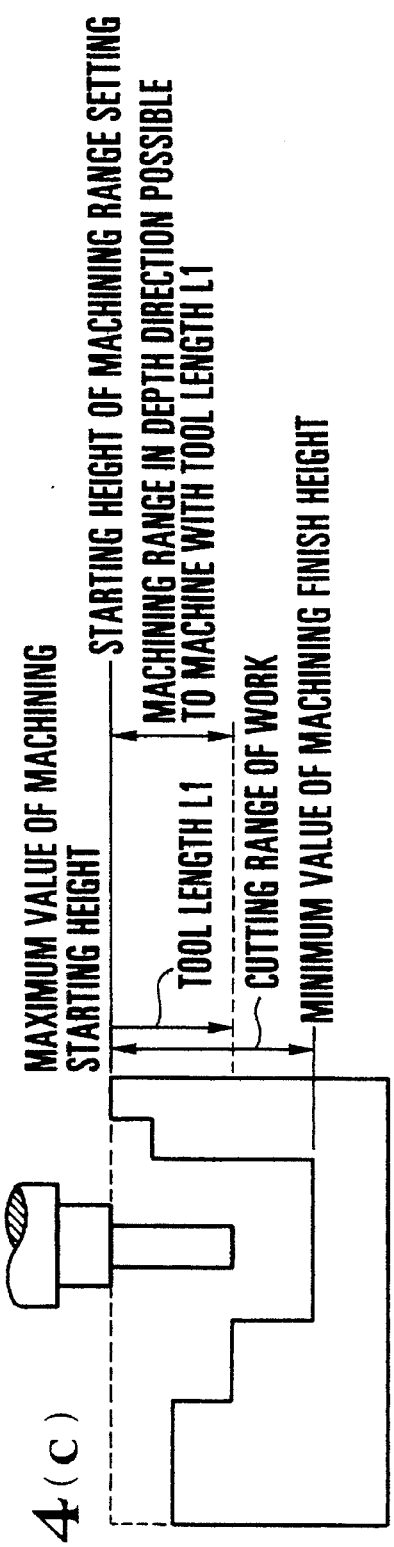
F I G. 44(c)

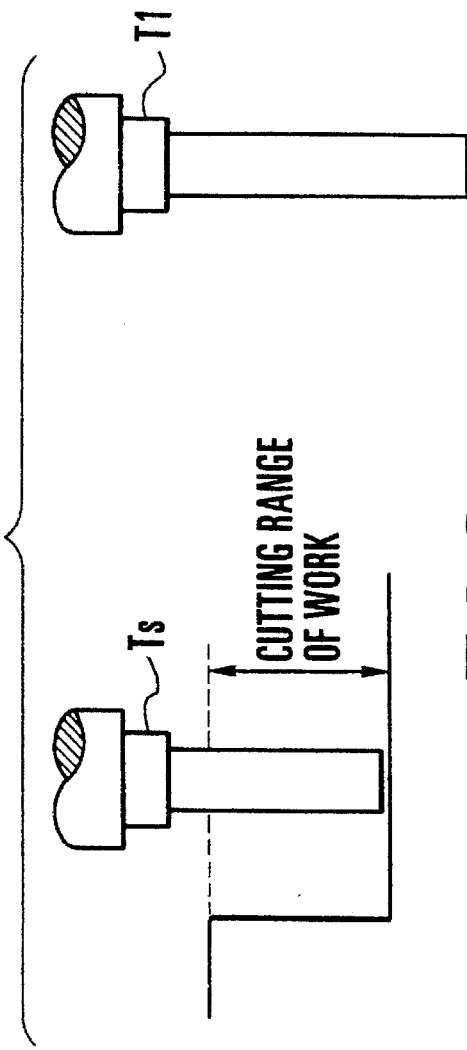
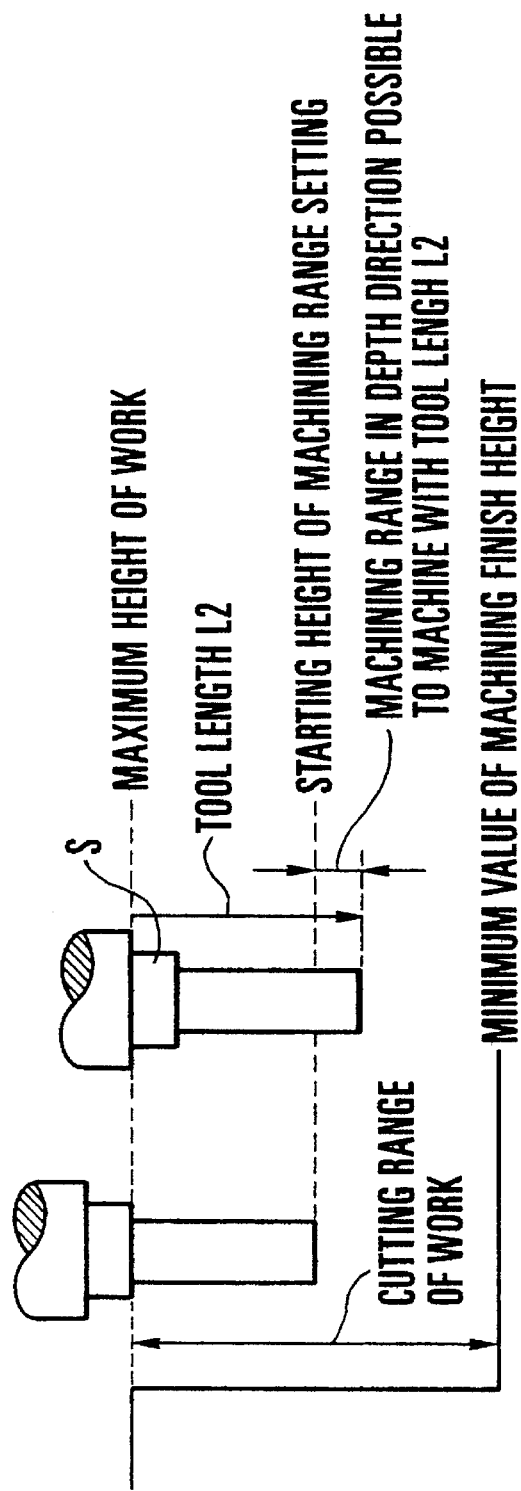
FIG.44(d)
FIG.44(e)

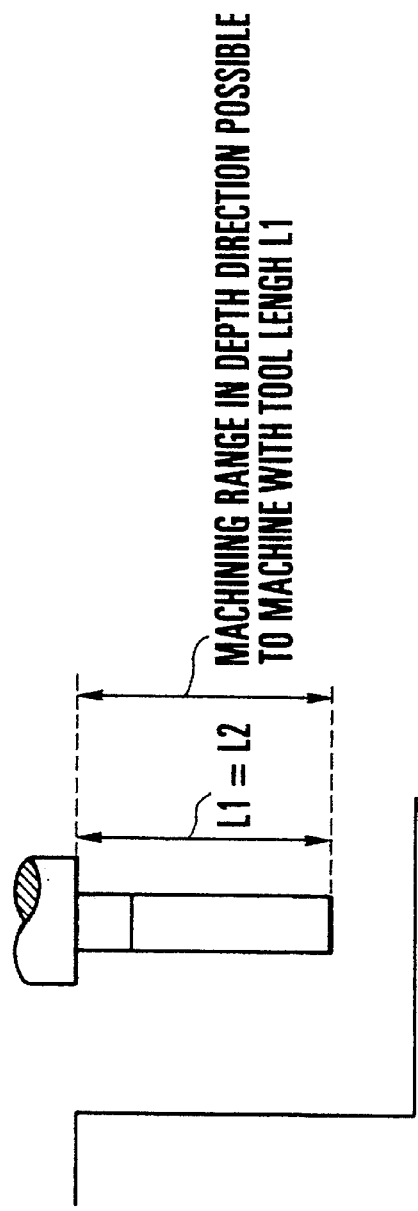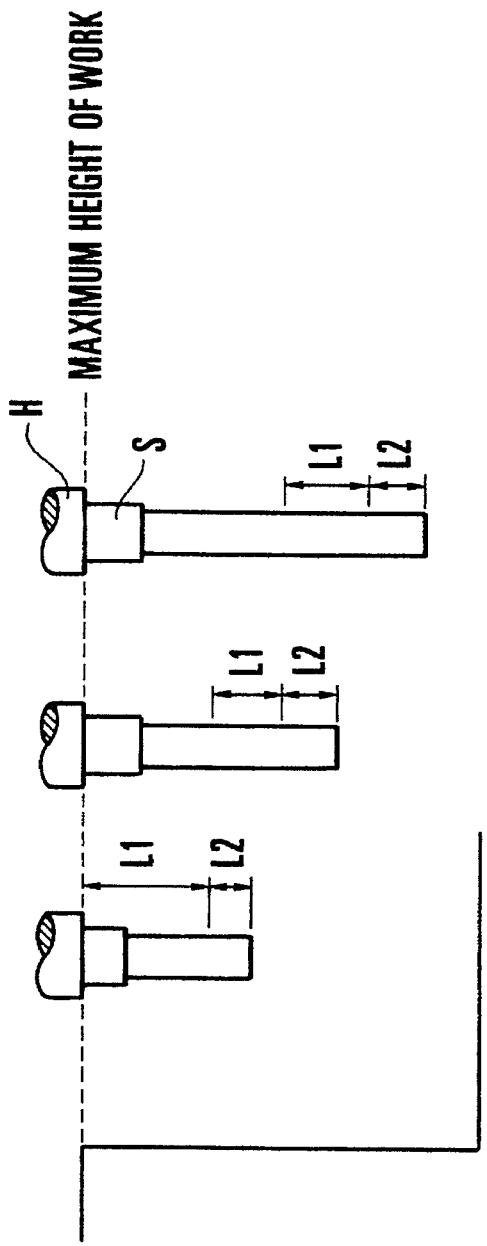

$W(i, 1) = \{r_2, r_3, r_4\}$
$W(i, 2) = \{r_7\}$

DATA PREPARATION DEVICE AND METHOD FOR PREPARING DATA FOR MACHINING WORK

BACKGROUND OF THE INVENTION

1. Field of the Invention

This invention relates to an NC data preparation device advantageously adapted for automatic preparation of NC (numerical control) data, particularly such data that represents a machining area or cutter location (CL), i.e., a tool path, for a numerically controlled machine tool.

2. Description of the Related Art

As a result of the recent, rapid advancement of NC (numerically controlled) machine tools, almost all the machine tools are arranged to be numerically controlled in these days. In addition to that, production processes are arranged to be carried out by a system computerized from a designing process to a manufacturing process. The whole machining is numerically controlled. The level of production technology thus has been enhanced to give a higher degree of precision and a higher speed.

However, it has been hardly possible, with the conventional NC machine tools, to avoid the interference of the parts of a tool other than its cutting edge, such as a shank part, to automatically obtain a machining area where no flash is likely to be generated and to automatically prepare CL data for cutter location within the machining area or data for parts left uncut.

Therefore, in order to avoid the interference of the tool including its parts other than the cutting edge, such as its shank part, etc., to prepare a machining area where no flash is likely to be generated and to prepare the CL data for the machining area, the operator of the machine tool is required to give instructions, in an interactive manner, with respect to an interfering area or a tool path which does not generate any flash. However, preparation of high quality CL data has necessitated a considerable number of processes and a high grade of skill. A great amount of labor has been also necessary in accurately finding where and how any part is left uncut.

SUMMARY OF THE INVENTION

This invention is directed to the solution of the problem mentioned in the foregoing. It is, therefore, an object of this invention to provide an NC (numerical control) data preparation device which is capable of automatically preparing data for a machining area where no flash is likely to be generated by avoiding interference of a tool in an NC (numerically controlled) machine tool.

An NC data preparation device according to this invention includes input means, relief shape preparation means and interference critical shape preparation means which are arranged as follows: The input means is arranged to read out a machining target shape and machining information including at least a machining height from a storage and input the machining target shape and the machining the information. The relief shape preparation means is arranged to prevent generation of any flash at the edge of the machining target shape by preparing a relief shape which is obtained by expanding the machining target shape inputted. The interference critical shape preparation means is arranged to prepare an interference critical shape which is in a shape higher than the machining height inputted by the input means.

The embodiment further includes machining area preparation means, which prepares a machining area, for example, by subtracting the interference critical shape from the relief shape prepared. The machining area is prepared by taking into consideration the flash and the interference of the tool, so that the generation of flash and the interference of the tool are effectively avoidable as long as the tool is moved within the machining area.

The advantageous effect of this invention can be further enhanced with the embodiment arranged to prepare data of an apposite tool path for contour machining.

To attain the object, the embodiment mentioned above is provided with storage means for storing a contour graphic form to be used for machining the contour of a machining area, offset means for causing each of line segments composing the contour graphic form stored in the storage means to be offset inwardly on the inner side of the contour graphic form as much as the radius of a tool for the purpose of preparing a contour machining tool center path, and connection means arranged such that, in a case where any adjacent offset line segments are parted from each other among offset line segments offset by the offset means, the connection means interconnects the parted adjacent offset line segments in such a way as to cause the tool to move away temporarily from an angular part of the contour graphic form and to again come into contact with the contour graphic form.

Further, a second embodiment of this invention which is arranged as an improvement over the first embodiment described above is capable of machining a work which is of a shape having a plurality of different machining depths. In addition to the arrangement of the first embodiment, the second embodiment further includes, in a tool path data preparation device for preparing tool path data on the basis of set machining areas, standard cutting area setting means for setting a cutting area to be cut at a standard cutting amount of tool, and a nonstandard cutting area setting means for setting a cutting area to be cut at a cutting amount which is smaller than the standard cutting amount of tool.

The above and other objects and features of this invention will become apparent from the following detailed description of embodiments thereof taken in connection with the accompanying drawings.

BRIEF DESCRIPTION OF THE DRAWINGS

FIGS. 4(a) to 4(d) show machining information.

FIG. 8 shows a method for preparing an interference critical shape.

FIG. 11 shows a process of obtaining a machining area by subtracting an interference critical shape or a shank interference critical shape from a relief shape.

FIGS. 12(a) to 12(f) show a practical example of a sequence of processes of steps S1 to S5 of FIG. 2.

FIG. 19 shows an aggregation of hatching line segments which compose a fill-out cutting path.

FIGS. 20(a) and 20(b) show a method for deciding the direction of hatching.

FIG. 21 shows the contents of a CL data table.

FIG. 24 shows a manner in which a tool moves from one contour path to the next contour path.

FIG. 25 shows data of parts left uncut.

FIG. 26 shows the contents of a composite CL data.

FIG. 27(a) shows a tool center path while FIGS. 27(b) and 27(c) respectively show problems to be solved.

FIGS. 44(a) to 44(g) show, in detail, machining range setting in the direction of depth of the tool.

DETAILED DESCRIPTION OF THE PREFERRED EMBODIMENTS

Embodiments of this invention are described in detail below with reference to the drawings.

Figure 1:
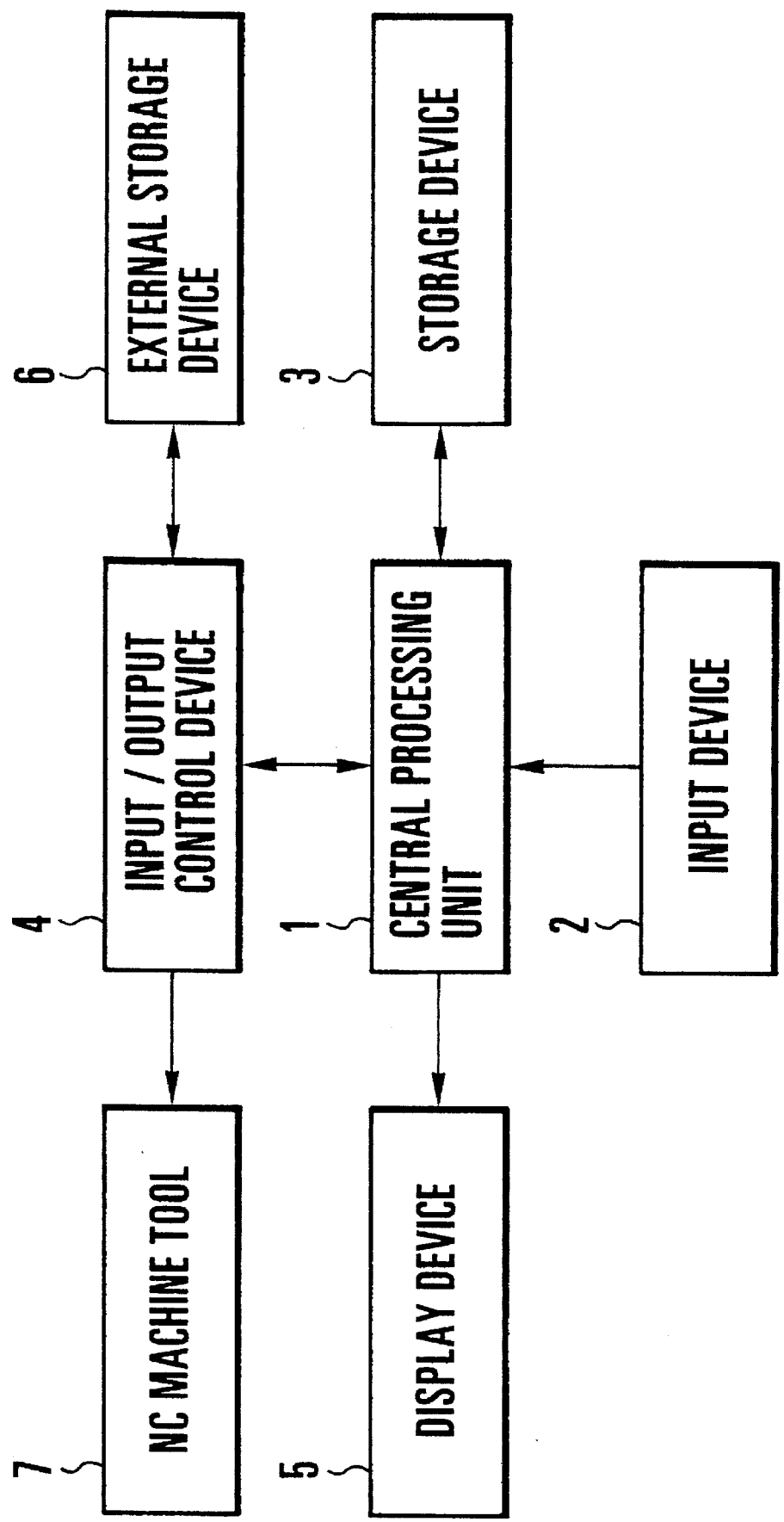
FIG. 1 is a block diagram showing in outline the arrangement of an NC data preparation device which is arranged as an embodiment of this invention.

FIG. 1 is a block diagram showing in outline the arrangement of an NC data preparation device as one embodiment of this invention. This NC data preparation device is arranged to perform an NC data preparing process by using a central processing unit 1 as its nucleus, An input device 2 which consists of a keyboard, a mouse, etc., a storage device 3 which consists of a semiconductor memory, a magnetic disk, etc., an input/output control device 4 and a display device 5 which consists of a graphic display, etc., are connected to the central processing unit 1. The input/output control device 4 is connected to an external storage device 6 which consists of a magnetic tape, a floppy disk or a hard disk, etc., and to an NC machine tool 7. The input/output control device 4 is thus arranged to output NC data prepared by this NC data preparation device to the NC machine tool 7, under the control of the central processing unit 1, and also to load the storage device 3 with application programs of varied kinds which are obtained from the external storage device 6 and are to be used for preparation of tool path (CL) data, machining areas, etc.

The storage device 3 is arranged to store data for CAD graphic elements (including sufficient geometric information for deciding such graphic elements as the coordinate values of the start and end points of a two-dimensional line segment, those of the start and end points and the turning direction of a two-dimensional circular arc and the center coordinates and radius of a two-dimensional circle and information on the aggregation and allocation of the graphic elements), closed area data obtained by connecting CAD graphic elements, 2.5-dimensional data obtained by adding information on the direction of depth such as height to the closed area, tool data such as data of the shape and/or conditions for use of a machining tool, data of a machining method, CL data indicating a tool moving path and so on.

The display device 5 is arranged to display a menu under the control of the central processing unit 1. A selecting or designating action is performed on this menu by means of the input device 2 consisting of a keyboard or a mouse in carrying on a CL data connecting process in an interactive manner. In this instance, the central processing unit 1 reads out, from the external storage device 6, an application program selected and designated on the menu and stores it in the storage device 3. The NC data preparation processes of varied kinds are thus executed in accordance with the application program.

For this purpose, the central processing unit 1 causes the storage device 3 to store the graphic form data, the machining data, the tool data, etc., inputted from the input device 2 in the above-stated manner or causes the external storage device 6 to store them. In a case where these data are stored in the external storage device 6, the graphic form data, the machining data, the tool data, etc., which are selected and designated on the menu are read and written into the storage device 3 from the external storage device 6 via the input/output control device 4. These data thus stored in the storage device 3 are displayed as necessary on the display device 5 and NC data preparing processes are executed by using these data.

Figure 2:
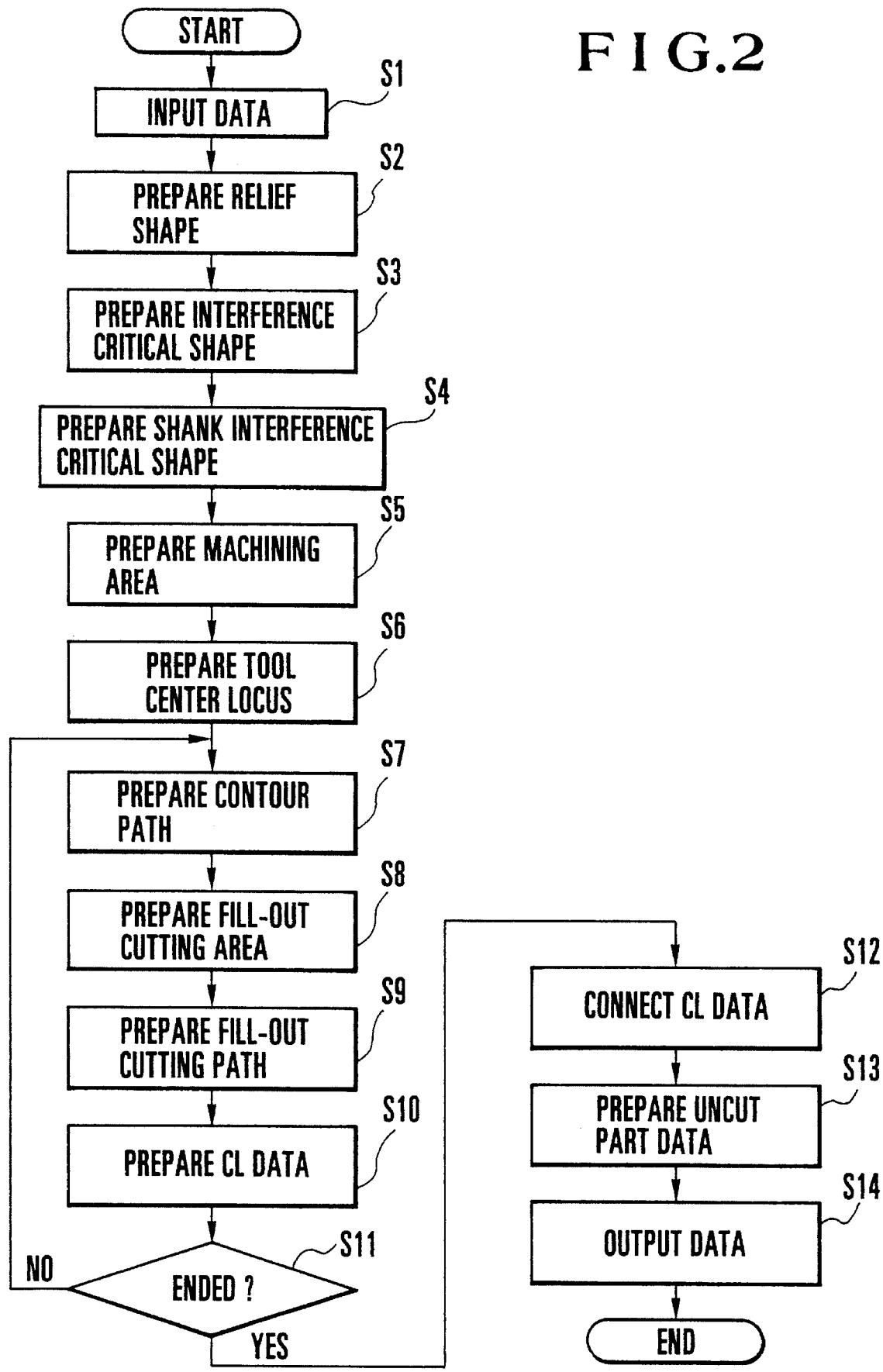
FIG. 2 is a flow chart showing an NC data preparing action of the NC data preparation device.

Next, an NC data preparing action is described in detail below according to a flow chart shown in FIG. 2 with reference to FIGS. 3(a) to 27(c):

At a step S1 of the flow chart of FIG. 2, the central processing unit 1 first designates a whole machining target shape and information on machining for a work either by designating a machining target shape and the machining information stored in a predetermined area in the storage device 3 or by reading out, from an area of the external storage device 6 designated by the input device 2 through the input/output control device 4, shape information (a machining target shape) and machining information and by writing them into the storage device 3.

Figure 3B:
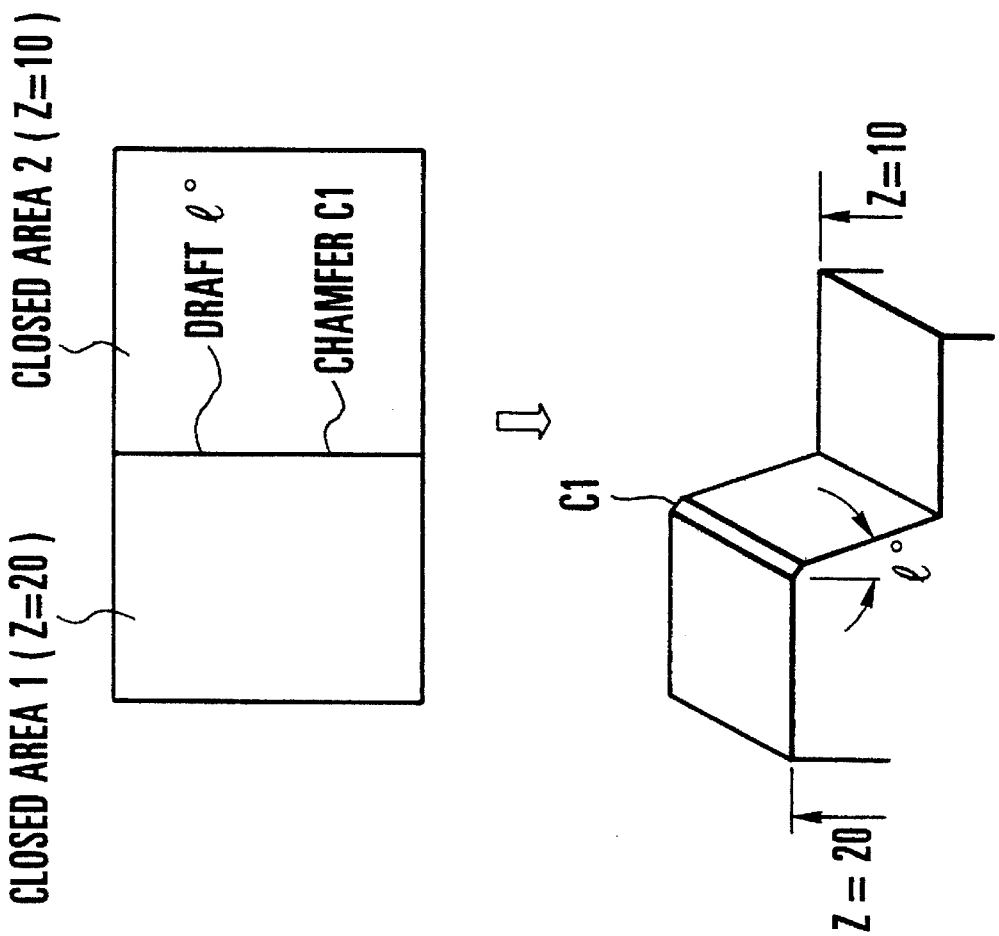
FIGS. 3(a) and 3(b) show a machining target shape.
Figure 3A:
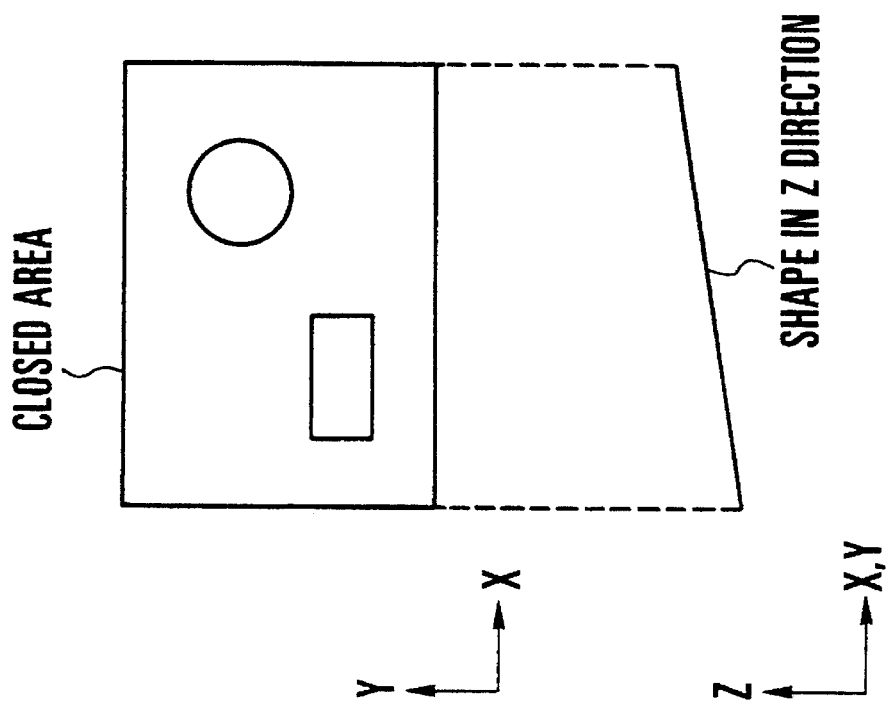

The machining target shape includes a closed area which is encompassed with one outside loop on an XY plane and zero to a plurality of inside loops as shown in FIG. 3(a). To the closed area is attached a shape which extends in the direction of Z. Each of these loops is expressed by graphic elements such as the continuation of line segments, circular arcs, etc. The machining target shape generally includes a plurality of closed areas. Referring to FIG. 3(b), the machining target shape further includes a chamfering shape relative to the graphic elements such as line segments and circular arcs which compose the loops and also information on a draft which is to be used for a die.

The machining information includes information on a machining height to be used in cutting with a tool at a predetermined value Z as shown in FIG. 4(a), information on the tool such as a tool diameter, a tool length and the diameter of a shank as shown in FIG. 4(b), information on a machined shape which indicates to what shape each closed area has been machined up to now, as shown in FIG. 4(c), and information on a machining object shape which indicates one or a plurality of whole closed areas or a part to be machined from now, such as a part left uncut by a previous machining process, as shown by hatching in FIG. 4(d). In addition to these, the machining information further includes information on an allowance for a residuum (or a leftover), etc. While the above-stated machining object shape is only a part of a whole machining target shape, the term "machining object shape" will mean hereinafter to include the whole machining target shape.

Figure 5A:
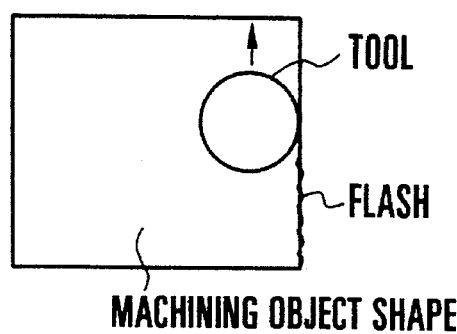
FIGS. 5(a) and 5(b) show the significance of preparation of a relief shape.
Figure 5B:
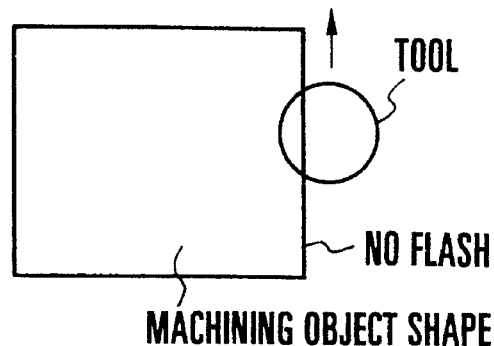

At a step S2, a process is executed to expand the machining object shape which is designated by the step S1. This process is provided for preventing generation of flash by machining the machining object shape to a wider extent than the actual shape as shown in FIG. 5(b), because the flash might be generated along the edge of the machining object shape if the object shape is machined in conformity with its shape as shown in FIG. 5(a). The machining object shape consists of one outside loop and zero to a plurality of inside loops. The machining object shape can be expanded by obtaining an offset graphic form of the machining object shape.

Figure 6:
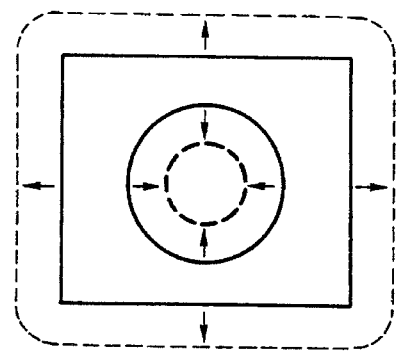
FIG. 6 shows an offset shape which is necessary for obtaining the relief shape.
Figure 7A:
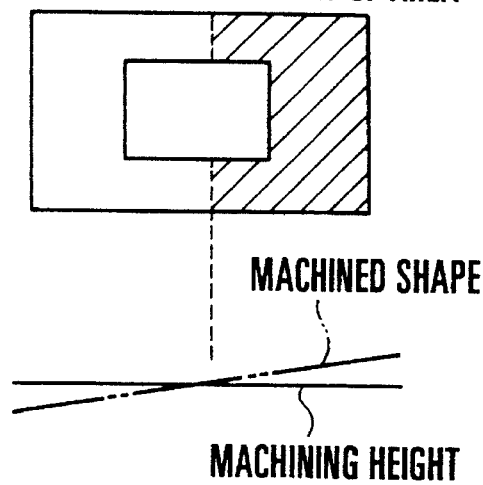
FIGS. 7(a) and 7(b) show a process of cutting out an interfering part.
Figure 7B:
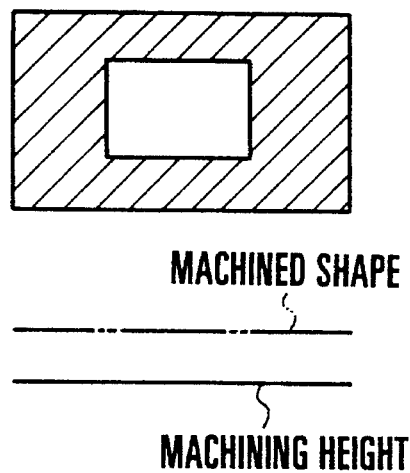

More specifically, as shown by a broken line in FIG. 6, the machining object shape can be expanded by offsetting the outside loop of the machining object shape outward and its inside loop inward. A shape thus obtained will hereinafter be called a "relief shape". The amount of offset can be decided, for example, by predetermining it in the machining information designated at the step S1 or by applying a suitable coefficient to a tool diameter which is included in the machining information designated at the step S1. The relief shape thus obtained is stored in the storage device 3.

At a step S3, to prevent any interference by the cutting edge part of the tool, a critical shape which defines an area into which the tool (cutting edge part) must not be allowed to intrude (hereinafter referred to as an interference critical shape) is prepared. This is because the relief shape prepared by the step S2 is obtained by unconditionally expanding the machining object shape and thus generally includes some part that prohibits the intrusion of the tool therein.

The interference critical shape is prepared in the following manner: One closed area is taken out from the machining target shape designated by the step S1 and a machined shape of the closed area is obtained from the machining information which is also designated by the step S1. In this instance, if the closed area is either in the machining object shape or includes the machining object shape, the tool is allowed to intrude into the closed area. In that case, therefore, the closed area taken out is considered to be not an object of process and a next closed area is taken out.

Next, the machined shape of the closed area taken out is compared with a machining height included in the machining information. If a part of or the whole of the machined shape in the direction of Z is higher than the machining height, a part of the closed area corresponding to the above-stated part or the whole closed area is cut out, as shown by hatching in FIGS. 7(a) and 7(b). Further, according to a residuum allowance, draft information, etc., included in the machining information, the cut-out shape is offset to a necessary extent, as indicated by a broken line in FIG. 8. The offset shape is stored in the storage device 3 as an interference critical shape. This process is executed for every closed area. The interference critical shapes thus obtained are stored one after another in the storage device 3. By virtue of the offsetting, the allowance for a residuum (or leftover) and the draft part can be protected from tool intrusion.

At a step S4, a shape defining an area into which the tool including its shank part must not be allowed to intrude (hereinafter referred to as a shank interference critical shape) is prepared for the purpose of preventing any interference by a shank part, etc., of the tool other than its cutting edge part. In a case where the shank diameter shown in FIG. 4(b) happens to be less than a tool diameter, no interference takes place. In that case, therefore, the step S4 is skipped and the flow of the NC data preparing action proceeds to a next step.

Figure 9A:
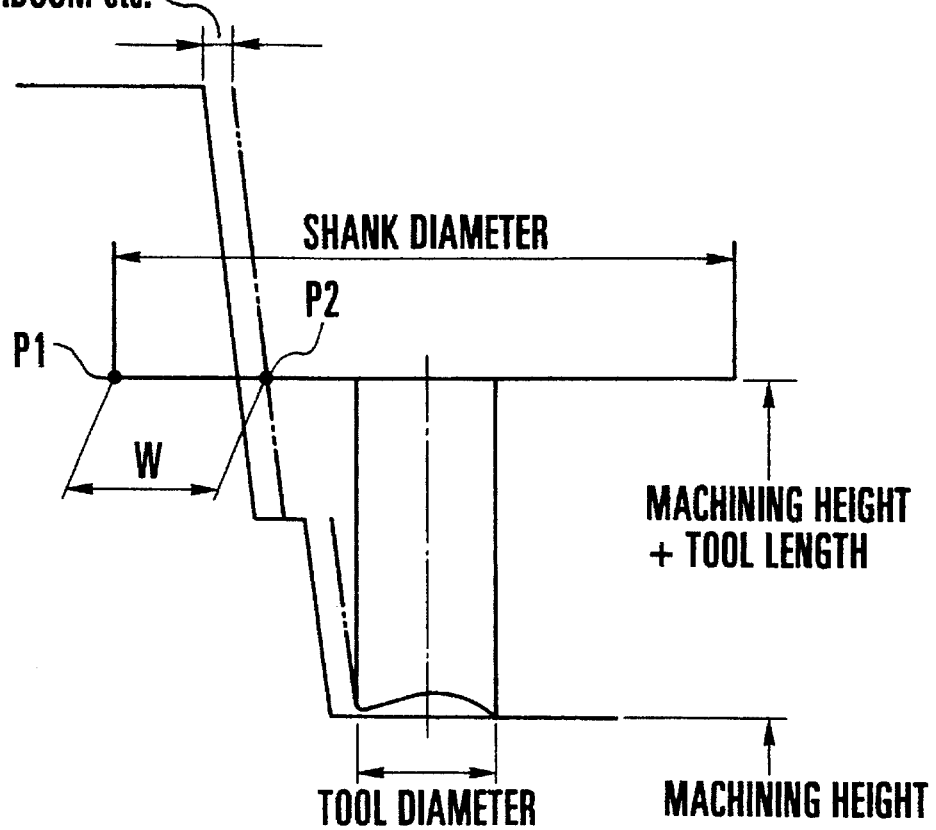
FIGS. 9(a) and 9(b) show a tool position where the shank of the tool does not interfere.
Figure 9B:
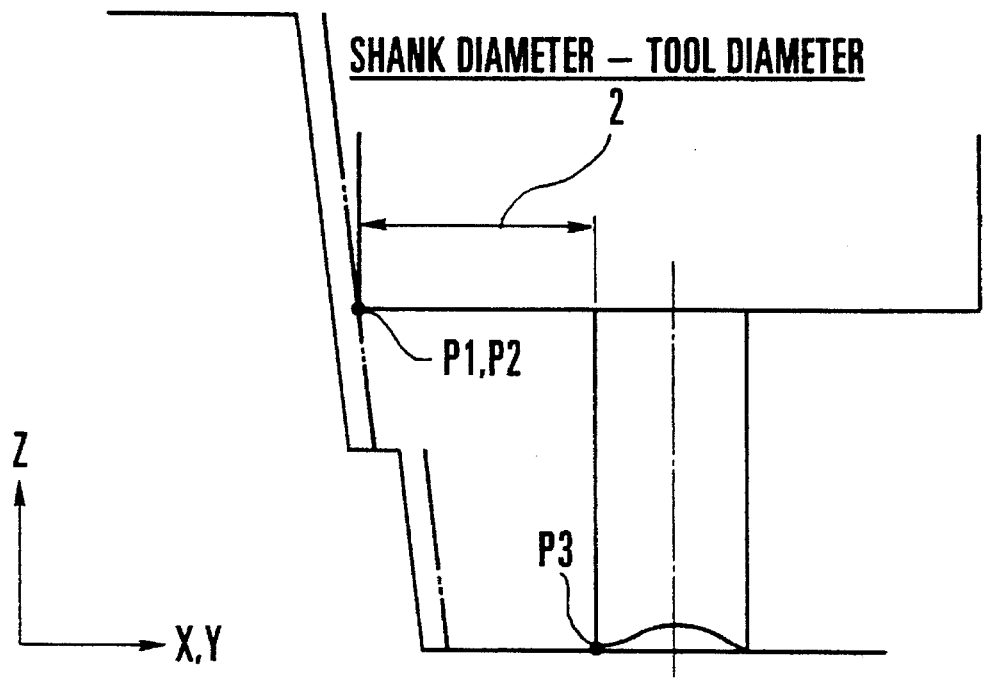

The shank interference critical shape is prepared in the following manner: FIG. 9(a) shows a case where the interference by the shank part is not taken into consideration. In this case, a width W between the points P1 and P2 of the shank of the tool comes to bite in. To prevent the biting, the tool must be shifted to the right in such a way as to bring the point P1 of the tool to the other point P2 which is located in the position of the allowance for a residuum. With the tool position shifted in this manner, a point P3 of the edge of the tool comes to a position located further away from the point P2 as much as "(shank diameter—tool diameter) / 2" on an X axis or away from the point P2 on the right side of it on a Y axis as shown in FIG. 9(b). In other words, this position represents a tool intrusion inhibiting boundary.

The process of the step S4 is executed in about the same manner as the step S3. One of closed areas within the machining target shape designated by the step S1 is taken out. A machined shape of the closed area is obtained from the machining information designated also by the step S1. In this instance, if the closed area is in the machining object shape or includes the machining object shape, the tool can be allowed to intrude into this closed area. In that case, therefore, the closed area taken out is considered to be not an object of the process and a next closed area is taken out.

Next, the machined shape of the closed area thus taken out is compared with a value of "machining height—tool length" included in the machining information. If either a part of or the whole of the machined shape in the direction of Z is in a position higher than the "machining height—tool length", a part of the closed area corresponding to this part or the whole closed area is cut out. Further, the cut-out shape thus obtained is offset to a necessary extent according to the residuum allowance included in the machining information and information on the draft included in the machining target shape, etc. A graphic form of this offset is represented by a locus of the point P2 on an XY plane of FIG. 9(a). Further, a shank interference critical shape is obtained as a locus of the point P3 on an XY plane of FIG. 9(b) by offsetting this offset graphic form as much as a value of "(shank diameter—tool diameter) / 2". The shank interference critical shape obtained is stored in the storage device 3.

Figure 10:
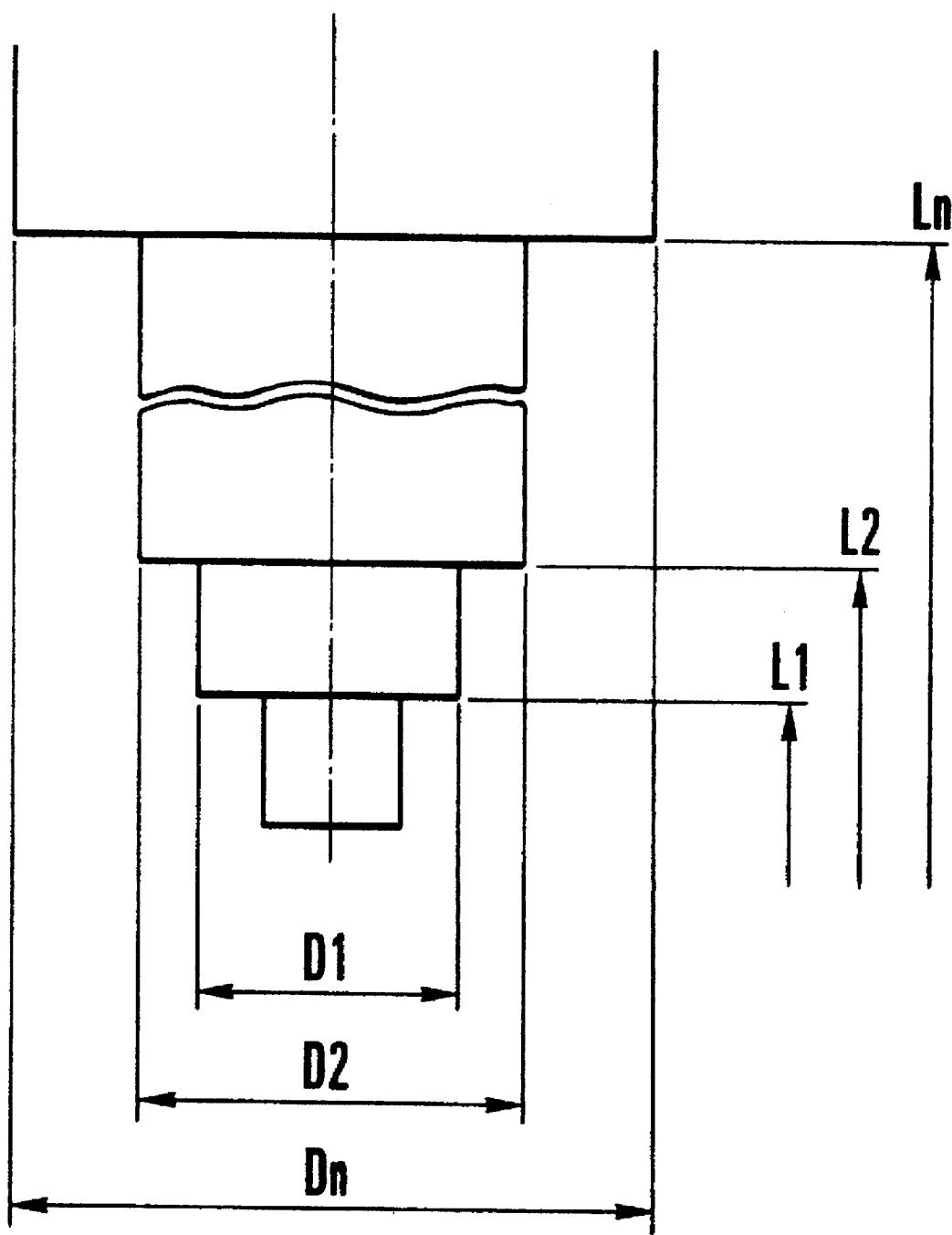
FIG. 10 shows a method for preparing a shank interference critical shape for an ordinary tool.

This process is executed for all closed areas. The shank interference critical shapes thus obtained are added one by one to the interference critical shape stored in the storage device 3 by the step S3. In the event of a tool which is as shown in FIG. 10, the above-stated process is executed n times, at the step S4, in a combination of "Di and Li" (wherein "i"=1 to n).

At a step S5, the relief shape prepared by the step S2 and the interference critical shape or the shank interference critical shape prepared by the step S3 or S4 are read out from the storage device 3. The interference critical shape or the shank interference critical shape is subtracted from the relief shape as shown in FIG. 11. As a result, a graphic form is obtained. For this graphic form, a next interference critical shape or a next shank interference critical shape is read out from the storage device 3 and is subtracted also from the relief shape. This process is executed for every interference critical shape or every shank interference critical shape. A shape finally obtained in this manner is called a machining area. The machining area is thus obtained with all the tool intrusion inhibiting parts having been removed from the relief shape. In addition to that, the generation of flash can be prevented by carrying out machining within the machining area. The machining area is stored in the storage device 3 and is displayed by the display device 5. The process of the step S5 then comes to an end.

Figure 12A:
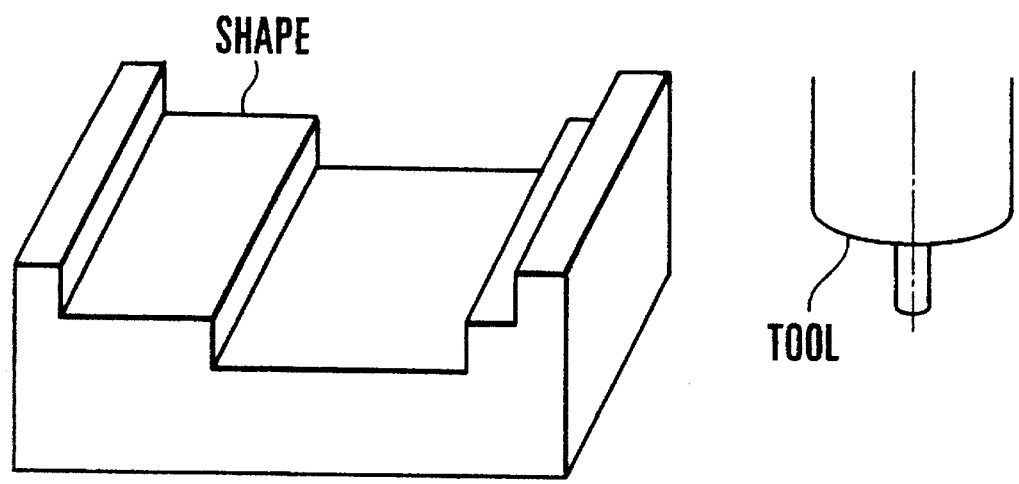
Figure 12B:
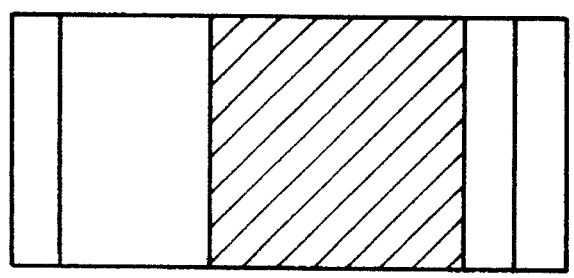
Figure 12C:
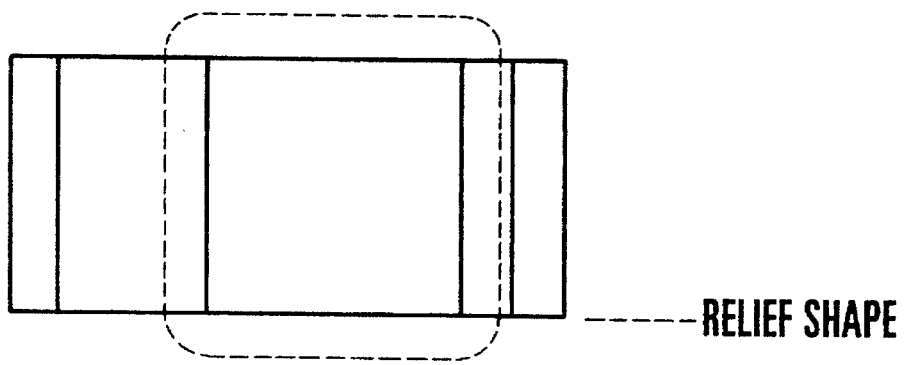

FIGS. 12(a) to 12(f) and 13 show a practical example of a series of processes of the steps S1 to S5 described above. FIG. 12(a) shows a three-dimensional image of a shape to be obtained by machining and an image of a tool to be used. FIG. 12(b) shows by hatching the machining object shape designated at the step S1. FIG. 12(c) shows the relief shape prepared at the step S2. FIG. 12(d) shows four interference critical shapes prepared at the step S3. FIG. 12(e) shows two shank interference critical shapes prepared at the step S4. In this case, the shank interference critical shape on the right side enters into the machining object shape, thus indicating occurrence of interference by the shank. FIG. 12(f) shows the machining area prepared at the step S5.

Figure 13:
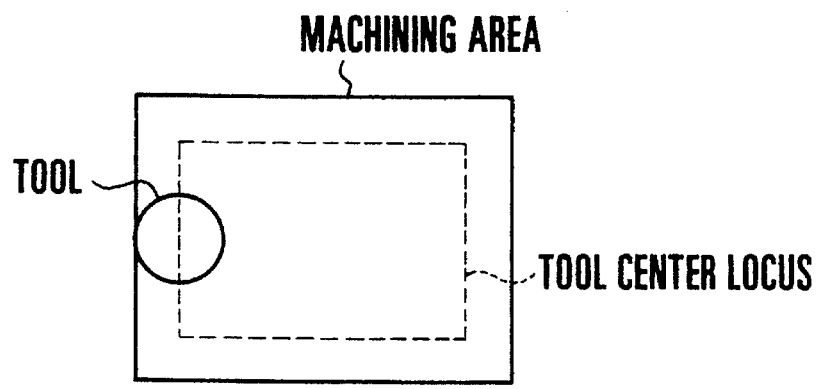
FIG. 13 shows a tool center locus.

At a step S6, the machining area prepared by the step S5 is read out from the storage device 3. The machining area is offset as much as the radius of the tool in the direction of reducing it. By this, a tool center locus is prepared as shown in FIG. 13. The radius of the tool is obtained by dividing by two the tool diameter included in the machining information designated at the step S1.

Figure 14:
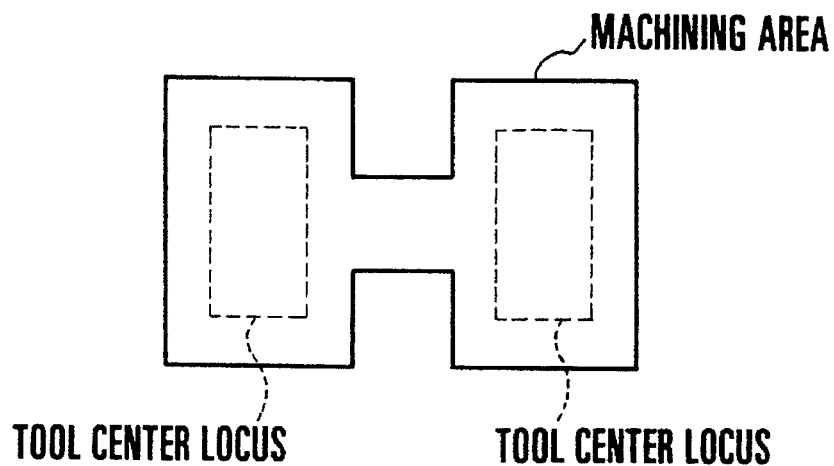
FIG. 14 shows a case where a tool center locus divides into a plurality of loci.
Figure 15:
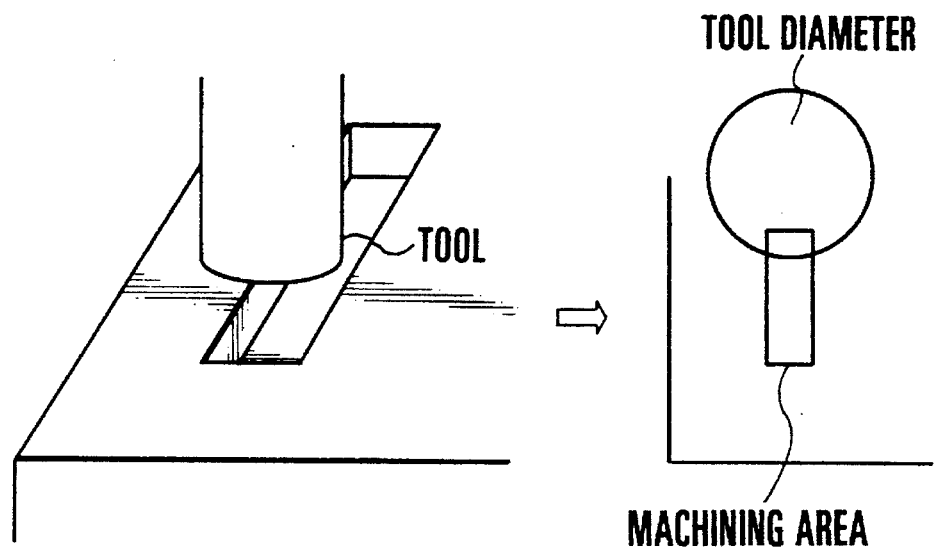
FIG. 15 shows a case where it is impossible to obtain a tool center locus

Generally, the tool center locus is obtained in a state of being divided into a plurality of closed areas as shown in FIG. 14. With the tool center locus obtained for one to a plurality of closed areas, the tool center locus and the number of divided loci are stored in the storage device 3 before completion of the step S6. Further, in a case where the machining area is narrow as compared with the diameter of the tool, like in the case of a narrow pocket part as shown in FIG. 15, offsetting the machining area in the direction of reducing it would leave no machining area. In other words, in such a case, the tool center locus would disappear. This means that such a machining area cannot be machined with the tool which is being used (as the tool cannot be brought into the area). In such a case, the impossibility is displayed and the process is suspended. If several kinds of tools of different diameters have been registered either in the storage device 3 or in the external storage device 6, the process may be arranged to continue by replacing the tool automatically with a tool of a smaller diameter.

Steps S7 to S10 are arranged to repeat processes for the number of the above-stated tool center loci. In the following description a letter "i" is used to indicate that the processes are repeated for the i-th time.

Figure 16:
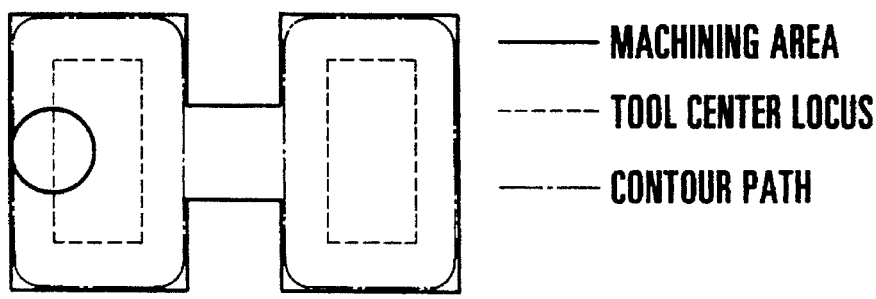
FIG. 16 shows a contour path.

At the step S7, an i-th tool center locus is read out from the storage device 3. The radius of the tool is obtained, in the same manner as the step S6, and the tool center locus is offset as much as the tool radius in the direction of expanding it. A contour path is thus obtained, as shown in FIG. 16, and is stored in the storage device 3 as an i-th contour path. The process of expanding as much as the tool radius along a machining object shape is provided for the purpose of utilizing the offset function of the NC machine tool in machining.

Next, at the step S8, a shape (of a fill-out cutting area) to be left in the middle part of a machining area at the time of cutting along the i-th contour path obtained by the step S7 is prepared. More specifically, the i-th tool center locus is read out from the storage device 3. The radius of the tool is obtained in the same manner as the step S6. The fill-out cutting area is obtained by reducing the tool center locus by offsetting it to an extent determined by subtracting a predetermined amount from the radius of the tool. The predetermined amount is predetermined according to the tool and is included in the machining information read and obtained at the step S1.

Figure 17A:
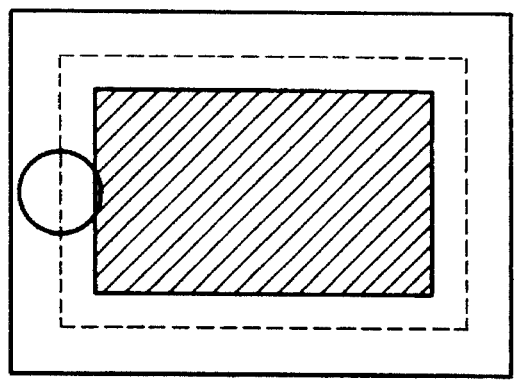
FIGS. 17(a) and 17(b) show a fill-out cutting area.
Figure 17B:
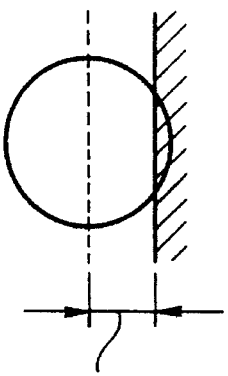
Figure 18:
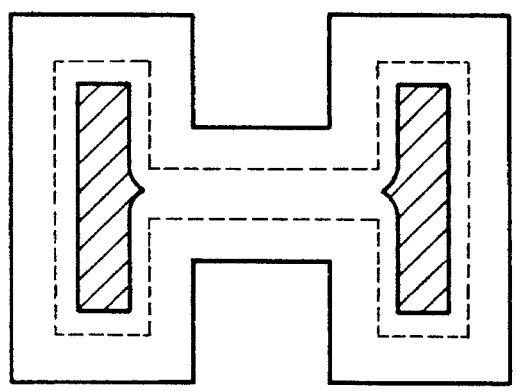
FIG. 18 shows a case where a fill-out cutting area divides into a plurality of areas.

Referring to FIGS. 17(a) and 17(b), the fill-out cutting area is arranged to be larger than an area which is indicated by hatching and to be left by actual cutting along the contour path. This arrangement effectively prevents the possibility of leaving any uncut part by providing overlapping parts. FIG. 17(b) is an enlarged view of an essential part of FIG. 17(a). Generally, the fill-out cutting area divides into a plurality of closed areas as shown in FIG. 18. Therefore, each fill-out cutting area is obtained and the fill-out cutting areas and the number of them are stored in the storage device 3 to complete the fill-out cutting area preparing process.

At the next step S9, the fill-out cutting areas corresponding to the i-th contour path prepared by the step S8 are serially read out from the storage device 3 and a fill-out cutting path is prepared for each fill-out cutting area in accordance with the following procedures:

A tool moving pitch which has been set according to the tool and included in the machining information designated by the step S1 is taken out. Then, hatching is applied to each of the fill-out cutting areas in parallel to the X or Y axis as shown in FIG. 19. Hatching data, i.e., an aggregation of line segments obtained by dividing the fill-out cutting area at the tool moving pitch in the direction of the X or Y axis, is stored in the storage device 3 as a fill-out cutting path. A decision as to with which of the X and Y axes the hatching is to be applied in parallel is made, for example, as follows: The hatching is applied in parallel to the X axis if a rectangle encompassing the fill-out cutting area is long in the direction of the X axis or in parallel to the Y axis if the encompassing rectangle is long in the direction of the Y axis. Further, the tool moving pitch is of course set at a value narrower than the diameter of the tool to leave no uncut part after the fill-out cutting.

At the step S10, the i-th contour path, the fill-out cutting area and the fill-out cutting path prepared by the steps S8 and S9 are read out from the storage device 3. After the reading, CL (cutter location) data which indicates the movement of the tool, i.e., a tool path, is prepared according to the following procedures: The CL data consists of data indicating the movement of the tool by coordinate values X, Y and Z and data related to the coordinate values according to the on/off of the tool offset function. The CL data is registered in a CL table which is formed in the storage device 3.

Figure 22A:
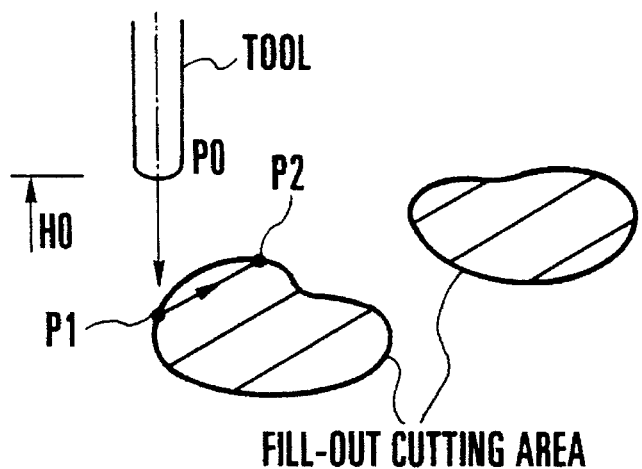
FIGS. 22(a) to 22(e) show a manner in which a tool moves along fill-out cutting paths.

The CL data is prepared for causing the tool to move along a path which is as follows: Referring to FIG. 22(a), one of a plurality of fill-out cutting paths is selected. The tool is allowed to descend on one end point P1 of one of hatching line segments of the selected cutting path from a point P0 located right above the point P1. The tool is then caused to move to the other end point P2 of the same hatching line segment. A height H0 (a tool lowering distance) is assumed to be included in the machining information designated at the step S1.

Figure 22B:
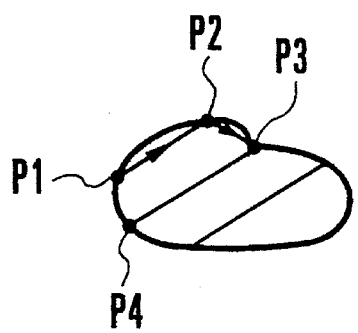
Figure 22C:
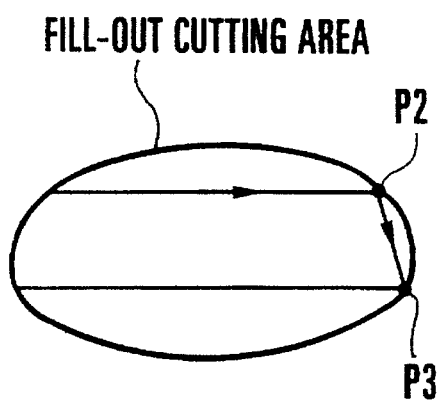
Figure 22D:
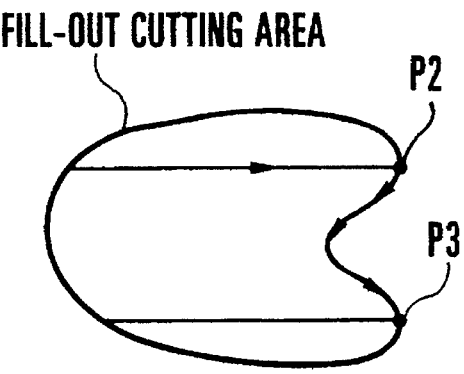

Next, as shown in FIG. 22(b), the tool is moved from the end point P2 to another end point P3 which is located nearest to the point P2. In a case where a line segment connecting the end points P2 and P3 is within the fill-out cutting area, as shown in FIG. 22(c), the tool is arranged to be speedily moved by linearly moving it along the line segment. If the line segment connecting the end points P2 and P3 is located outside the fill-out cutting area, the tool is moved along the edge of the fill-out cutting area, as shown in FIG. 22(d), to avoid any interference that might be caused by a linear movement. After arrival at the end point P3, the tool is moved to an end point P4 as shown in FIG. 22(b). After that, the same process continues until the tool is moved through all the hatching line segments of the selected cutting path.

Figure 22E:
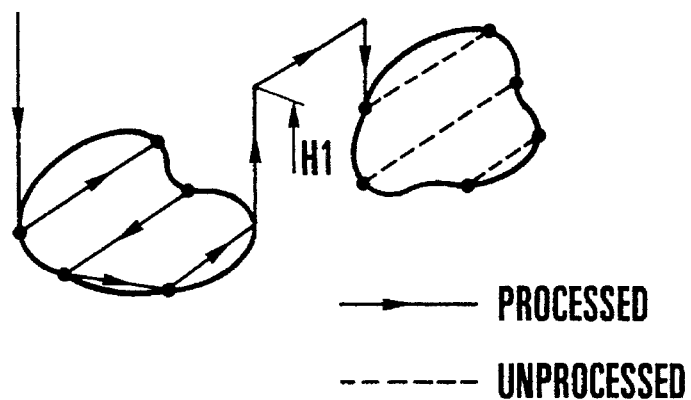

In a case where any fill-out cutting path is left unprocessed at the end point of the last hatching line segment of the selected fill-out cutting path, as shown in FIG. 22(e), the tool is caused to ascend up to an upward moving height H1 which has been set within the machining information designated by the step S1. The tool is then moved to a point right above an end point of one of the hatching line segments of the unprocessed fill-out cutting path and is allowed to descend on the end point of the hatching line segment. After that, the movement of the tool is decided in the same manner as described above and the process is repeated until CL data is obtained for all the fill-out cutting paths.

Figure 23A:
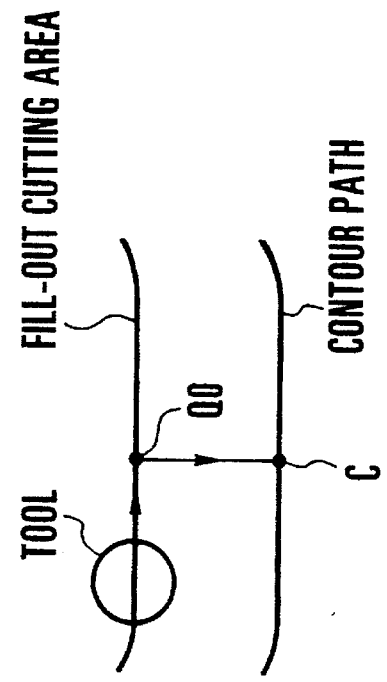
FIGS. 23(a) to 23(d) show a manner in which a tool moves from a fill-out cutting path to a contour path and then moves along the contour path.

After the tool is moved from the end of the last hatching line segment of the last fill-out cutting path, the tool comes to move along a contour path according to the following procedures:

A graphic element having its midpoint located nearest to the current position of the tool is first selected from among graphic elements which compose the contour path, such as line segments, circular arcs, etc. Then, with each of the line segments and circular arcs composing the contour path assumed to be expressed as E and its midpoint as C, as shown in FIG. 23(a), a straight line L which is perpendicular to the line segment or the circular arc and passes through its midpoint C is obtained. If the graphic element is a circular arc, the straight line L is obtained by imagining a line segment connecting the start and end points of the circular arc and by drawing a straight line perpendicular to the imaginary line segment.

Figure 23B:
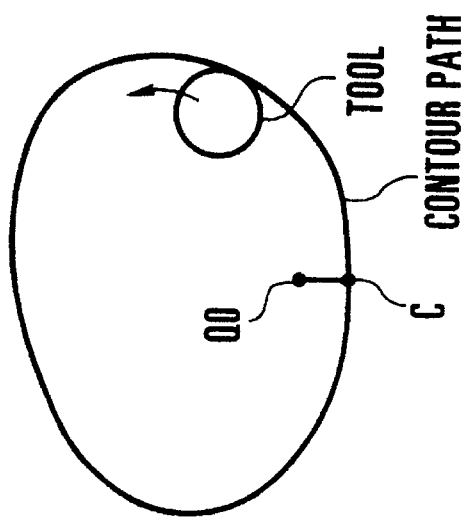
Figure 23C:
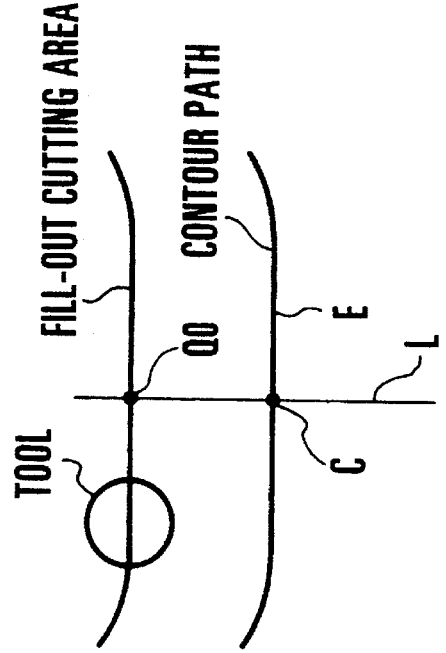
Figure 23D:
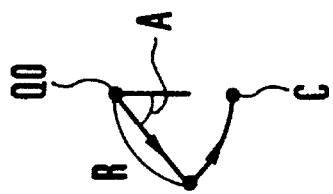

Next, an intersection point Q0 between the straight line L and a graphic element forming the fill-out cutting area, such as a line segment or a circular arc is obtained. The tool is caused to move along the fill-out cutting area to the intersection point Q0 as shown in FIG. 23(b). After that, the tool is moved to the midpoint C. In moving the tool from the intersection point Q0 to the midpoint C, the tool offset function of the CL data is turned on as the tool offset function is utilized in this case. The tool may be moved from the intersection point Q0 to the midpoint C by a method of inserting a circular arc as shown in FIG. 23(c). In the case of this moving method, an angle A and a radius R must be predetermined as machining information. After the tool is moved to the midpoint C, the tool is further moved along the loop of the contour path to make one turn back to the midpoint C. The tool offset function is then turned off and the tool is caused to come back to the intersection point Q0.

Since the tool center locus consists of a plurality of closed loops in general, a contour path which is prepared by expanding it also consists of a plurality of closed loops in general. The above-stated process of moving the tool to make one turn along one loop of the contour path, therefore, leaves some loop unprocessed. The unprocessed loop is processed in the following manner:

A graphic element having its midpoint located nearest to the intersection point Q0 is selected from among the graphic elements composing the unprocessed loop of the contour path. Then, a point above a fill-out cutting area is obtained, as shown in FIG. 24, in the same manner as mentioned above. This point is assumed to be a point Q0'. The tool is moved from the point Q0 to the point Q0' through the air above in the same manner as in the case of FIG. 22(e). After that, the point Q0' is regarded as the point Q0 and the unprocessed loop is processed according to the same manner as the procedures described above. These procedures are repeated to completely process all the closed loops of the contour path. Upon completion of process on the last closed loop, the tool is allowed to ascend up to the height H0 as shown in FIG. 22(a). After the CL data corresponding to the i-th tool center locus is obtained through the above-stated procedures, the data is stored in the storage device 3 as the i-th CL data. The flow then comes to a step S11.

At the step S11, a check is made to find if there is any tool center locus left unprocessed. If so, the flow comes back to the step S7 to prepare the contour path, the fill-out cutting area, the fill-out cutting path and the CL data for the unprocessed tool center locus one after another.

If the result of the check made at the step S11 indicates that the contour path, etc., have been completely prepared for all the tool center loci, the flow comes to a step S12. At the step S12, the CL data prepared for every tool center locus are connected to prepare composite CL data for a machining object shape. The composite CL data is in the same format as the one shown in FIG. 21 and is prepared in accordance with the following procedures:

The first CL data is first read out from the storage device 3 and its last point P1e is obtained. The second CL data is next read out from the storage device 3 and its leading point P2s is obtained. The first CL data, CL data for moving from the last point P1e to the leading point P2s and the second CL data are combined as composite CL data and are serially written into the storage device 3. Further, at this step, the CL data for moving from the last point P1e to the leading point P2s is prepared just for a linear movement between the two points.

Assuming that there are n tool center loci, the composite CL data is registered in the storage device 3 in the order of "the i-th CL data, the CL data for movement from the last point Pie of the i-th CL data to the leading point P(i+1)s of (i+1)st CL data, (i+1)st CL data, - - -," by repeating the process i=1 to (n−1) times (see FIG. 26).

At a step S13, data for any part left uncut with the machining area cut by the tool is prepared. Since the inner side of the contour path is completely machined by the cutting performed along the fill-out cutting path in addition to the cutting along the contour path, any uncut part is left on the outer side of the contour path within the machining area. Hence, the uncut area can be obtained by subtracting the contour path from the machining area (see FIG. 25). More specifically, the machining area is first read out from the storage device 3. Next, a first contour path is read out from the storage device 3 and is subtract from the machining area. A second contour path is read out from the storage device 3 and is likewise subtracted from the machining area. The contour paths are thus subtracted from the machining area one after another to process all the contour paths. Leftover uncut parts resulting from the process as a final result are obtained as an aggregation of a plurality of closed areas. The final result thus obtained is stored in the storage device 3 as leftover (or residual) uncut part data.

At a step S14, the composite CL data prepared by the step S12 and the leftover uncut part data prepared by the step S13 are read out from the storage device 3 and are then stored either in a predetermined area within the storage device 3 or in the external storage device 6 through the input/output control device 4. The data are displayed if necessary on the display device 5 before the NC data preparing action comes to an end.

The embodiment is thus arranged to be capable of automatically preparing a machining area where the possibility of interference by the tool including not only its cutting edge part but also its other parts such as a shank part and also to automatically prepare the CL data and the data of leftover uncut parts.

Further, this invention is not limited to the embodiment described above. For example, since the steps S2, S3 and S4 are processes which are independent of each other, the order of sequence of their processes may be interchanged as desired. The process of the step S3 may be changed to have all the interference critical shapes combined into a composite graphic form beforehand, instead of storing the interference critical shapes in the storage device 3 one after another, and to store the composite graphic form in the storage device 3. Then, in that case, the composite shape may be subtracted from the relief shape. The same change is applicable also to the step S4 for the preparation of the shank interference critical shape. The step S7 and the steps S8 and S9 are also independent of each other. Therefore, the process of the step S7 may be executed after completion of the processes of the steps S8 and S9. Further, the process of preparing the leftover uncut part data at the step S13 may be shifted to be executed immediately after the step S7 as the leftover uncut part data can be obtained after the contour path is prepared. In that case, one contour path obtained immediately before is subtracted from the machining area. Then, the result of the subtraction is serially stored in the storage device 3 and a contour path prepared for the next time is subtracted from the result stored.

As described in detail above, the arrangement of the embodiment enables an NC data preparation device to automatically prepare a machining area wherein no flash will be generated and the tool, including its parts such as its shank part as well as its cutting edge part, never comes to interfere. Besides, the CL data based on the machining area and the data of any leftover uncut part can be also automatically prepared. The arrangement thus enables even an unskilled person to prepare high quality CL data and also permits reduction in time and labor required for the preparation of data. Further, the shape of every leftover uncut part is automatically obtained, so that the labor of making a check for the shape of the leftover uncut part can be saved by the arrangement.

The following are some examples of further improvement over the embodiment described above.

In preparing the tool path data for machining the contour of a machining area, it has been practiced in general to carry out work processes in the following manner: A contour graphic form indicating a machining area is simply offset inward as much as the radius of the tool. The offset graphic form is regarded as a path along which the center of a tool used for contour machining is moving, that is, as a tool center path. Further, the graphic form is simply offset outward as much as the radius of the tool. This outward offset graphic form is regarded as the data of a tool path to be used for ultimate contour machining. To be more specific, each individual geometric element of the contour graphic form of a machining area (each of line segments of a graphic form) is simply offset inward as much as the radius of the tool. Intersection points between adjacent offset line segments are obtained and interconnected. In a case where the adjacent offset line segments part from each other to give no intersection point, these adjacent offset line segments are interconnected by inserting a circular arc element in between them. The tool path data for contour machining has been generally prepared in this manner.

Figure 27A:
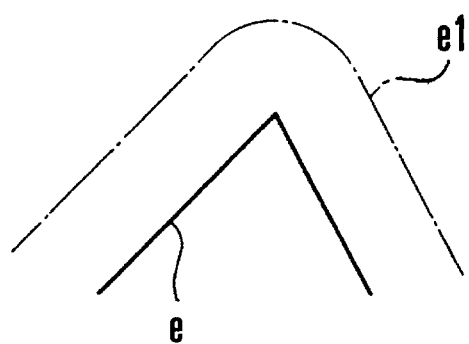
FIGS. 27(a), 27(b) and 27(c) show an art on the base of which an example of improvement is made over the embodiment of the invention described.

With the tool path data for contour machining prepared in this manner, however, the tool center path prepared for a contour shape "e" becomes as represented by a line e1 in FIG. 27(a). Therefore, when the tool center moves along a circular arc part inserted in the tool center path e1 prepared for contour machining in the above-stated manner, the tool is left in contact with an angle part of the contour graphic form for a period of time during which the tool is passing the circular arc part inserted. As a result, the angle part of the contour graphic form would be rounded.

Figure 27B:
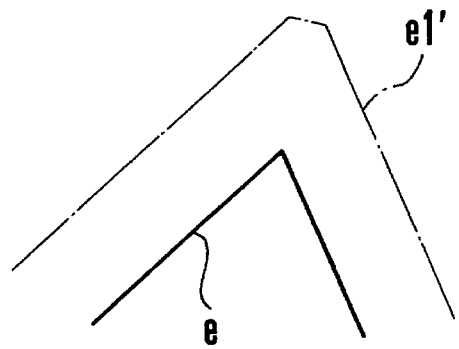
Figure 27C:
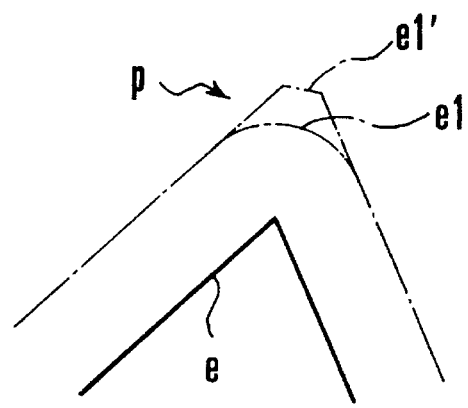
Figure 28:
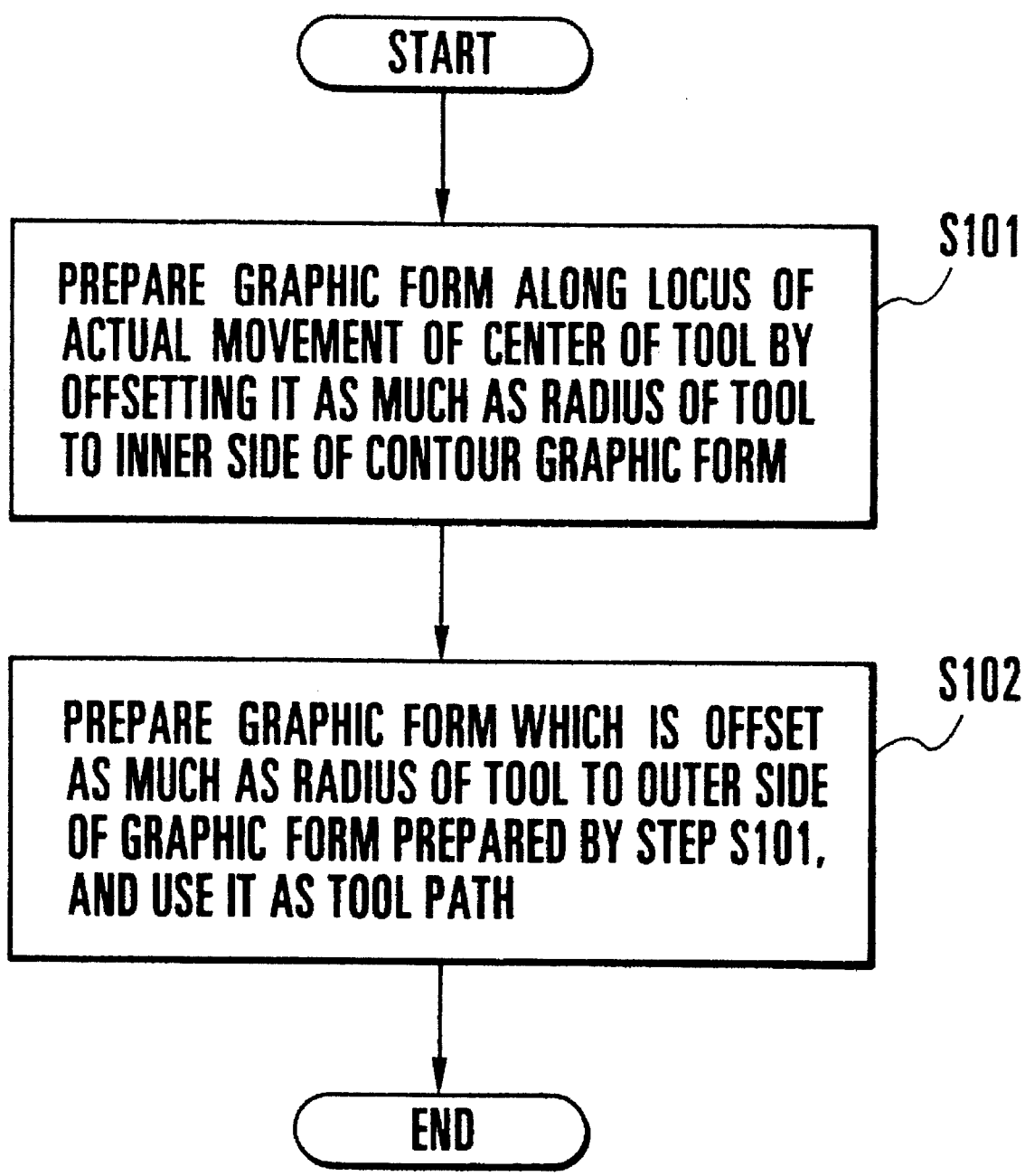
FIG. 28 is a general flow chart showing in outline the processes of preparation of a tool path by an example of improvement on the embodiment described.
Figure 29A:
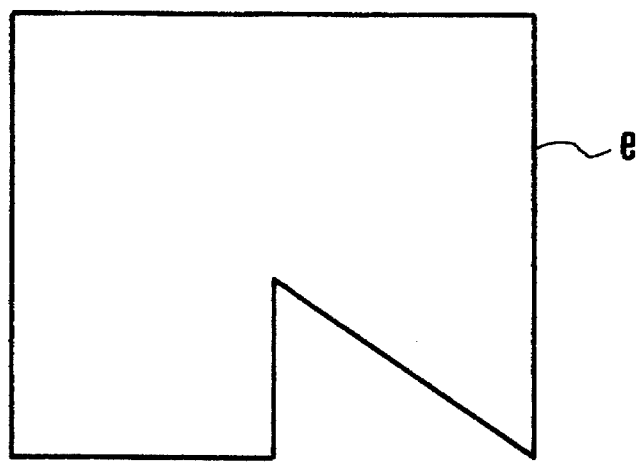
FIG. 29(a) shows by way of example a contour graphic form and FIG. 29(b) shows a graphic form prepared by a step S101 shown in FIG. 28.

Further, compared with the tool center path e1 shown in FIG. 27(a), the actual tool center movement path e1' for actual contour machining which is as shown in FIG. 27(b), the actual tool center movement path e1' for contour machining becomes larger than the tool center path e1 prepared, as indicated at a part P in FIG. 27(c). This discrepancy prevents accurate judgement on interference of the tool with a work to be cut. This problem is solved by the example of improvement which is described below:

FIG. 28 is a flow chart showing processes to be executed by the improvement example in preparing the tool path data for machining the contour of a machining area. At a step S101 of FIG. 28, the central processing unit 1 reads out the contour graphic form e of a machining area which is stored in the storage device 3 and is as shown in FIG. 29(a). The central processing unit 1 then offsets the contour graphic form inward as much as the radius of the tool, as indicated by "r" in FIG. 29(b), and prepares a graphic form along the locus of actual movement of the center of the tool. In other words, a graphic form which is to be used as a tool center locus is prepared.

Figure 29B:
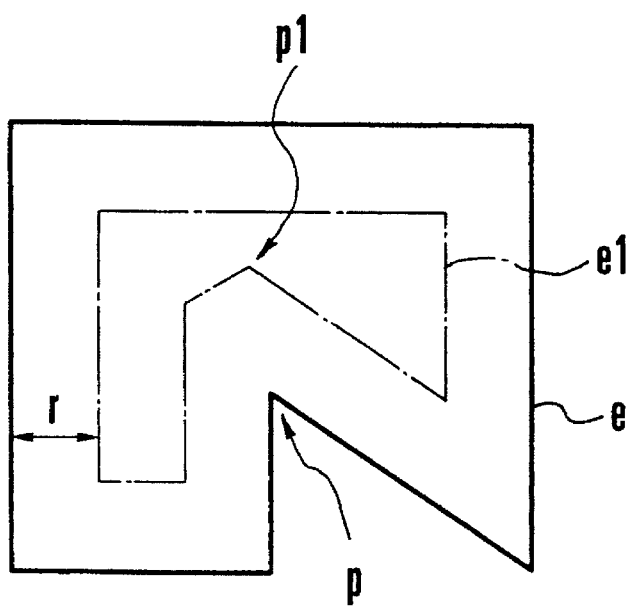

In this instance, if an outward protruding part is offset inward, offset line segments would come to cross each other. The tool center path then can be prepared by not inserting any line segment for interconnecting line segments and by just cutting any line segment part extending beyond an intersection point. However, in a case where an inward protruding part, like a part P of FIG. 29(b), is offset inward on the other hand, adjacent offset line segments e' of the contour graphic form e are parting from each other. In that case, the line segments e' must be connected to each other by inserting a line segment.

Figure 31:
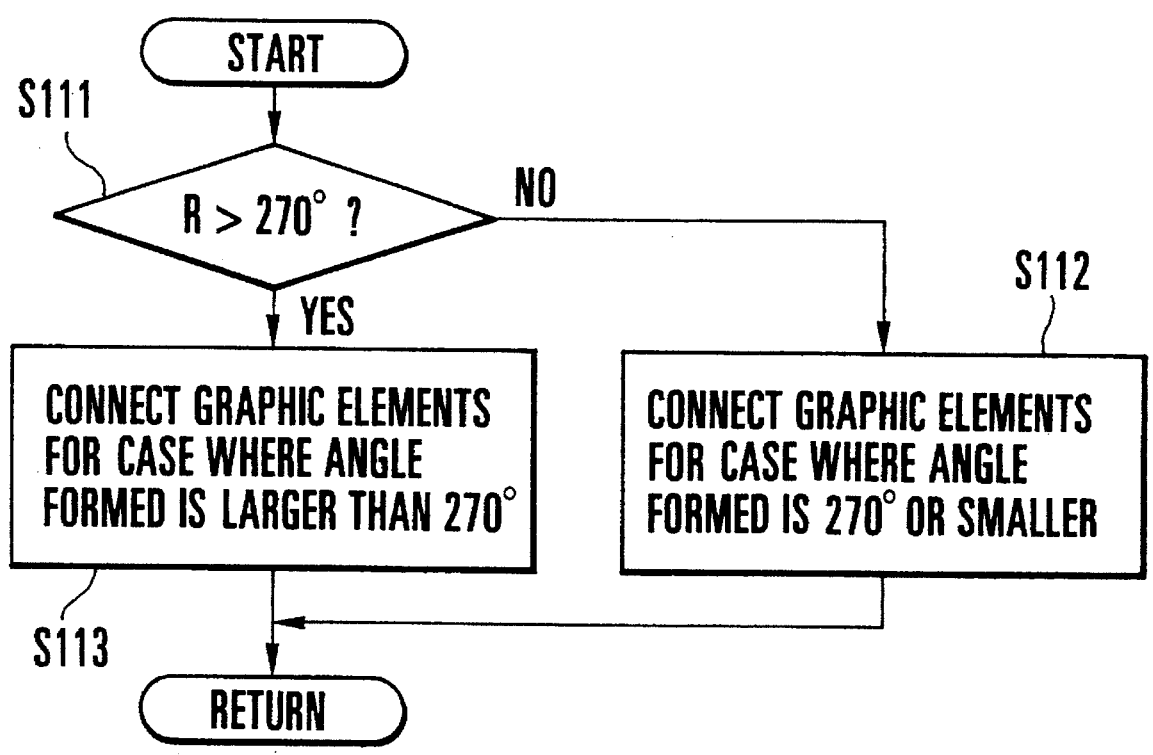
FIG. 31 is a flow chart showing a connecting process to be executed at the step S101 of FIG. 28.
Figure 32:
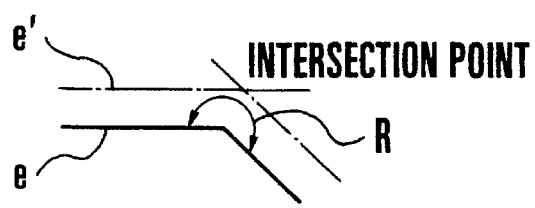
FIG. 32 shows a connecting process to be executed as shown at a step S112 of FIG. 31 if the angle R formed by offset line segments is less than 270°.

This connecting process can be carried out at the step S101 by executing a subroutine shown in FIG. 31. At a step S111 of FIG. 31, a check is made to find if an angle R formed by graphic elements, i.e., offset segments, to be interconnected exceeds 270°. If the angle R is found to be not exceeding 270 degrees, the flow comes to a step 112 to obtain an intersection point between the offset line segments or between the extensions of the offset line segments. The flow then comes back to the flow of FIG. 28. If the angle R formed by the offset line segments to be interconnected is found to exceed 270 degrees, on the other hand, the flow comes to a step S113 to execute the connecting process before returning to the flow of FIG. 28.

Figure 30:
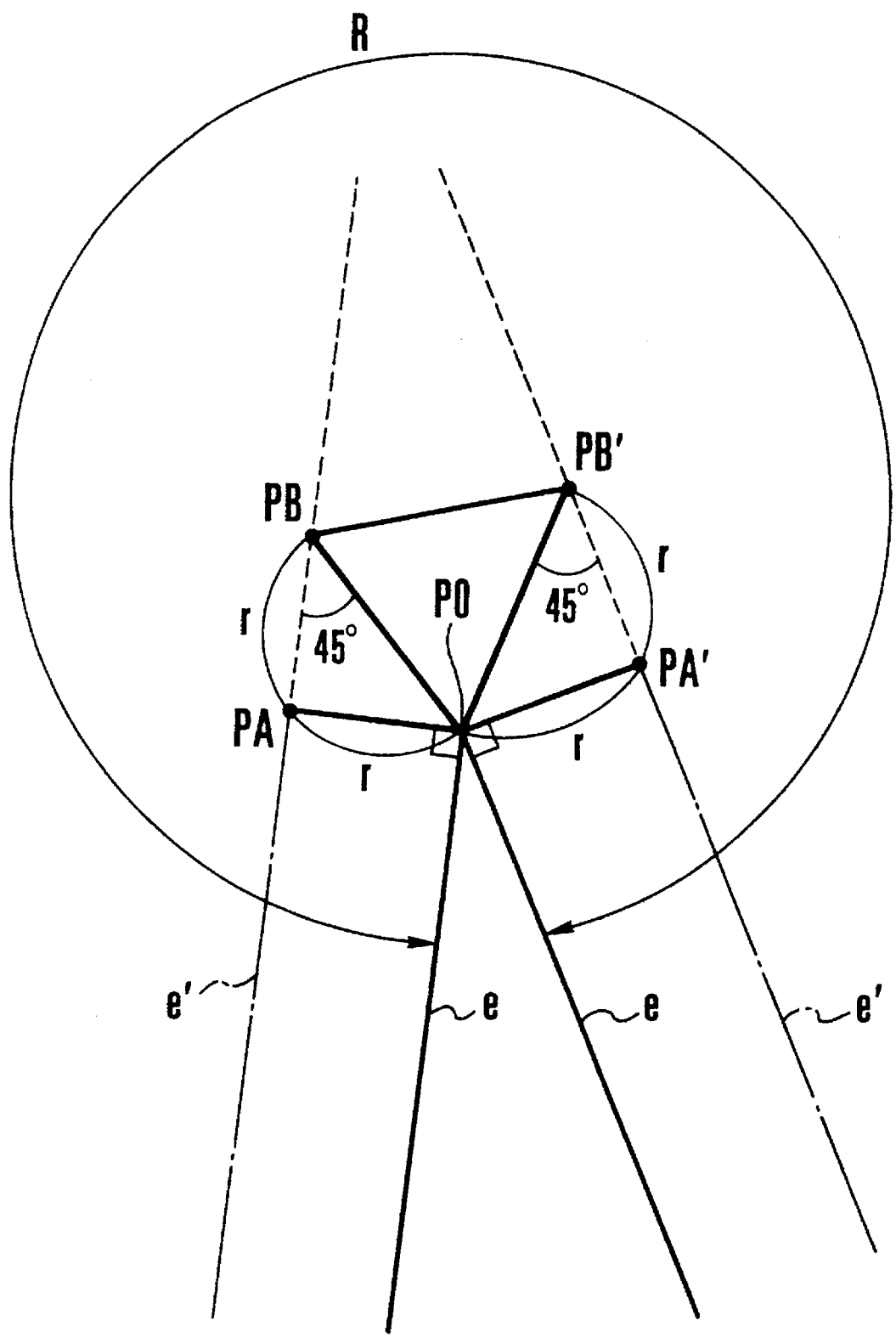
FIG. 30 shows a connecting process to be carried out as shown at a step S113 of FIG. 31 if an angle R formed by offset line segments is found to be larger than 270°.

The connecting process to be executed in a case where the angle R exceeds 270 degrees is described with reference to FIG. 30 as follows: The adjacent offset line segments e' are extended to obtain extension line segments PA-PB and PA'-PB'. Line segments PO-PB and PO-PB' are obtained with an intersection point (an apex angle point) PO of the contour graphic form before offsetting connected respectively to points PB and PB' on the extension lines. The offset line segments e' are extended in such a way as to form an angle of 45 degrees respectively between the extension line segment PA-PB and the line segment PA-PB and between the extension line segment PA'-PB' and the line segment PO-PB'. Then, the extension line segments are interconnected by a line segment PB-PB'.

The CL data for the connection obtained as a result of the connection process can be expressed as PA-PB-PB'-PA'. In FIG. 29(b), the connection part obtained by the above-stated connection process is represented by a part P1. Further, the adjacent offset line segments e' can be extended in such a way as to obtain the angle of 45 degrees, as described above, by just extending them to an extent corresponding to the radius r of the tool, without recourse to any complex computing operation.

Assuming that the tool moves clockwise along the tool center path, like PA - PB - PB' - PA', the tool comes to temporarily move away from the apex angle point PO of the contour graphic form when it passes the point PA and again comes into contact with the apex angle point PO when it reaches the point PA'. Therefore, this movement of the tool solves the above-stated problem that, if a tool center path is prepared by simply offsetting and inserting a circular arc, an angular part of the contour graphic form would be rounded by the actual movement of the tool because the tool is left in contact with the circular arc part for a period of time during which the tool moves.

After the tool center path is prepared in this manner, the flow comes to the step S102 of FIG. 28. At the step S102, an offset graphic form is prepared by offsetting as much as the radius of the tool the graphic form, i.e., the tool center path e1 of FIG. 29(b), which is prepared by the preceding step S101. The offset graphic form thus prepared is stored in the storage device 3 as tool path data for contour machining and is also displayed by the display device 5 before the process comes to an end.

Figure 33:
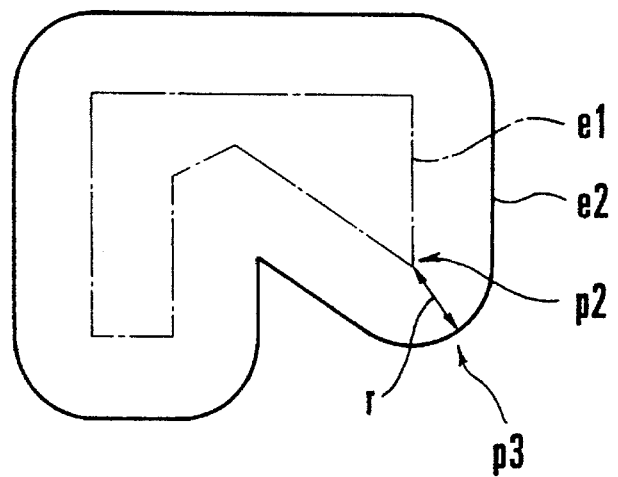
FIG. 33 shows a graphic form prepared by a step S102 shown in FIG. 28.
Figure 34A:
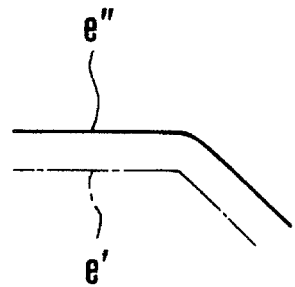
FIGS. 34(a) and 34(b) respectively show parts of the tool path of a contour graphic form prepared by the step S102 of FIG. 28.
Figure 34B:
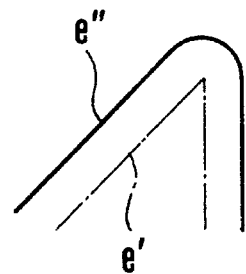

A locus of points at which the tool comes into contact with a work to be cut in actual machining, i.e., a contour graphic form, is as represented by a line e" which is one of graphic element connecting parts e' and e" shown in FIGS. 34(a) and 34(b). In view of this, an offset graphic form for an outward protruding part P2 of a contour graphic form shown in FIG. 33 is prepared in such a way as to become a graphic form P3 which is along a locus of points at which the tool comes into contact with the work to be cut in actual machining, i.e., a contour graphic form. In actuality, in this case, a circular arc which is of a radius equal to that of the tool and has its center at the outward protruding part P2 is inserted.

With the tool path data for contour machining an outward protruding part of a contour graphic form, such as the point P2 of FIG. 33, thus prepared to be in a graphic form along a contour graphic form, interference of the tool at such an outward protruding part of the contour graphic form can be accurately determined.

Figure 35A:
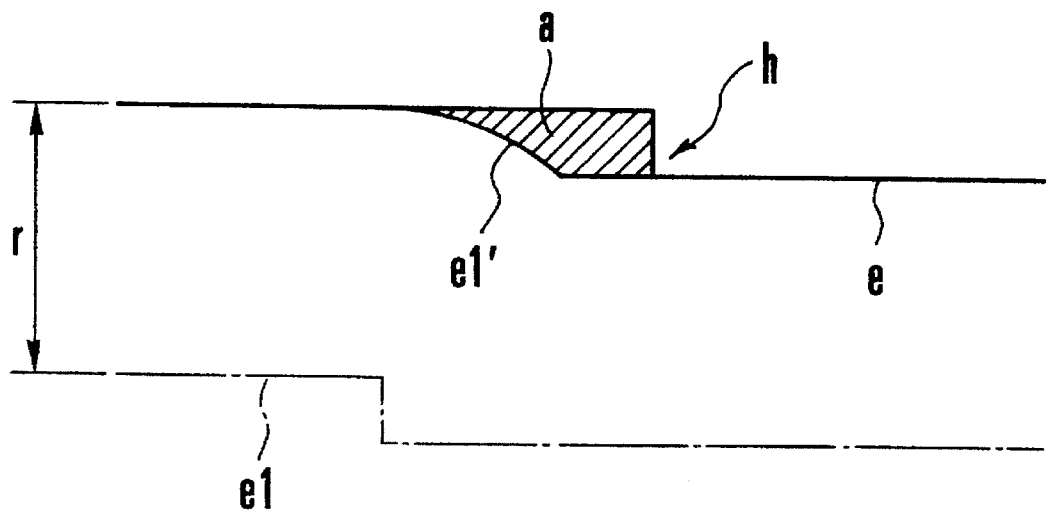
FIGS. 35(a) and 35(b) show a problem to be solved by the example of improvement.
Figure 35B:
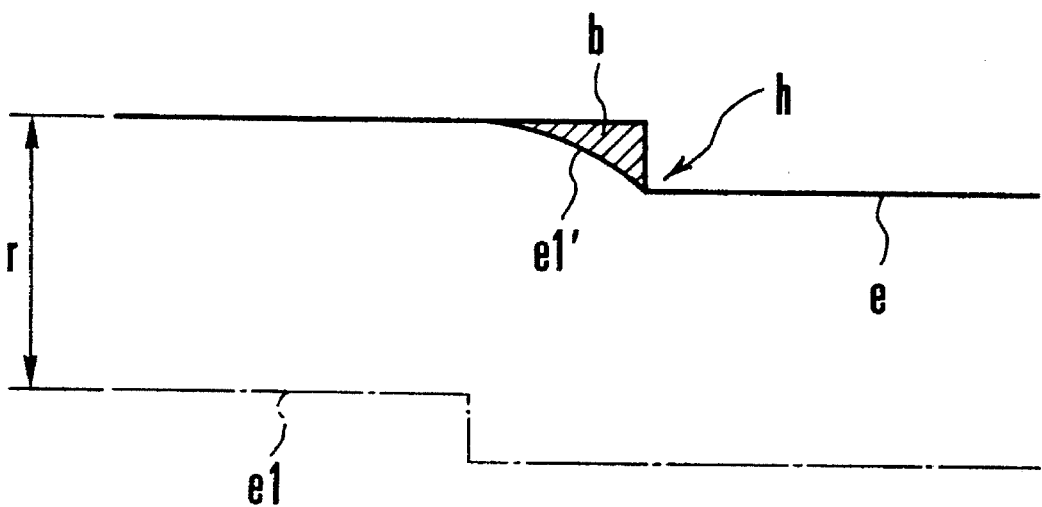

Another example of improvement on the embodiment is contrived to solve a problem which would result from unconditional execution of the improvement example given above. The problem resides in the following:

In a case where a contour graphic form e includes a stepped part which is smaller than the radius r of the tool as shown in FIG. 35(a), for example, machining is theoretically possible to an extent including a leftover uncut part b indicated by hatching in FIG. 35(b). However, execution of the process of the improvement example described above would lower machining efficiency, because it would leave a larger uncut part than the uncut part b as indicated by a hatched part "a" in FIG. 35(a) with the machining carried out according to the data of a tool path e1' which is obtained from a tool center path e1 as shown in FIG. 35(a).

Figure 36:
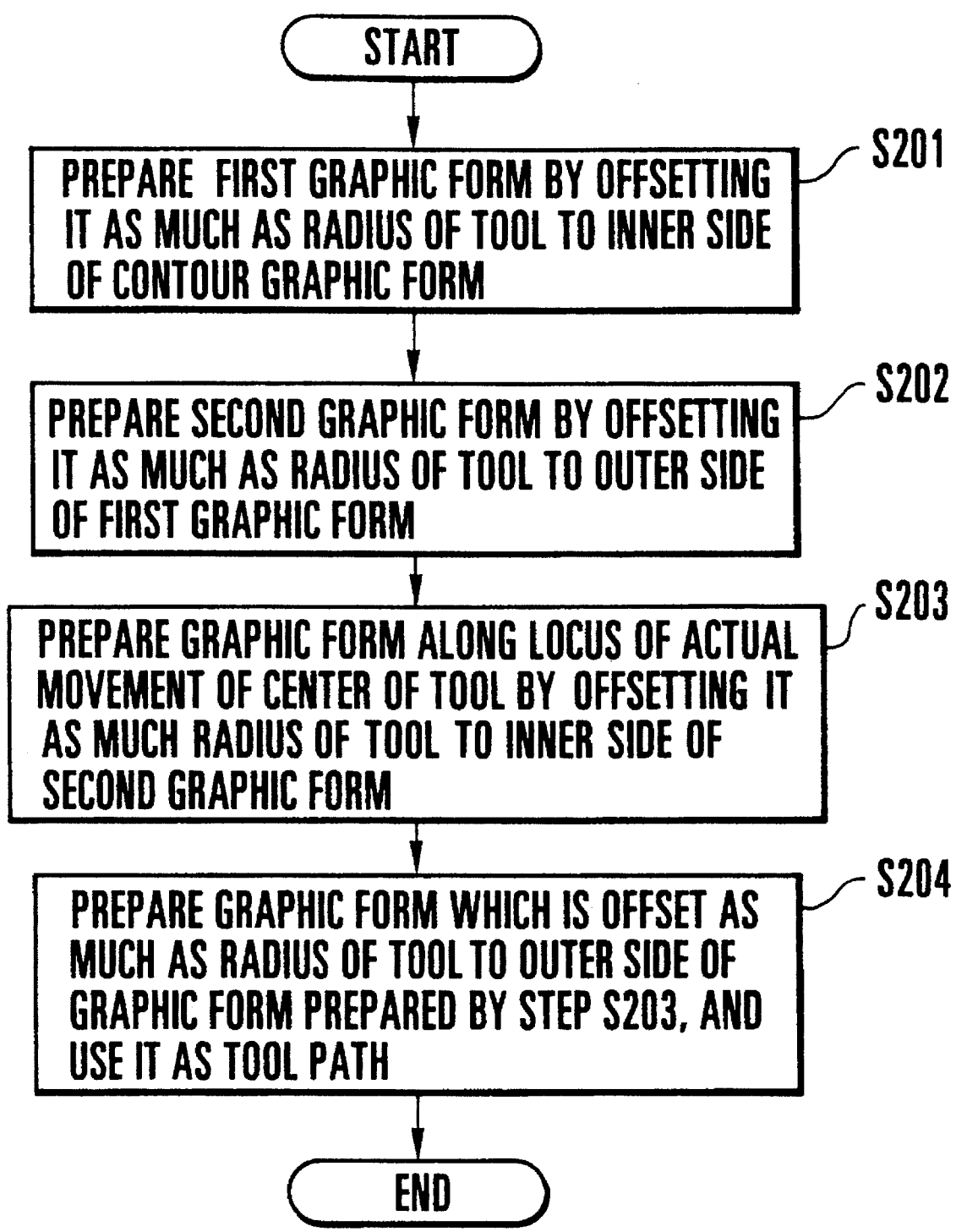
FIG. 36 is a flow chart showing tool path data preparing processes performed by an example of further improvement on the embodiment described.
Figure 37A:
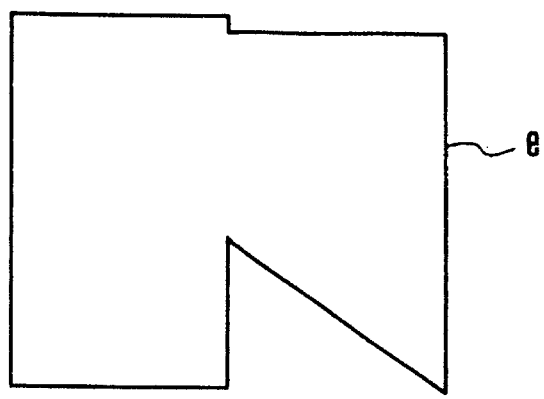
FIG. 37(a) shows a contour graphic form.
Figure 37B:
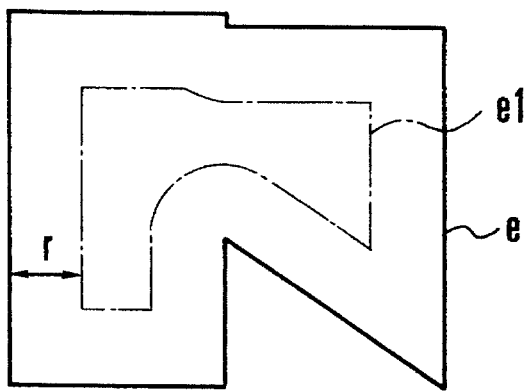
FIG. 37(b) shows a graphic form prepared by a step S201 of the flow chart shown in FIG. 36.

The improvement solves the problem by executing processes shown in FIG. 36 in a manner as described below with reference to FIG. 36 which is a flow chart:

At a step S201, the central processing unit 1 first reads out a contour graphic form of a machining area stored in the storage device 3 (see FIG. 37(a)) and prepares a first graphic form e1 by offsetting it inward as much as the radius of the tool as shown in FIG. 37(b).

Figure 37C:
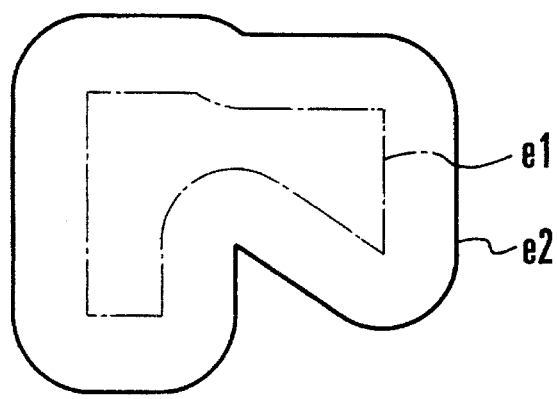
FIG. 37(c) shows a graphic form prepared by a step S202 of FIG. 36.
Figure 37D:
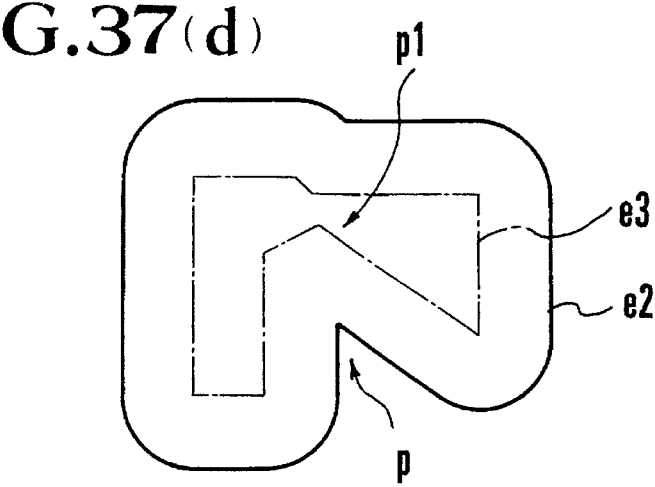
FIG. 37(d) shows a graphic form prepared by a step S203 of FIG. 36.

At a step S202, a second graphic form e2 is prepared, as shown in FIG. 37(c), by offsetting outward, as much as the radius of the tool, the first graphic form e1 prepared by the step 201. At a step S203, the second graphic form e2 is processed in the same manner as the step S101 of FIG. 28. In other words, the second graphic form e2 is offset inward as much as the radius of the tool to prepare a third graphic form e3 which is a tool center path and formed along a locus of actual movement of the center of the tool, as shown in FIG. 37(d). In this instance, the step S113 of the subroutine of FIG. 31 is executed in such a way as to prevent an inward protruding part P of the second graphic form e2 from being rounded by causing the tool to temporarily move away from the inward protruding part P and then to come back into contact with the inward protruding part P.

Figure 37E:
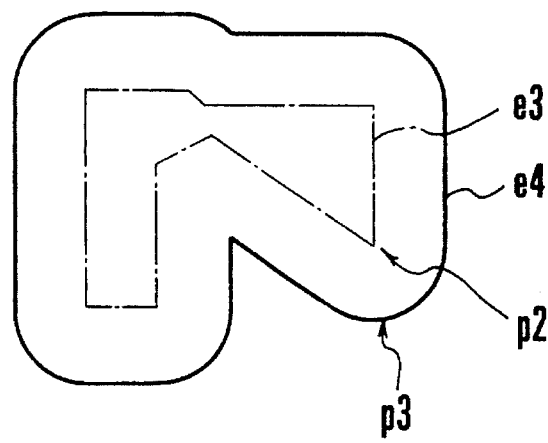
FIG. 37(e) shows a graphic form prepared by a step S204 of FIG. 36.

At a step S204, the third graphic form e3 (see FIGS. 37(d) and 37(e)) is subjected to the same process as the step S102 of FIG. 28. In other words, the third graphic form e3 is offset outward as much as the radius of the tool to prepare a fourth graphic form e4 as shown in FIG. 37(e). The fourth graphic form e4 thus prepared is stored in the storage device 3 as a tool path data for contour machining and is also displayed on the display device 5 before the flow of the processes comes to an end.

In this instance, an offset graphic form for an outward protruding part P2 shown in FIG. 37(e) is obtained by inserting and connecting a circular arc which has the same radius as the radius r of the tool with its center at a point P2, so that the locus of points at which the tool contacts with a work to be cut in actual machining can be obtained as represented by a graphic form P3 conforming to the contour graphic form as shown in FIG. 37(e).

Figure 37F:
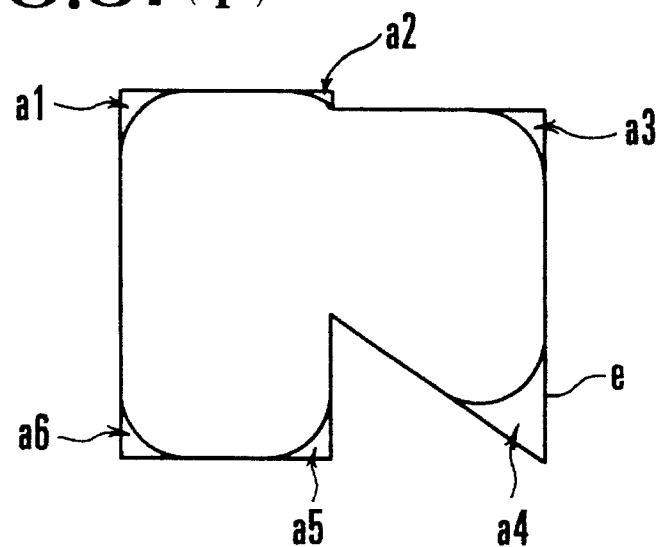
FIG. 37(f) shows a result of the tool path data preparing processes performed by an example of further improvement in the contour graphic form of FIG. 37(a).

The improvement example is thus arranged to prepare, before execution of processes similar to the improvement example described in the foregoing, the first graphic form by offsetting inward the contour graphic form as much as the radius of the tool, to prepare the second graphic form by offsetting outward the first graphic form and, after that, to execute processes on the second graphic form in a manner similar to the preceding example of improvement. As a result, leftover uncut parts a1 to a6 which are left uncut with respect to the contour graphic form e become as shown in FIG. 37(f). As shown, the leftover uncut part a2 which corresponds to the stepped part is smaller than a part which would be left uncut by the conventional arrangement. This improvement example thus enhances the machining efficiency in addition to attaining the same advantages as those attainable by the improvement example described in the foregoing.

According to the improvement described in detail above, an angular part of the contour graphic form can be prevented from being rounded and the machining efficiency can be enhanced by the reduction of a leftover uncut part at a stepped part of the contour graphic form which is stepped to an extent smaller than the radius of the tool. Further, the possibility of interference of the tool with the work can be accurately determined, so that tool path data can be adequately prepared for contour machining.

Figure 38A:
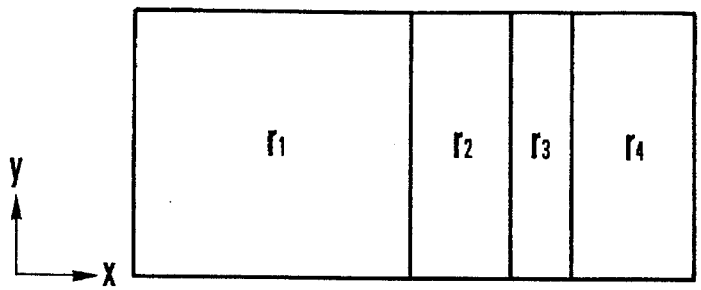
FIGS. 38(a) and 38(b) show another example of improvement in machining process on a work.
Figure 38B:
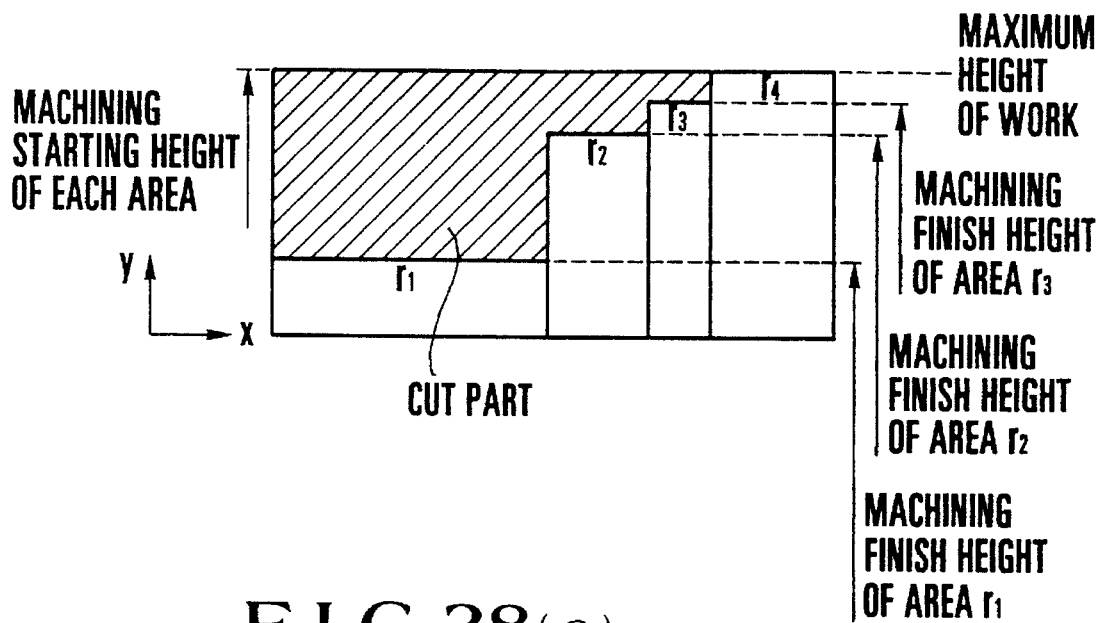
Figure 38C:
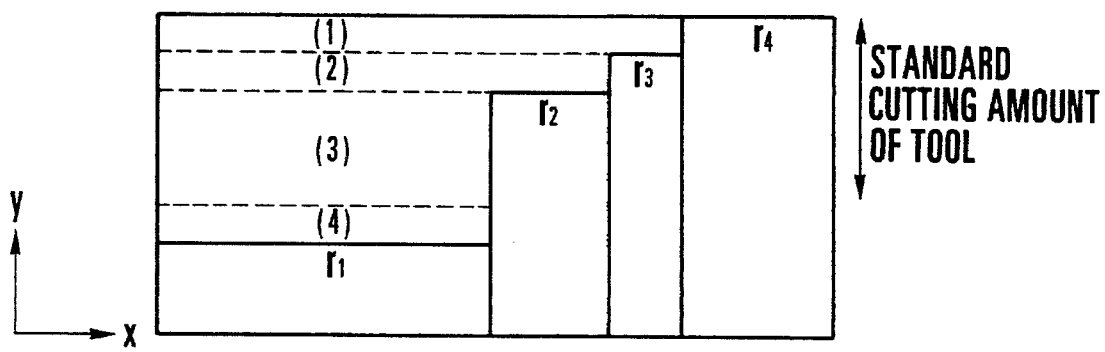
FIG. 38(c) shows the procedures of the machining process.

Next, a further example of improvement, or modification, of the embodiment is described as follows:

In a case where a work to be machined has surfaces of different heights as shown in FIGS. 12 or in FIGS. 38, it has been practiced to set machining object areas of the work by computing machining finish heights of the machining object areas and by taking out these areas from a storage one after another in the order Of height of the area. The conventional method is described in detail below with reference to the drawings:

FIG. 38(a) is a plan view of the work. FIG. 38(b) is a front view showing the work with a cutting part indicated by hatching. In FIGS. 38(a) and 38(b), the heights of the upper ends of cutting parts which correspond to areas r1 to r4 represent machining starting heights. The heights of the lower ends of the cutting parts represent machining finish heights, The highest part of the work is called a maximum height of the work. Further, FIG. 38(c) shows machining procedures. In machining the work shown in FIG. 38(a) according to the above-stated conventional method, the machining areas are set in the order of the machining finish heights, as indicated by areas (1) to (4) in FIG. 38(c), and the machining areas are cut one after another beginning with the area (1) and ending with the area (4).

Figure 39A:
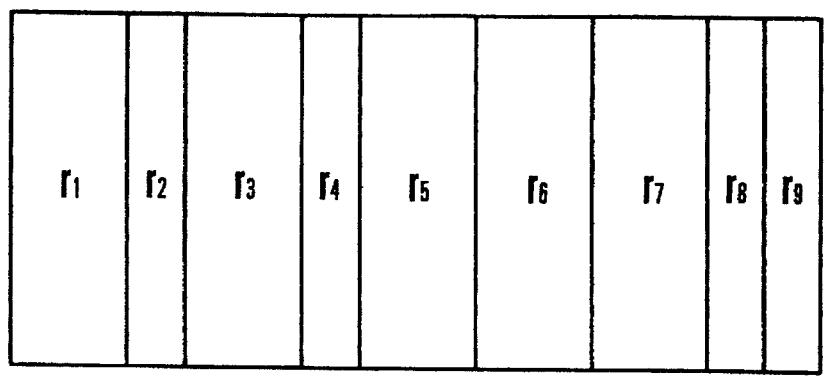
FIGS. 39(a) to 39(c) show a method for grouping areas to be machined according to a neighboring relation.
Figure 39B:
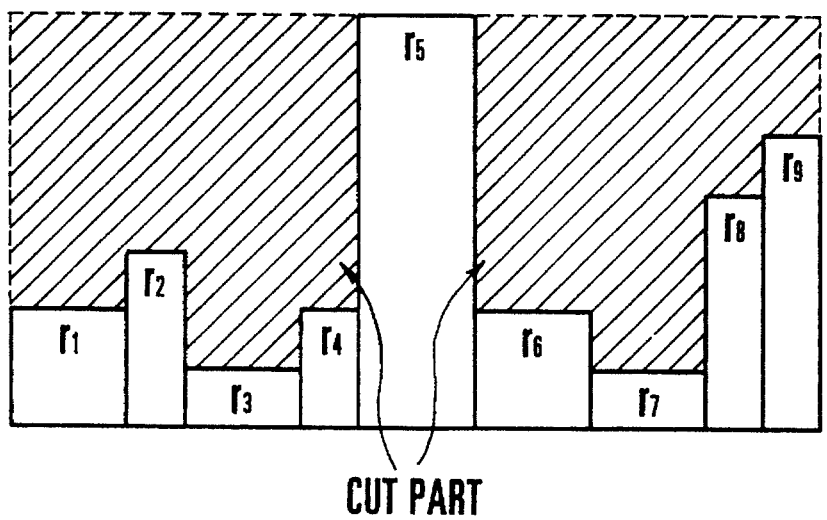
Figure 39C:
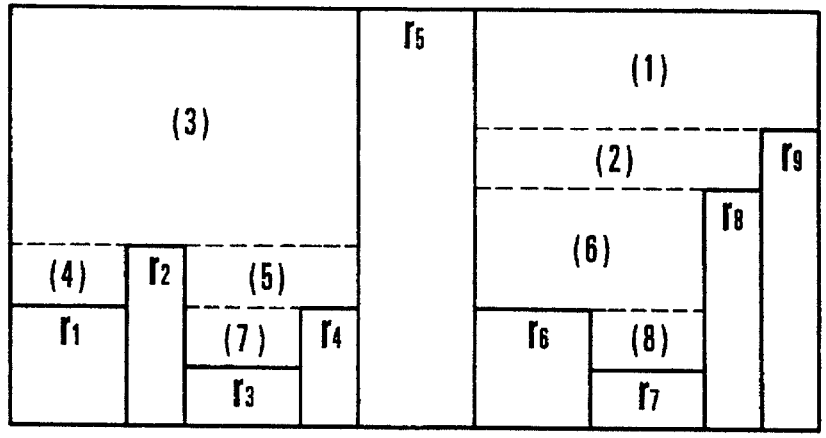

Since it has been practiced to set the machining areas in the order of the machining finish heights according to the conventional method, areas r1 and r2 are cut many times at cutting amounts smaller than the standard cutting amount of tool. The performance of the tool is, therefore, not fully utilized and, therefore, the machining efficiency is lowered. Further, in the case of machining to shapes as shown in FIGS. 39(a) and 39(b), alignment in the order of the machining finish heights becomes: r9 - r8 - r2 - r1 - r4 - r6 (areas r1, r4 and r6 are of the same height) - r3 - r7 (areas r3 and r7 are of the same height). Then, indicating the cutting parts in such numerals as (1) to (8) as shown in FIG. 39(c), the machining is performed in sequence from (1) to (8). This machining sequence causes frequent movement of the tool to lower the machining efficiency, An improvement or modification described by way of example below is contrived to improve the embodiment of this invention in connection to the above-stated point.

Figure 40:
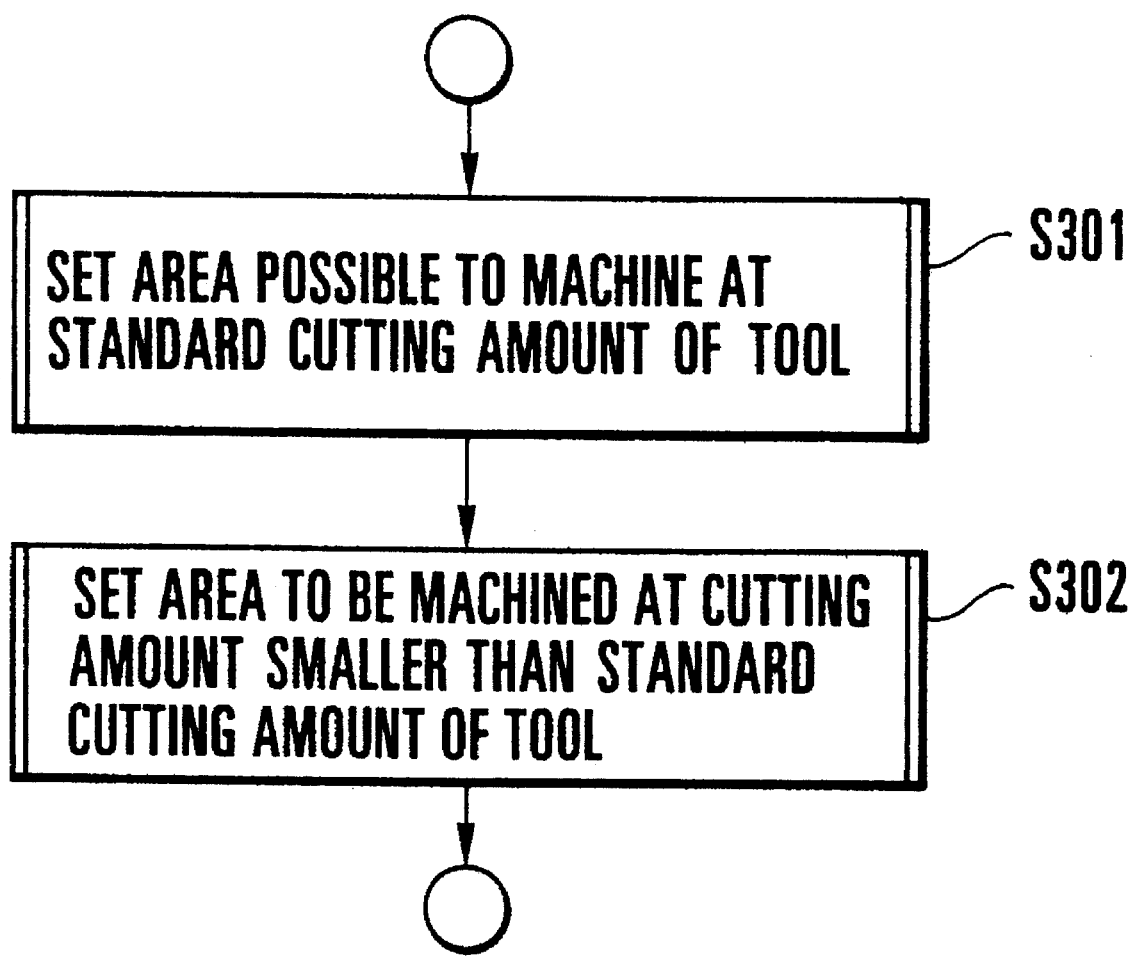
FIG. 40 is a general flow chart showing processes of setting machining areas to be executed while tool path data is in process of preparation.

FIG. 40 is a flow chart showing the machining area setting method of this improvement example. The flow includes a step S301 which is provided for setting areas to be machined at the standard cutting amount and a step S302 which is for setting areas to be machined at cutting amounts smaller than the standard cutting amount. The method is described step by step as follows:

(Standard Cutting Area Setting Step)

At the step S301 of the flow chart of FIG. 40, the central processing unit 1 sets a machining range and a machining height on the basis of information obtained from the storage device 3 about the tool, closed areas and machining. Areas which can be machined at various cutting heights are obtained and divided for every machining area. Machining area information is prepared with machining priority among different cutting heights included as attributes for the machining areas. Information on machining areas, cutting heights and machining areas is stored in the work area of the storage device 3.

Figure 41:
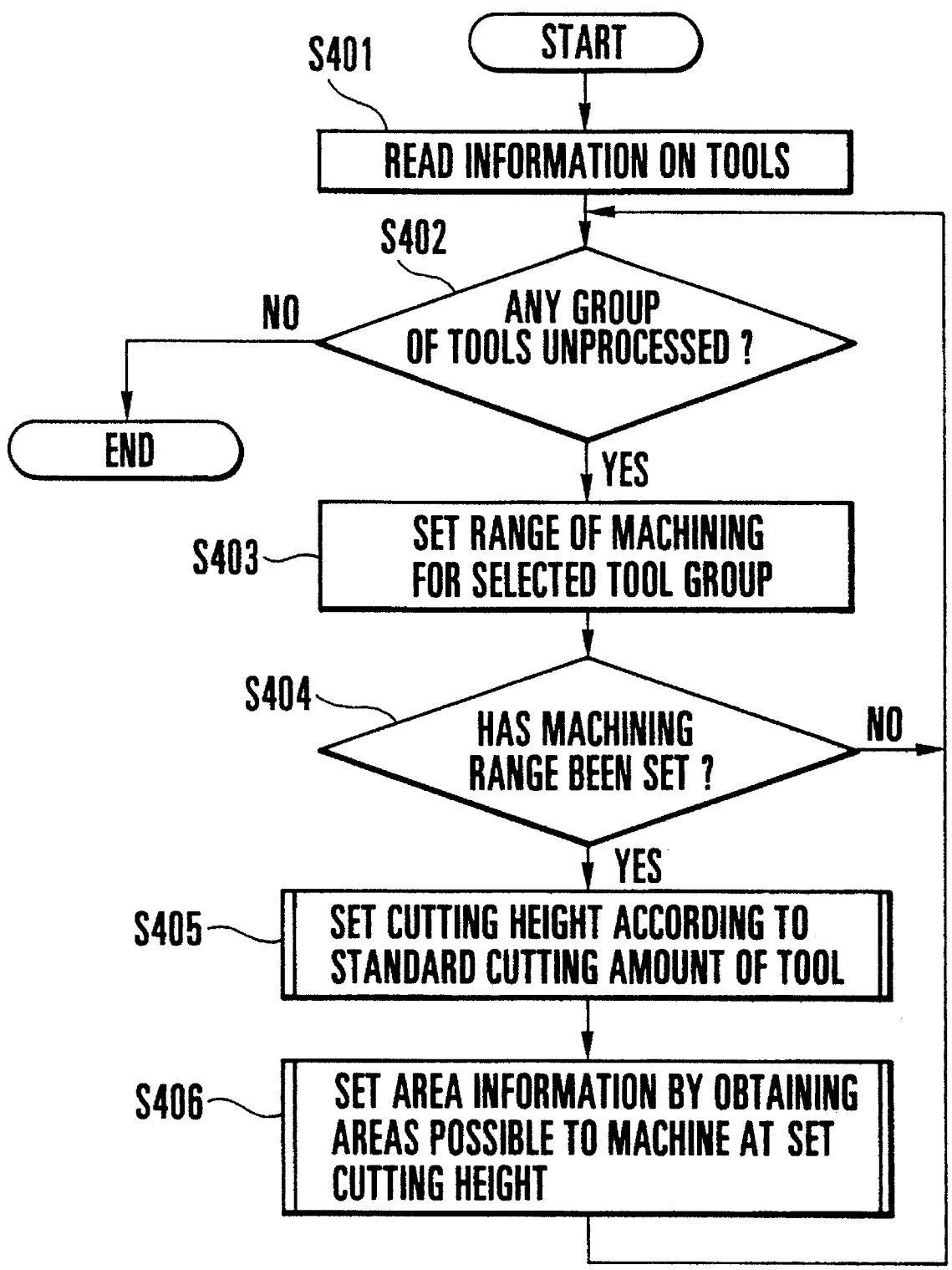
FIG. 41 is a flow chart showing the details of a standard cutting area setting process to be executed by a step S301 shown in FIG. 40.

FIG. 41 is a flow chart showing the details of the processes to be executed by the step S301 of FIG. 40. Referring to FIG. 41, at a step S401, the central processing unit 1 reads out the tool information stored in the storage device 3. The tool information is divided by the kinds and diameters of tools in the order of use of them. At least one of tools of different lengths is registered for each tool diameter. Standard machining conditions such as the standard cutting amount of tool, the material of the tool and the shape of the tool are registered for every one of the tools.

Figure 42:
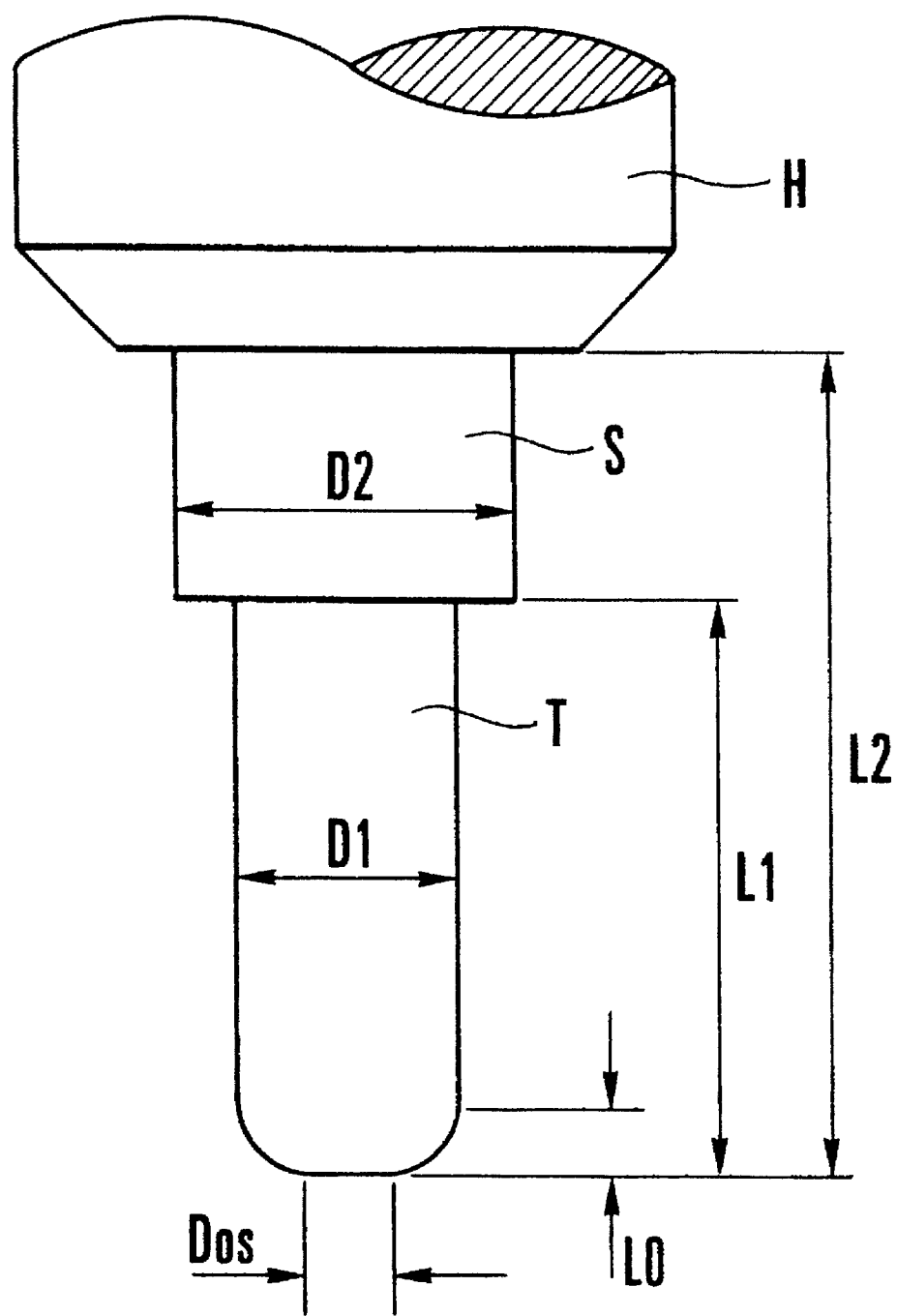
FIG. 42 shows the name of each of various parts of a tool and the shape of the tool.

FIG. 42 shows the shape of a tool. The tool is mounted on an NC machine tool at its shank part S by means of a holder part H. The diameter of side edge tip part is called a tool diameter Dos. The diameter of an escape part of the side edge is called a tool diameter D1. The diameter of the shank part S is called a shank diameter D2. The length of a part having an actual cutting edge is called a tool length L0. A length from the tip to the shank part S is called a tool length L1 and a length from the tip to the holder part H is called a tool length L2. In a case where the tool diameter D1 is equal to or larger than the tool diameter D2, the tool length L1 is equal to the tool length L2.

Referring to FIG. 41, the flow proceeds from the step S401 to a step S402. At the step S402, the central processing unit 1 searches tool information read out by the step S401. A check is made to find if there is any unprocessed tool group. If so, the flow comes to a step S403. At the step S403, the central processing unit 1 sets a machining range in the direction of depth for a selected tool group, making reference to the tool information and the machining information stored in the storage device 3 and taken out by the step S401. The machining range thus set is stored in the storage device 3. If no unprocessed tool group is found at the step S402, the process of setting areas which can be machined at the standard cutting amount of tool comes to an end.

Figure 43:
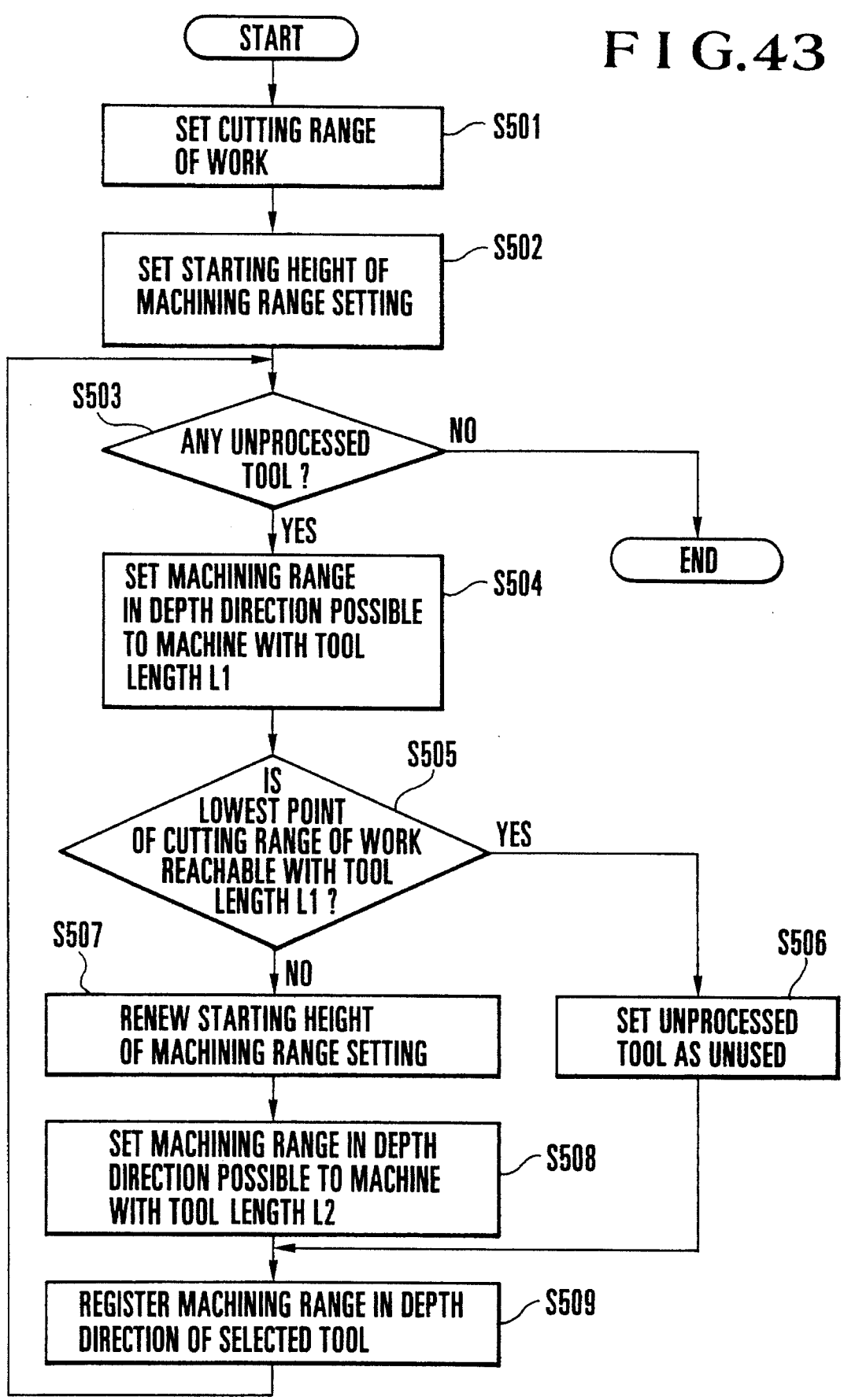
FIG. 43 is a flow chart showing the details of a machining range setting process to be executed at a step S403 of FIG. 41 for a selected group.

FIG. 43 is a flow chart showing the details of the step S403 of FIG. 41. FIG. 44 shows the machining range in the direction of depth of the tool. At a step S501 of FIG. 43, the central processing unit 1 obtains a maximum value of machining starting height and a minimum value of machining finish height shown in FIG. 44(b) by making reference to the machining information such as the machining starting and finish heights of the applicable area stored in the storage device 3. With these values obtained, the central processing unit 1 sets a cutting range of the work and stores it in the storage device 3. The flow then proceeds from the step S501 to a step S502. At the step S502, the central processing unit 1 sets a starting height of machining range setting by making reference to the maximum height of the work to be machined. Information on the starting height of machining range setting thus set is stored in the storage device 3.

At a step 503, a check is made to find if the selected tool group includes any tool for which the machining range in the direction of depth has not been set as yet. If there is no such tool, the process of setting the machining range in the direction of depth for the selected tool group comes to an end. If such a tool is found, the flow proceeds to a step S504. At the step S504, the central processing unit 1 sets the machining range in the direction of depth at which machining is possible at the tool length L1 of the selected tool by referring to the tool shape, the maximum height of the work, the maximum value of the machining starting height and the minimum value of the machining finish height which are set by the step S501 and the starting height of machining range setting which is set by the step S502. In this case, the maximum value of the machining starting height and the starting height of machining range setting shown in FIG. 44(c) are compared with each other and the starting height of the machining range in the direction of depth which can be machined at the tool length L1 of the selected tool is set at the smaller value of the two values compared. Further, the finish height of the machining range in the direction of depth machinable at the tool length L1 of the selected tool is determined by comparing a height obtained when the tool is lowered from the maximum height of the work as much as the tool length L1 with the machining finish height and is set at the smaller value of the two values compared.

At a step S505, the central processing unit 1 compares the height of the lowest point in the machining range in the depth direction set by the step S504 with the minimum value of the machining finish height set by the step S501 and thus makes a check to find if the lowest point of the cutting range of the work to be machined is reachable with the tool length L1. If so, the flow comes to a step S506. At the step S506, the central processing unit 1 associates an unused state indicating attribute with the unprocessed tool and stores information thereon in the storage device 3 as a processed tool. This is because, if the lowest point of the cutting range of the work is reachable with a tool Ts of a short tool length as shown in FIG. 44(d), it is not necessary to use a tool T1 which is of a longer tool length and of the same diameter as the tool Ts. If the lowest point of the cutting range of the work is judged to be not reachable with the tool length L1, the flow proceeds to a step S507. At the step S507, the central processing unit 1 refers to the machining range in the depth direction which is machinable with the tool length L1 of the selected tool and newly sets the starting height of machining range setting at the finish height of the machining range.

The flow proceeds from the step S507 to a step S508. At the step S508, the central processing unit 1 sets a machining range machinable in the depth direction with the tool length L2 by referring to the tool shape, the maximum height of the work, the starting height of machining range setting and the maxim value of the machining starting height and the minimum value of the machining finish height which are set by the step S501. The term "machining range machinable in the depth direction with the tool length L2" as used herein means a machinable range within which the work can be machined by allowing the shank part S of the tool to enter from the maximum height of the work as shown in FIG. 44(e). In this instance, in setting the finish height of the machining range in the depth direction which is machinable with the tool length L2 of the selected tool, the value of height obtained with the tool allowed to descend as much as the tool length L2 from the maximum height of the work is compared with the minimum value of the machining finish height. The finish height is set at the larger value of the two values compared. However, in a case where the tool diameter D2 is less than the tool diameter D1 as shown in FIG. 44(f), the tool lengths L1 and L2 become equal to each other and the machining range in the depth direction which is machinable with the tool length L2 is included in the machining range in the depth direction which is machinable with the tool length L1. Therefore, in that case, the machining range in the depth direction which is machinable with the tool length L2 is not set. The flow then proceeds to a next step S509. At the step S509, the central processing unit 1 stores information on the machining range in the depth direction of the selected tool in the storage device 3.

With the machining range setting process carried out in the above-stated manner, the machining ranges of one group of tools which are equal in diameter but differ in length is set as shown in FIG. 44(g). In the case of this drawing, three tools are registered as one group of tools. In this case, central processing unit 1 sets a machinable range with the tool length L1 of each tool and a machinable range with the tool length L2 of each tool.

Coming back to the flow chart of FIG. 41, at the step S404, a check is made to find if the machining range has been set. If so, the flow proceeds to a step S405. At the step S405, the central processing unit 1 sets the cutting height of the tool belonging to the selected tool group by referring to the machining ranges in the depth direction set by the step S403 and the tool information such as the standard cutting amount of tool, etc., and machining information such as the maximum height, etc., which are stored in the storage device 3. Information on the cutting height set is stored in the storage device 3.

Figure 45:
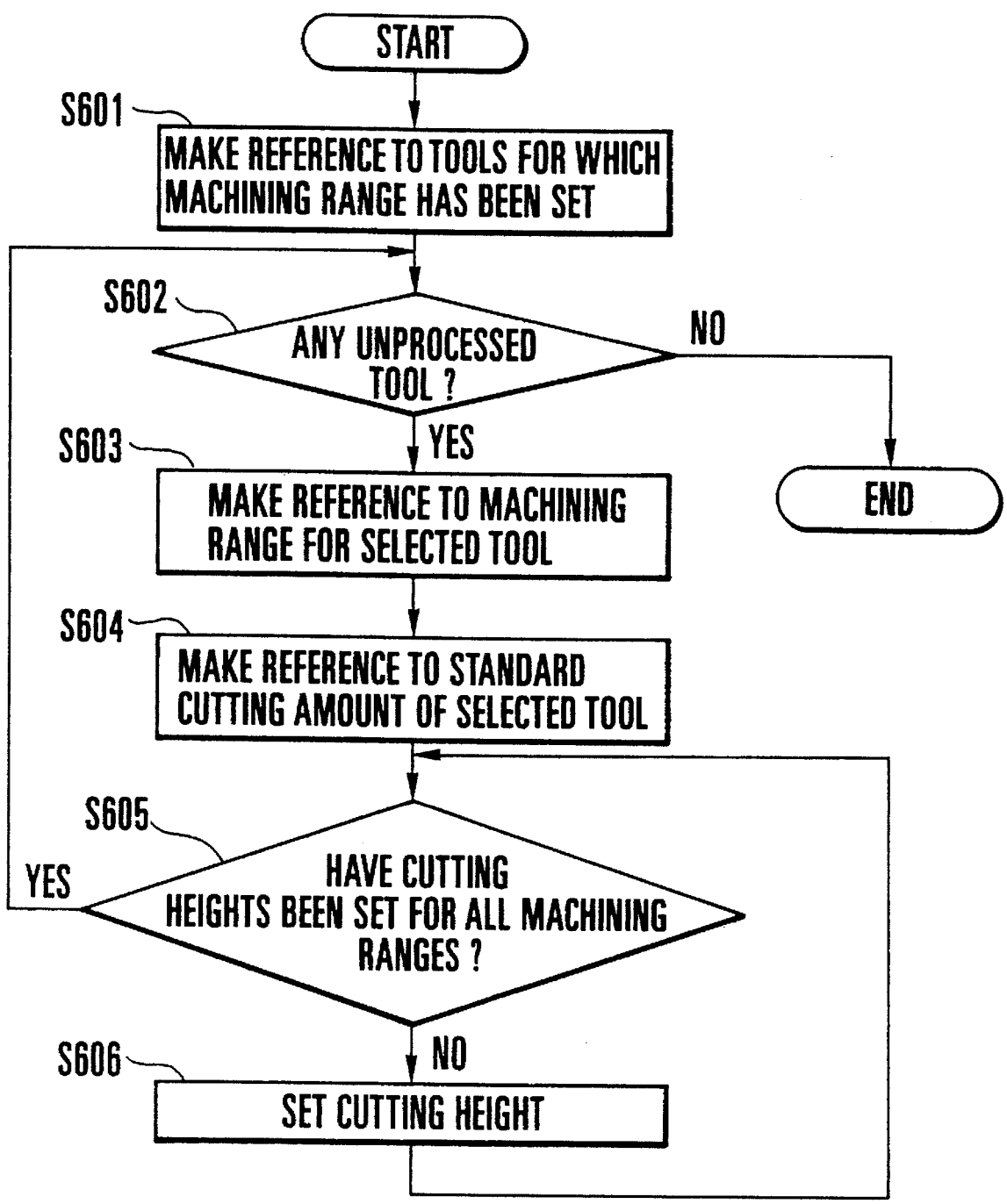
FIG. 45 is a flow chart showing the details of a cutting height setting process to be executed at a step S405 of FIG. 41 according to a standard cutting amount of tool.

FIG. 45 is a flow chart showing the details of the processes to be executed at the step S405 of FIG. 41. At a step S601 of FIG. 45, the central processing unit 1 makes reference to the attributes indicating the unused state of the tool and cutting ranges in the direction of depth which are stored in the storage device 3 and thus reads out tools for which the cutting ranges in the depth direction have been set. At a step S602, a check is made for any tool that has not been subjected to the process of setting a cutting height. If no unprocessed tool is found, the process of setting cutting heights according to the standard cutting amount of tool comes to an end. In a case where no tool information is read out by the step S601, the process is executed in the same manner as in the case where no unprocessed tool is found.

If the presence of any unprocessed tool is found at the step S602, the flow proceeds to a step S603. At the step S603, the central processing unit 1 makes reference to information on the machining range in the depth direction of the selected tool stored in the storage device 3. At a step S604, the central processing unit 1 makes reference to the standard cutting amount of the selected tool through the tool information stored in the storage device 3. At a next step S605, a check is made to find if the cutting heights have been set for all the machining ranges (including the machinable range with the tool length L1 and the machinable range with the tool length L2) of the tools selected. If so, the flow comes back to the step S602. If not, the flow proceeds to a step S606. At the step S606, the central processing unit 1 sets the cutting height by referring to the standard cutting amount and the machining range in the depth direction of the selected tool.

Figure 46A:
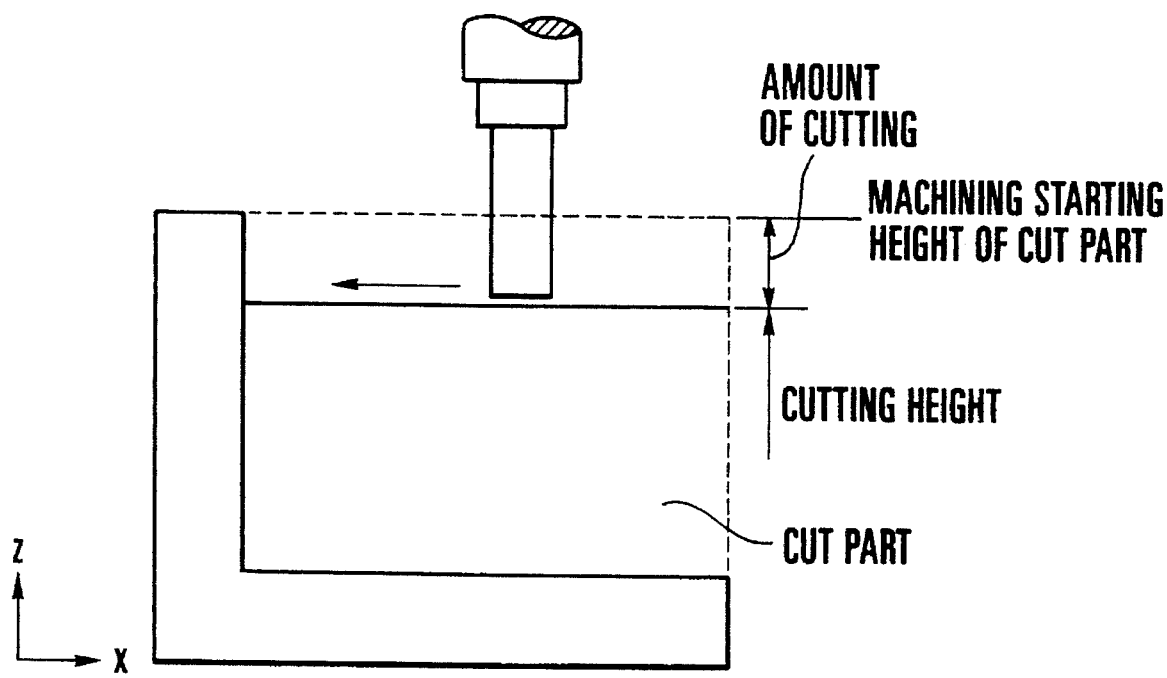
FIGS. 46(a) to 46(d) show how the cutting height is set.
Figure 46B:
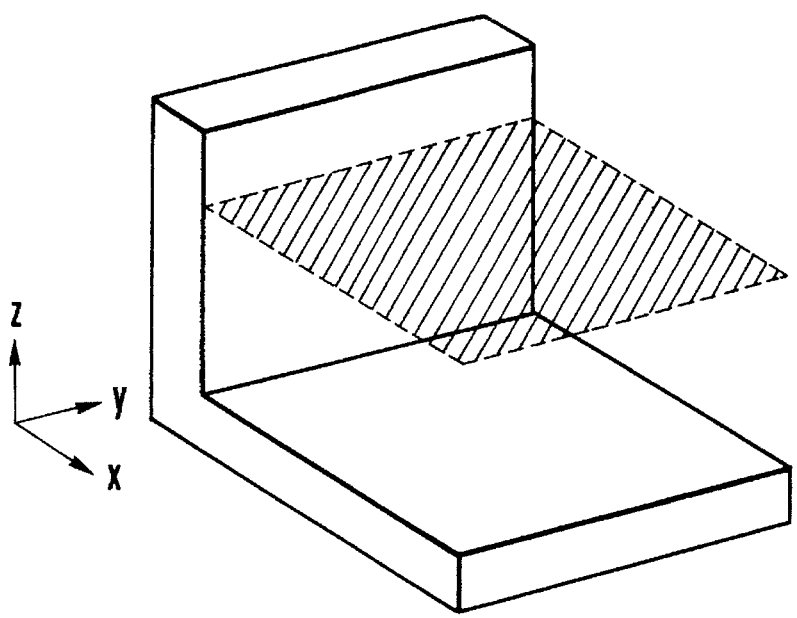
Figure 46C:
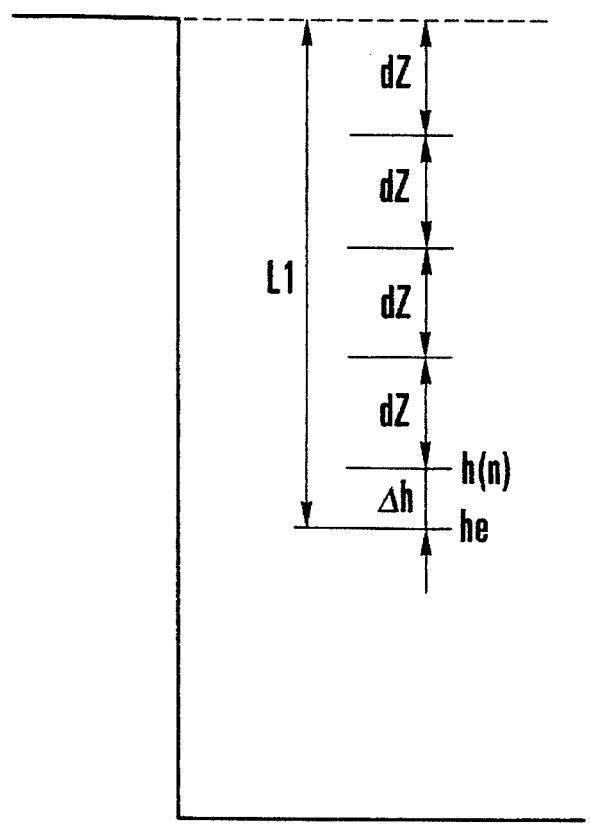

Among FIGS. 46(a) to 46(d) which show the cutting height setting process, FIGS. 46(a) and 46(b) show a case where the cutting part of a work is machined by causing the tool to descend a predetermined distance and then to horizontally move at the lowered height. In this case, the amount of descent in the direction of depth of the tool represents a cutting amount. A locus of movement of the tip of the tool represents a cutting face. The Z value of a cutting face represents a cutting height. With the standard cutting amount of the selected tool assumed to be "dZ", the starting height of machining range in the depth direction to be "hs" and the finish height to be "he", the cutting height can be expressed by the following formula:

$$h(i) = hs - i \cdot dz \quad (i = 1, 2, \cdots n) \tag{1}$$

wherein n represents a quotient obtained by dividing the machining range (hs - he) by the standard cutting amount dz of the selected tool.

Figure 46D:
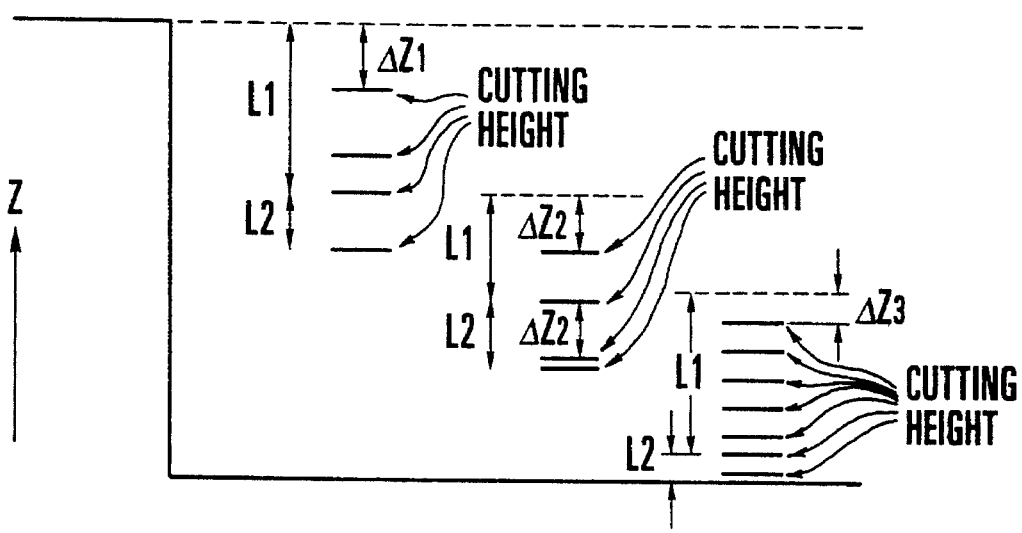

Further, with the finish height of the machining range in the depth direction "he" compared with the cutting height "h(n)", if a difference between them is larger than a machining minimum cutting amount set as a machining condition (cutting is possible to an extent obtained by adding this value to the standard cutting amount), the finish height "he" of the machining range in the depth direction is added to the cutting height. The cutting amount obtained in this case is smaller than the standard cutting amount of the tool. However, the cutting amount setting process is performed in the same manner as the process of setting an area machinable at the standard cutting amount of the tool. The central processing unit 1 then stores information on the cutting height which is set in this manner in the storage device 3. Cutting heights are thus set for one group of tools for which the machining ranges in the depth direction have been set. FIG. 46(d) shows a cutting height setting example where the standard cutting amounts of first, second and third tools which are of the same diameter but have different lengths are set respectively at $\Delta Z1$, $\Delta Z2$ and $\Delta Z3$.

Again referring to the flow chart of FIG. 41, at a step S406, the central processing unit 1 obtains an area to which each tool can be moved for cutting, by making reference to the cutting height of the tool set at the step S405 according to the standard cutting amount of the tool, the tool information read out at the step S401 and 2.5D data and machining information which are stored in the storage device 3 and by considering possible interference with the work to be machined at each cutting height. Information on cutting heights and machining areas are prepared for the selected tools in this manner. The machining area information prepared in this manner includes a parent-child relationship, as will be described later, and a tree structure of machining area information for the selected tools, i.e., a machining area lookup tree, is prepared. The central processing unit 1 then adds information on the selected tools to the machining area lookup tree and stores it in the storage device 3.

Figure 47:
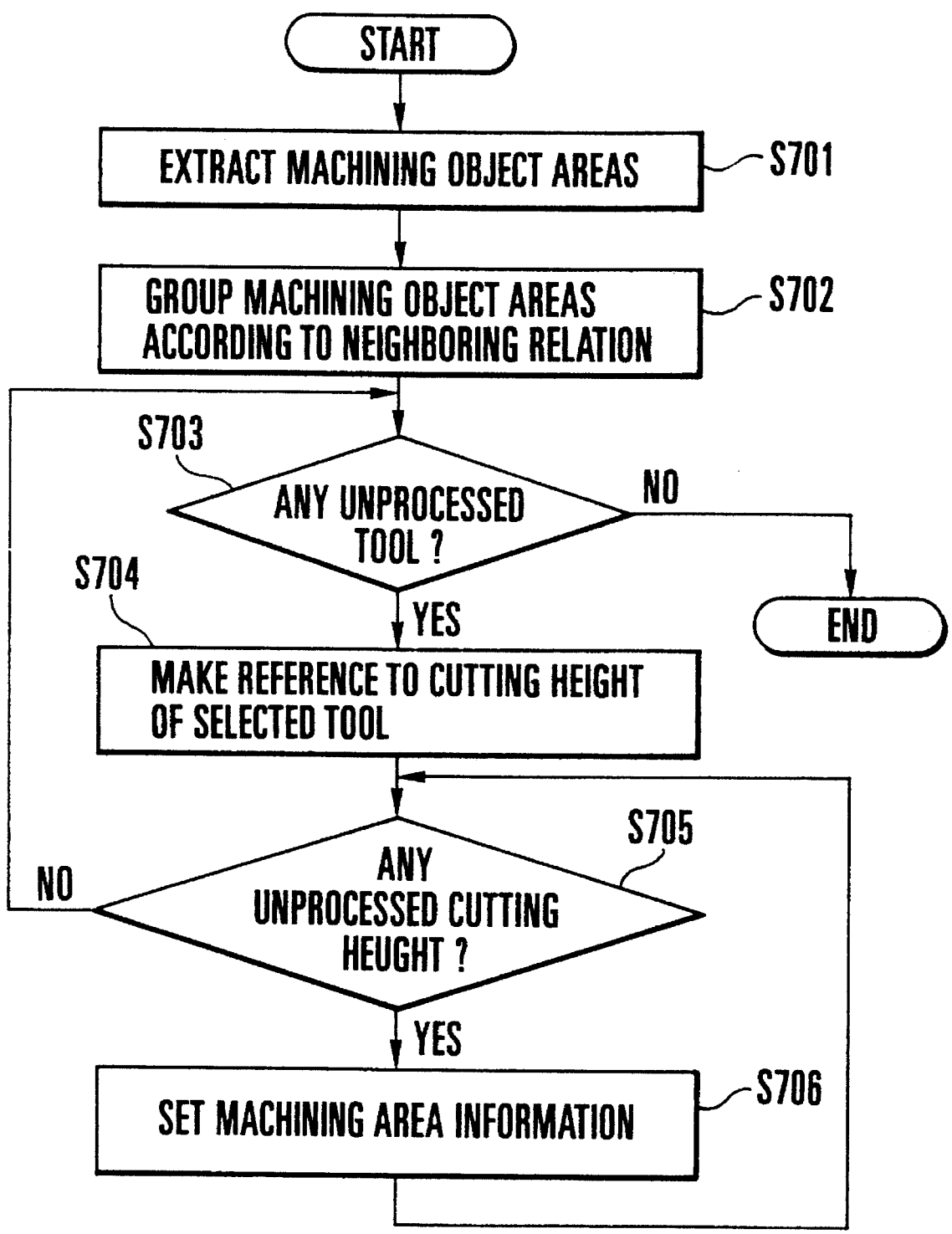
FIG. 47 is a flow chart showing the details of a step S406 shown in FIG. 41.

FIG. 47 is a flow chart showing the details of the processes to be executed by the step S406 of FIG. 41. At a step 701 of FIG. 47, the central processing unit 1 makes a check for the presence of any cutting part by searching the machining information stored in the storage device 3, such as the machining starting height and the machining finish height of each area. If any cutting part is found, the part or parts are extracted as machining object areas and the flow proceeds to a step S702. At the step S702, the central processing unit 1 makes reference to information on the neighboring relation between the areas stored in the storage device 3 and classifies the areas read out by the step S701, according to the neighboring relation, into groups of machining object areas. The machining object areas are stored in the storage device 3.

FIGS. 39(a) to 39(c) referred to in the foregoing show the process of grouping the machining object areas by their neighboring relation. An example of grouping the machining object areas is illustrated by FIGS. 39(a) and 39(b). As shown, the machining object areas r1 to r9 are divided into a group consisting of the machining object areas r1 to r4 and a group consisting of the machining object areas r6 to r9 according to their neighboring relation. The machining object area can be taken out for every one of the cutting areas through the processes described. It is generally practiced to divide the cutting parts into parts (1) to (8) as shown in FIG. 39(c) and to perform cutting machining in sequence from (1) to (8).

After the step S702 of FIG. 47, the flow comes to a step S703. At the step S703, a check is made for the presence of any unprocessed tool, i.e., any tool that has not been subjected to the machining area setting process. If no unprocessed tool is found, the process of preparing machining area information is terminated. If any unprocessed tool is found at the step S703, the flow comes to a step S704. At the step S704, the central processing unit 1 reads out the cutting height of the selected tool stored in the storage device 3 to make reference thereto. At a step S705, a check is made for any unprocessed cutting height on the basis of the cutting heights of the selected tools read out. If no unprocessed cutting height is found at the step S705, the flow comes back to the step S703. If any unprocessed cutting height is found, the flow proceeds to a step S706. At the step S706, the central processing unit 1 sets machining area information by making reference to the 2.5D data, tool information and machining information stored in the storage device 3. The machining area information which is thus set is stored in the storage device 3.

Figure 48:
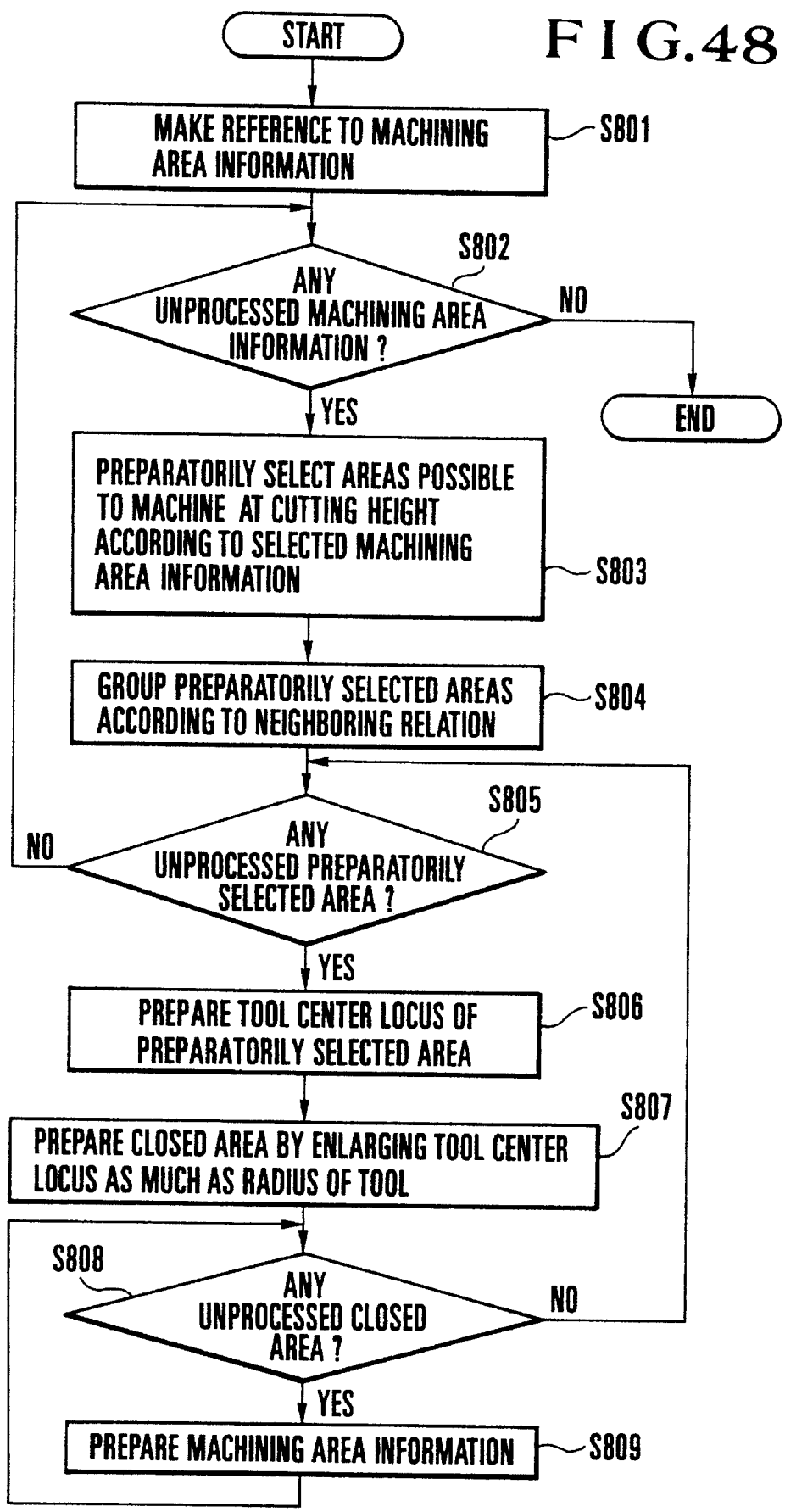
FIG. 48 is a flow chart showing in detail how information is prepared by an improvement example for a machining area to be machined according to the standard cutting amount of tool.

FIG. 48 shows in a flow chart the process of preparation of information on the machining areas while FIG. 49 shows machining information. The details of the process of preparation of machining areas are described with reference to FIGS. 48 and 49 as follows:

At a step S801 of FIG. 48, the central processing unit 1 makes reference to the machining area information stored in the storage device 3 to give attention to machining area information set for a cutting height which is higher by one step than a selected cutting height. The machining area information is assumed to be R (n, id), indicating the machining area information on a group id of an n-th pick feed. The machining area information consists of cutting heights, cutting areas and areas having parts in common with the cutting areas. The units of machining area information are interconnected by a tree structure, which permits deciding the order of machining sequence by tracing from a parent unit of machining area information to a child unit of machining area information. The n-th pick feed means a cutting face obtained by cutting "n" times in the direction of depth. The group id represents a value uniquely set for every pick feed.

In the process, a first pick feed can be universally handled by processing the information prepared by a step S702 of FIG. 47 into machining area information R (0, id), id=1, 2, - - - . In the following description, the selected cutting height is assumed to be the cutting height of the cutting face of an i-th pick feed. More than one units of machining area information are set at a cutting height ((i−1)st pick feed)) which is higher by one step than the selected cutting height. Therefore, at the step S801, all units of machining area information T (i−1, id), wherein i=1, 2, - - - , are taken out.

The flow then comes from the step S801 to a step S802. At the step S802, the machining area information R (i−1, id) is checked to find if it includes any machining area for which the process of setting machining areas of the selected cutting height (i-th pick feed) has not been executed as yet. If not, the process of setting information on the cutting heights of machining areas is terminated. If so, the flow proceeds to a step S803. At the step S803, the central processing unit 1 makes reference to areas included in the selected machining area information and selects preliminarily selected areas by reading out information on the height of each of the areas from the storage device 3 and by comparing it with the selected cutting height.

Figure 49A:
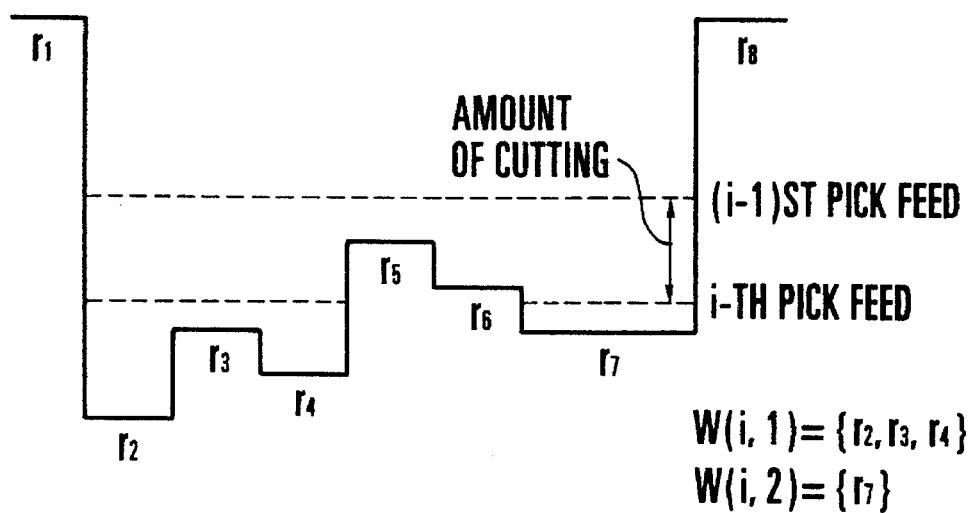
FIGS. 49(a) to 49(f) show processes of setting information on machining areas.

The preliminarily selected areas include all the areas to be machined by the i-th pick feed and are defined as areas W(i,0). For the areas W(i,0), areas which are machinable with at the selected cutting height is selected, as selected machining area information R(i-1,j), from among areas belonging to one of the units of (i-1)st machining area information. In the case of the machining area setting process shown in FIG. 49(a), areas r2, r3, r4 and r7 which can be cut by (i)-th pick feed are read out as the preliminarily selected areas W(i,0) from the machining area information R(i-1,j) of the (i-1)st pick feed.

The flow comes from the step S803 to a step S804. At the step S804, the central processing unit 1 further divides the preliminarily selected areas W(id) read out by the step S803 into preliminarily selected groups on the basis of the neighboring relation. The preliminarily selected groups are stored in the storage device 3. The preliminary selection is defined as W(ik) (wherein k represents the preliminarily selected group id and k=1, 2, - - - ). In the case of FIG. 49(a), adjacent areas among the preliminarily selected areas W(i,0) are grouped together into a group W(i,1) which consists of the areas r2, r3 and r4 and a group W(i,2) which consists of the area r7.

The flow then proceeds to a step S805. At the step S805, the preliminarily selected groups divided at the step S804 are read out one after another. A check is made to find if these groups include any unprocessed preliminarily selected group that has not been subjected to the machining area information setting process as yet. If not, the flow comes back to the step S802. If so, the flow proceeds to a step S806. At the step S806, the central processing unit 1 reads out from the storage device 3 the graphic form data of areas belonging to the preliminarily selected group. Then, the graphic form data of any area that is higher than the cutting height is read out from the storage device. An area within which the tool is movable is prepared by reading out from the storage device 3 information on the height of each area and by comparing it with the selected cutting height, considering possibility of any high interference area where the work to be machined would interfere with the tool to prevent the tool from entering there. After that, a tool center locus is prepared by reducing the area thus obtained as much as the radius of the tool (tool diameter D½).

The flow comes from the step S806 to a step S807. At the step S807, the central processing unit 1 prepares a closed area by enlarging as much as the tool radius the tool center locus prepared at the step S806. The closed area thus prepared is stored in the storage device 3. The closed area prepared by enlarging the tool center locus as much as the radius of the tool is an area where the tool can enter a cutting part at the cutting height without interfering with the work to be machined. In a case where no tool center locus is prepared by the step S806, the closed area preparing process is not executed.

Figure 49B:
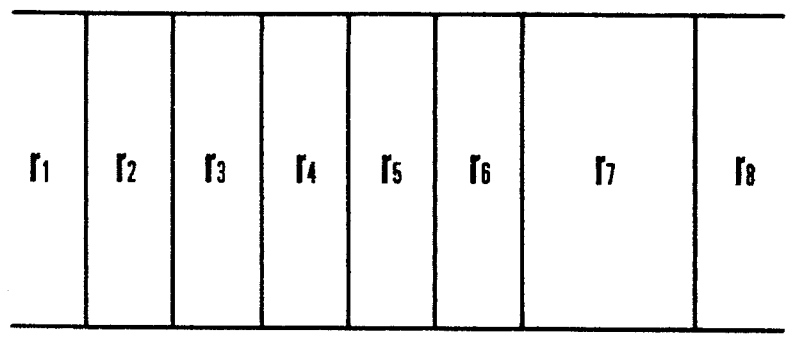
Figure 49C:
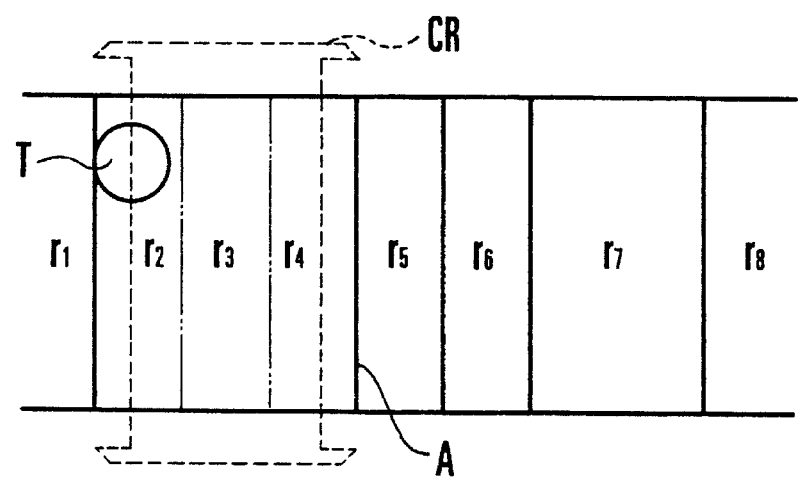
Figure 49D:
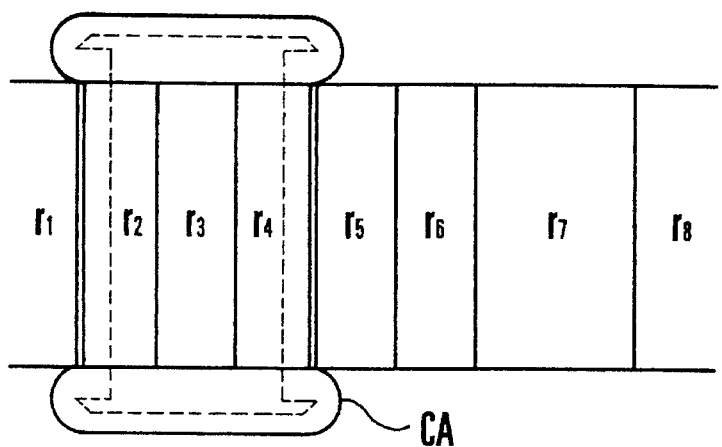
Figure 49E:
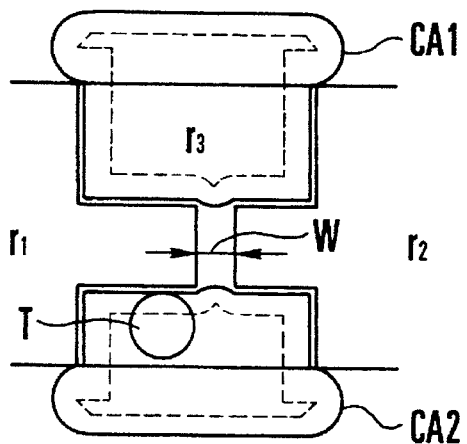
Figure 49F:
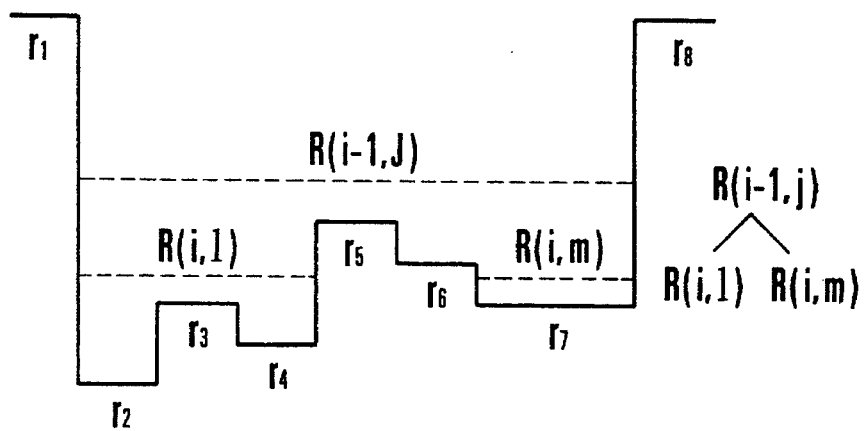

FIG. 49(b) is a plan view of FIG. 49(a) taken in the direction of Z. FIG. 49(c) shows a tool center locus CR prepared for the preliminarily selected group W(i,1) with a reference symbol T assumed to denote the tool and a symbol A to denote a composite shape of the areas of the preliminarily selected group W(i,1). FIG. 49(d) shows a closed area CA obtained by enlarging the tool center locus as much as the radius of the tool. In FIG. 49(e), reference symbols r1 and r2 denote areas higher than the cutting height. In this case, the composite area (area r3) of the preliminarily selected group includes a narrow part W which prevents the passage of the tool T. Therefore, the closed area CA prepared consists of a plurality of closed areas CA1 and CA2 (two in this case).

The flow comes from the step S807 to a step S808. At the step S808, the closed areas prepared at the step S807 are examined one after another to find if they include any unprocessed closed area. If not, the flow comes back to the step S805. If so, the flow proceeds to a step S809. At the step S809, the central processing unit 1 reads out areas belonging to any preliminarily selected group that has some part in common with the closed areas prepared at the step S807. The central processing unit 1 then prepares machining area information consisting of information units including cutting heights, cutting ranges (closed areas), a parent-child relation, etc. The machining area information thus prepared is stored in the storage device 3. In the case of FIG. 49(a), the machining area information R(i,1) is composed of the component areas r2, r3 and r4 of the preliminary selected group in attention having parts in common with the closed area which is as shown in FIG. 49(d) and is prepared by enlarging the tool center locus as much as the radius of the tool. Then, a parent-child relation wherein the machining area information R(i-1,j) is a parent and the machining area information R(i,1) is a child is set. Then, machining area information R(i,m) which is composed of the area r7 is likewise set with the machining area information R(i-1,j) as a child.

(Nonstandard Cutting Area Setting Step)

Referring again to FIG. 40, at the step S302, the central processing unit 1 reads out information on the graphic form of each area from the machining area information and the 2.5D data stored in the storage device 3, the machining starting height, the machining finish height and the maximum height of the work to be machined from the machining information and the shape of the tool from the tool information. The central processing unit 1 searches these units of information for cutting parts and prepares machining areas within which cutting parts are to be machined at a cutting amount smaller than the standard cutting amount of the tool. The machining area information thus prepared is stored in the storage device 3 in addition to the machining area information prepared by the step S301.

Figure 50:
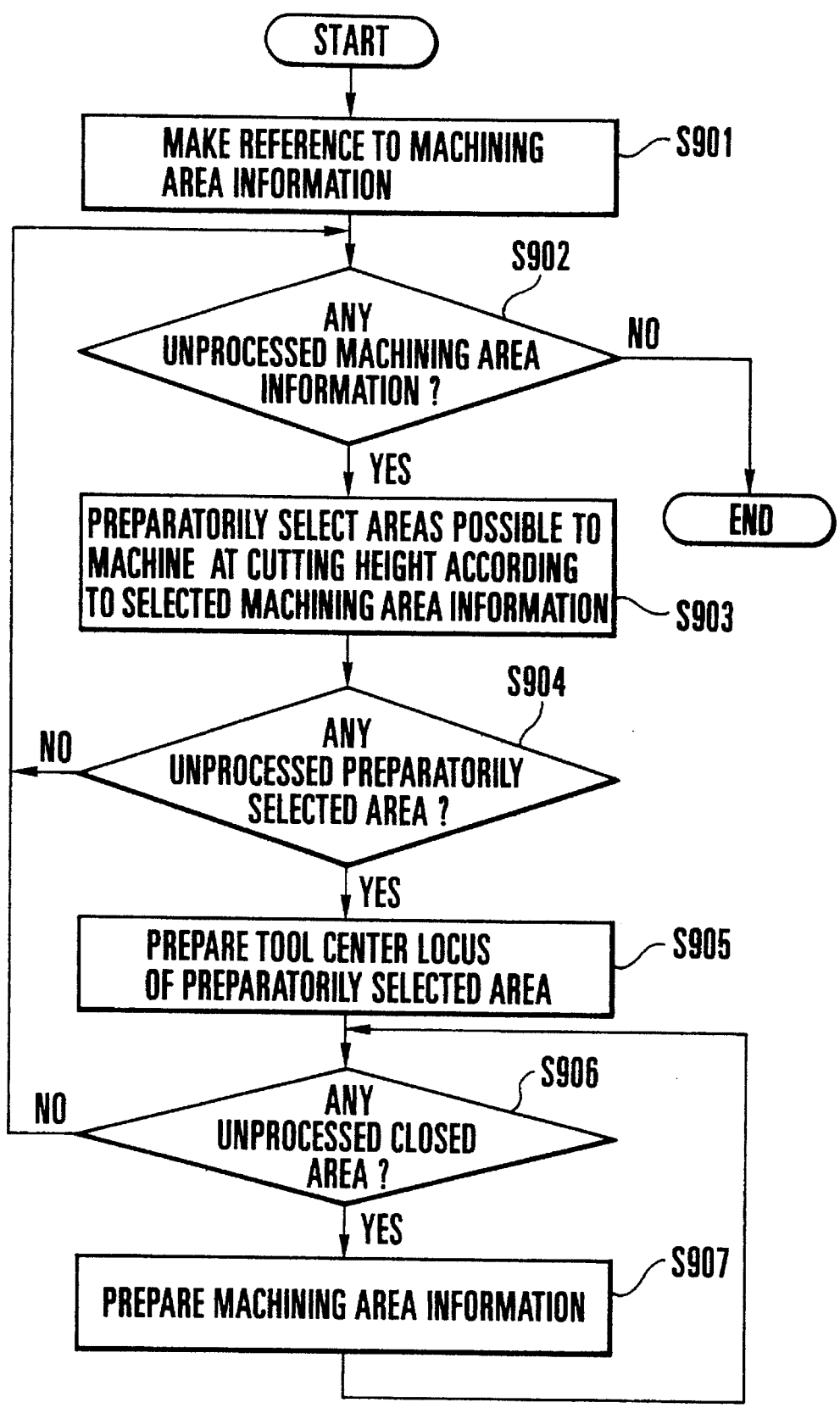
FIG. 50 is a flow chart showing in detail the process to be executed at the step S302 of FIG. 40.

FIG. 50 is a flow chart showing the details of the processes of the step S302 of FIG. 40. At a step 901 of FIG. 50, the central processing unit 1 reads out, from the storage device 3, information defined in machining area information R(n,id) for areas machinable at the standard cutting amounts of tools by dividing it by tools. At a next step S902, a check is made, on the basis of the machining area information read out by the step S901, to find if there is any unprocessed machining area information which has not been processed as yet. If not, the process of setting areas to be machined at a smaller cutting amount than the standard cutting amount of the tool is terminated. If any unprocesssed machining area information is judged to exist at the step S902, the flow proceeds to a step S903. At the step S903, the central processing unit 1 reads out areas belonging to the selected machining area information. If the areas read out is not included in the machining area information which is a child of the selected machining area, these areas are extracted as areas to be machined at a smaller cutting amount than the standard cutting amount of the tool. Information on the areas thus extracted is stored in the storage device 3. If the selected machining area information does not have any child, the area extracting process is not executed.

At a step S904, a check is made to find if any area that is to be machined at a smaller cutting amount is extracted by the step S903. If not, the flow comes back to the step S902. If so, the flow proceeds to a step S905. At the step S905, the central processing unit 1 rearranges the machining finish heights of the areas read out by the step S903 in the order of lower machining finish heights. The flow then comes from the step S905 to a step S906. At the step S906, a check is made to find if there is any unprocessed area that has not been subjected to the process of setting machining area information. If not, the flow comes back to the step S902. If so, the flow proceeds to a step S907. At the step S907, the central processing unit 1 sets machining area information for the area in attention by obtaining its cutting height and another area which is adjacent to the area in attention, has lower machining finish height than the area and has not been subject to the machining area information setting process. The machining area information thus set is stored in the storage device 3.

Figure 51:
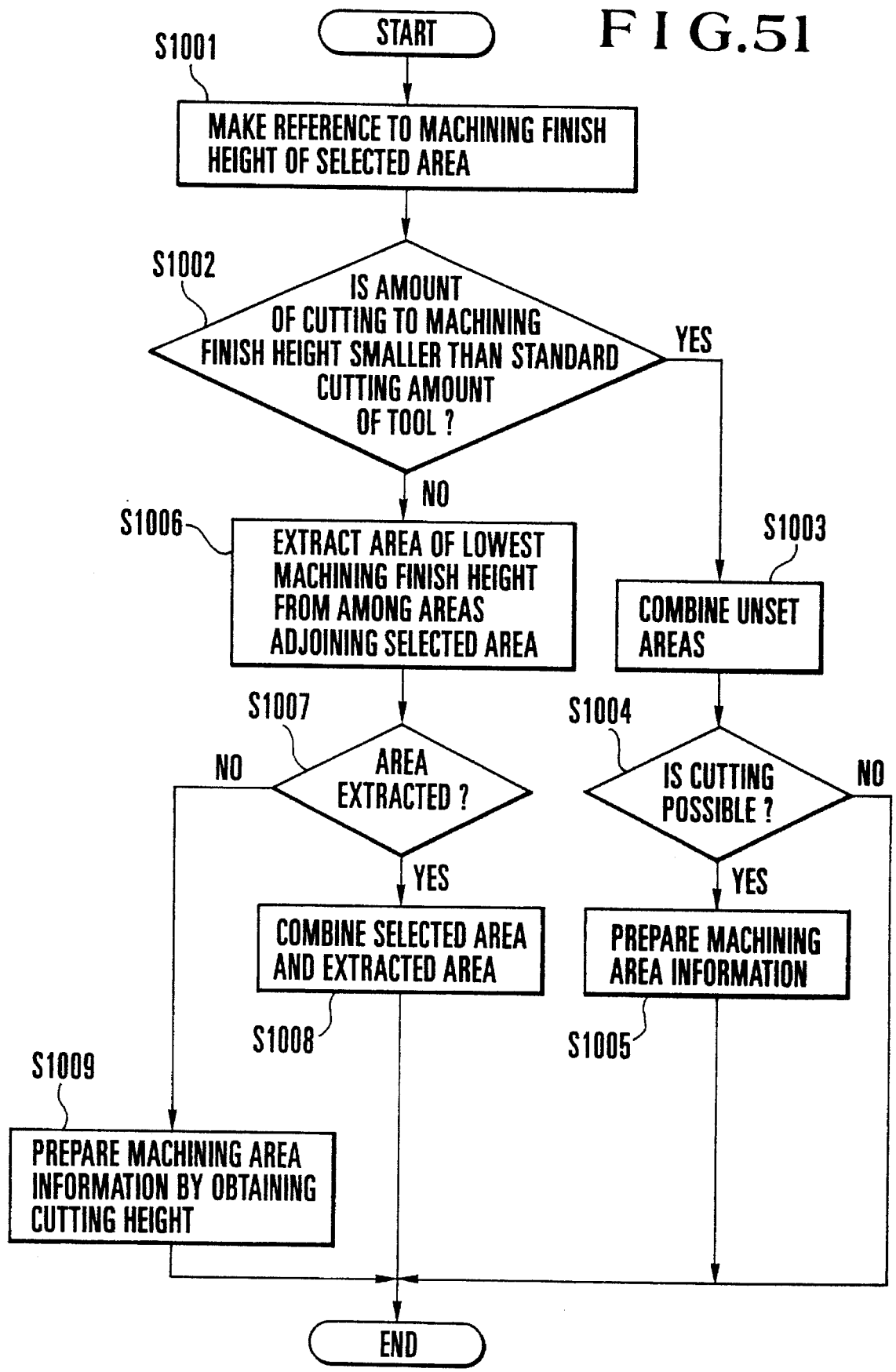
FIG. 51 is a flow chart showing in detail the process to be executed at a step S907 shown in FIG. 50.

FIG. 51 is a flow chart showing the details of the processes of the step S907 of FIG. 50. At a step 1001 of FIG. 51, the central processing unit 1 reads out, from the storage device 3, the machining finish height of the machining area in attention (the selected machining area). At a step S1002, a check is made to find if a cutting amount from a selected cutting height to the machining finish height (entering depth) is smaller than the standard cutting height of the tool. If so, the flow comes to a step S1003 and, if not, to a step S1006.

At the step S1003, the central processing unit 1 makes a search for any area that is located adjacent to the area in attention, having lower machining finish height than the latter, and has not been subject to the process of setting machining area information. If any such unset area is found to exist, the central processing unit 1 obtains a machining object area by combining the closed areas of the areas. If not, the closed area of the machining area in attention is regarded as the machining object area. The flow then proceeds to a step S104. At the step S104, the central processing unit 1 makes a check on the basis of the tool center locus of the machining object area prepared to find if cutting is possible. If not, a cutting height and a machining area are obtained and machining area information is set to terminate the processes. If the cutting is found to be possible, the flow proceeds to a step S1005.

At the step S1005, the central processing unit 1 sets the cutting height at the machining finish height of the selected area and prepares machining area information by allotting areas which can be cut to every tool center locus. The machining area information thus prepared is stored in the storage device 3.

If, on the other hand, the cutting amount (entering depth) from the selected cutting height to the machining finish height is judged at the step S1002 to be larger than the standard cutting amount of the tool, the flow proceeds to a step S1006. At the step S1006, the central processing unit 1 obtains an area which has the lowest machining finish height from among areas adjoining the selected area. The machining finish heights of the areas obtained are compared with each other and an area having the lowest machining finish height is extracted. At a next step S1007, a check is made to find if the area extracting process has been executed at the step S1006. If so, the flow comes to a step S1008. If not, the flow comes to a step S1009.

At the step S1008, the central processing unit 1 combines the area extracted by the step S1006 with the selected area. The attribute of the extracted area is set to be machinable when attention is given to the extracted area. The attribute is stored in the storage device 3. At the step S1009, the central processing unit 1 computes how far the tool can intrude into the selected area and sets machining area information with a possible height of intrusion thus obtained. The machining area information is stored in the storage device 3.

Figure 52A:
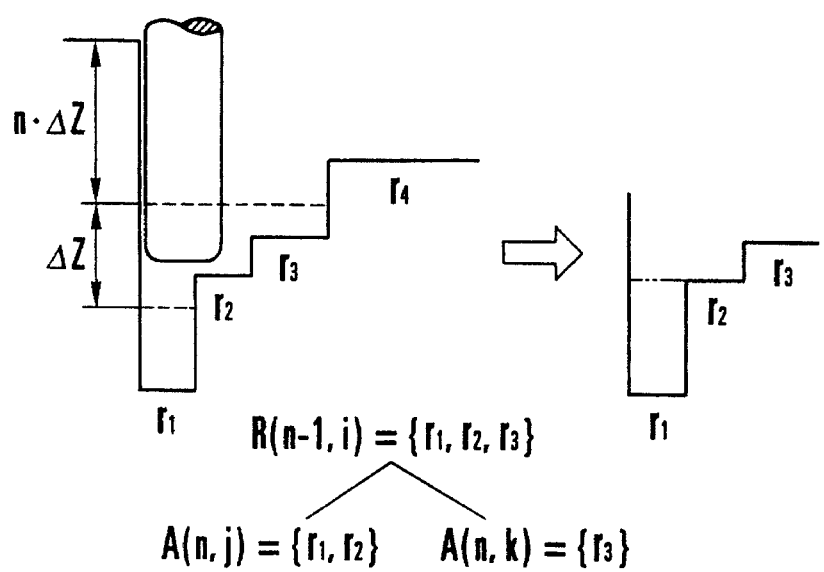
FIGS. 52(a) to 52(c) show a process of setting information on a machining area to be machined to a cutting amount which is smaller than the standard cutting amount of tool.
Figure 52B:
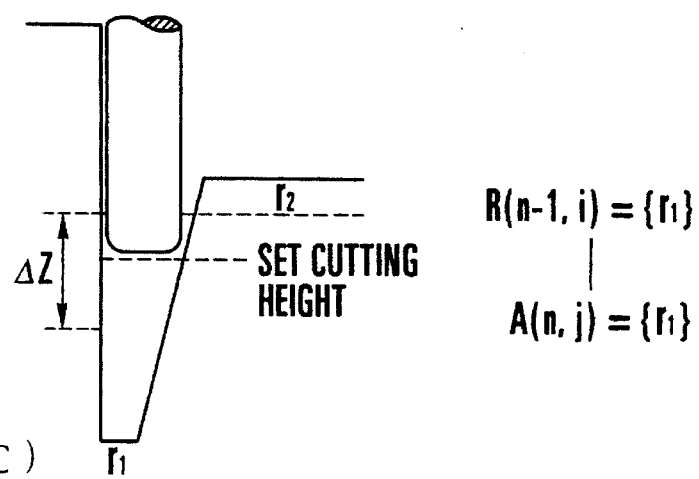
Figure 52C:
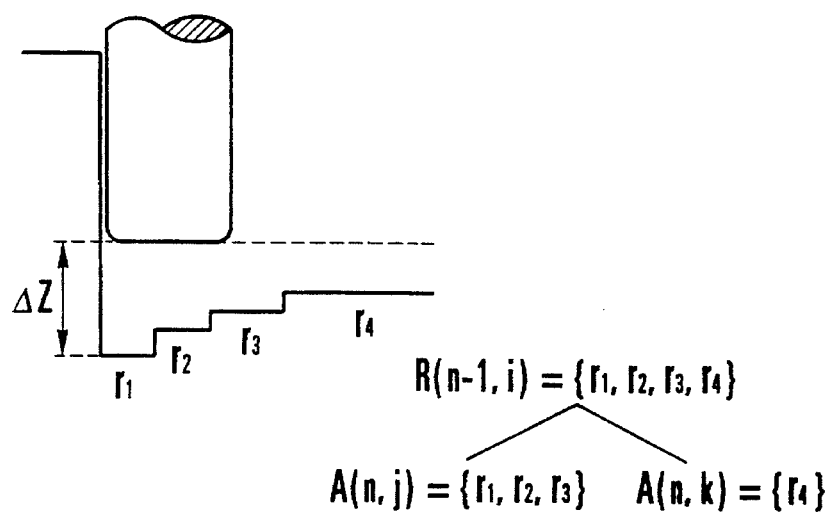

FIGS. 52(a) to 52(c) show the processes of setting information on machining areas to be machined at a smaller cutting amount than the standard cutting amount of the tool. FIG. 52(a) shows a case where the area r1 is combined with the area r2, when attention is given to the area r1 at the step S1008, and the machining area information is set for the areas r1 and r2 when attention is given to the area r2 at the step S1005. As shown in FIG. 52(a), the machining area setting information on the area to be machined at a smaller cutting amount than the standard cutting amount of the tool is assumed to be A(n,id). The machining area information A(n,id) is in a parent-child relation to the machining area information R(n-1,i) on an area which is machinable at the standard cutting amount of the tool. In relation to the machining area information R(n-1,i), machining area information A(n,j) is composed of the areas r1 and r2 and has its cutting height at the machining finish height of the area r2. Further, machining area information A(n,k) is composed of the area r3 and has its cutting height at the machining finish height of the area r3. In preparing a tool path, the machining priority is in the order of the lower cutting height and is thus in the sequence of A(n,j), A(n,k).

FIG. 52(b) shows a case where there exists an area having the amount of cutting to the machining finish height larger than the standard cutting amount of the tool as the tool does not intrude into the area and where no adjoining area is found at the step S1006. In this case, at step S1009, the embodiment obtains the intruding height of the tool, considers the tool intruding height to be a cutting height and sets the machining area information A(n,j).

In the case of FIG. 52(c), there exist only such areas where the cutting amount to the machining finish height is smaller than the standard cutting amount of the tool. In this case, the embodiment decides that the cutting is impossible at the step S1004 as the tool cannot enter into the areas r1 and r2. The areas r1 and r2 are combined with the area r3 when attention is given to the area r3. The machining area information is then composed of the areas r1, r2 and r3 with the cutting height set at the machining finish height of the area r3 and it is thus prepared as the machining area information A(n,j). After that, the machining area information A(n,k) which is composed of the area r4 is prepared with the cutting height set at the machining finish height of the area r4.

Through the processes described above, a tree structure (a machining area search tree) of machining area information is prepared for all the tools registered.

Figure 53A:
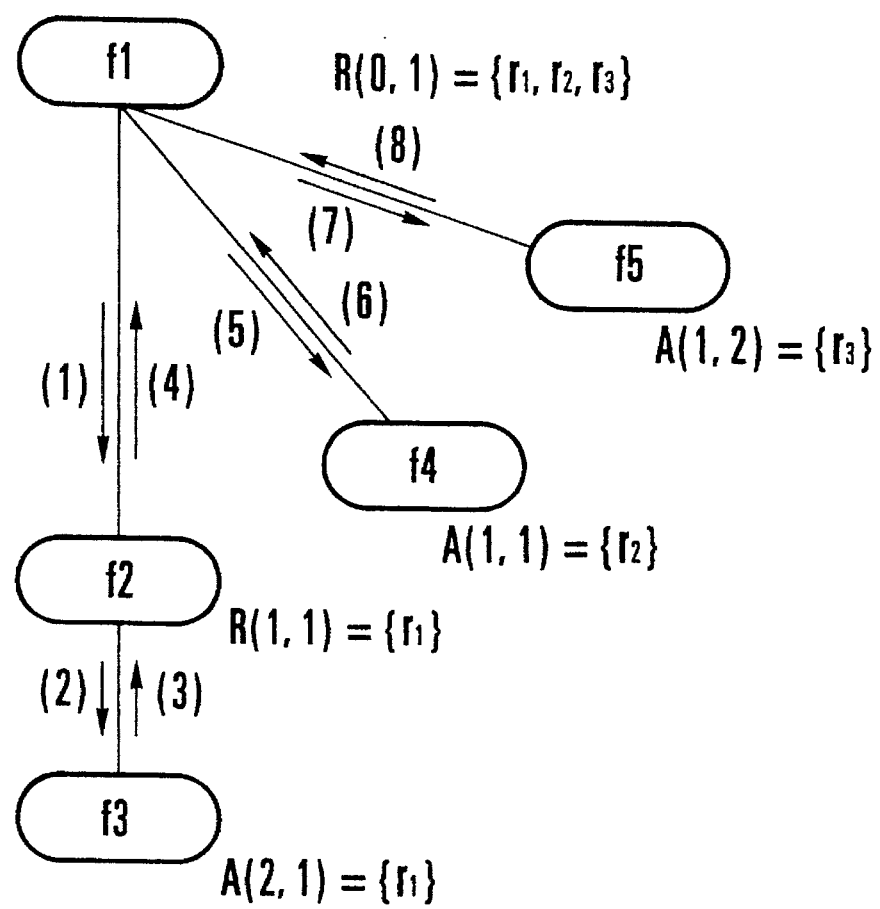
FIGS. 53(a) and 53(b) show the tree structure of machining area information and machining procedures to be carried out by an example of improvement.
Figure 53B:
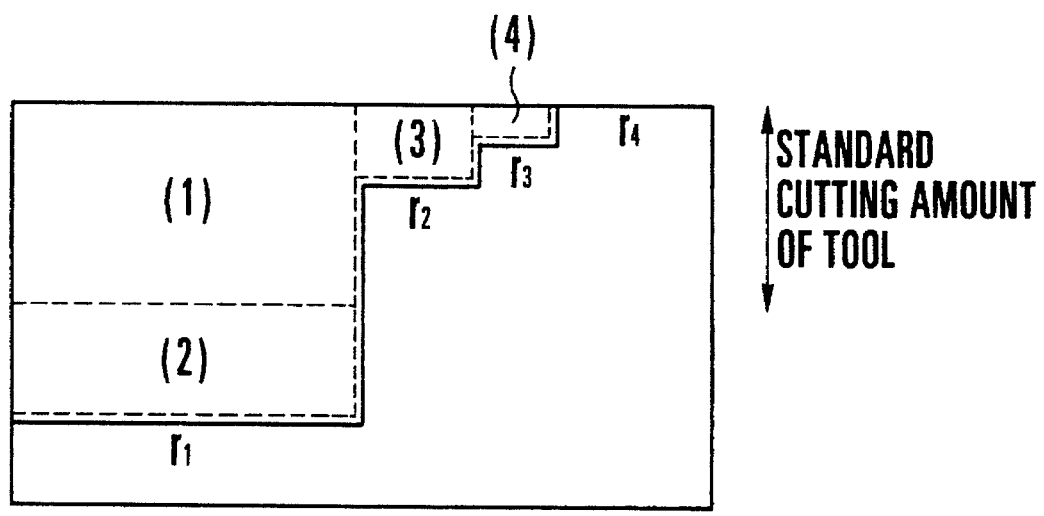

FIGS. 53(a), 53(b), 54(a) and 54(b) show the tree structure of the machining area information and machining procedures. FIGS. 53(a) shows the machining area search (or lookup) tree to be used' in machining a work to be machined as shown in FIG. 53(b). In FIG. 53(a), reference symbol f1 denotes the machining area information R(0,1) which is composed of the areas r1, r2 and r3. This information is prepared at the step 702 of FIG. 47 to include only the machining object area and no cutting information. Therefore, no tool path data is prepared for this information. Reference symbol f2 denotes machining area information R(1,1) which is prepared at the step S706 of FIG. 47 for an area machinable at the standard cutting amount of the tool and is composed of the area r1. Symbols f3, f4 and f5 denote machining area information for areas to be machined at cutting amounts which are smaller than the standard cutting amount of the tool. The symbol f3 denotes machining area information A(2,1) which is composed of the area r1. The symbol f4 denotes machining area information A(1,1) which is composed of the area r2. The symbol f5 denotes machining area information A(1,2) which is composed of the area r3. These units of information are prepared at the step S907 of FIG. 50.

According to the machining area search tree of FIG. 53(a), the machining area information for areas machinable at the standard cutting amount of the tool takes precedence. The machining area information R(0,1) is processed taking precedence over the machining area information R(1,1). In a case where there are a plurality of units of machining area information on areas to be machined at cutting amounts smaller than the standard cutting amount of the tool, the machining area information on an area having a lower cutting height takes precedence. Between the machining area information units A(1,1) and A(1,2) which are children of the machining area information R(0,1), the machining area information A(1,1) is processed prior to the information A(1,2). Tool path data is prepared for each units of machining area information by tracing the parts (1) to (8) of the machining area search tree in sequence from the part (1) to the part (8). Then, as shown in FIG. 53(b), machining is carried out form the part (1) to the part (4) in accordance with the tool path data thus prepared. In this instance, no tool path is prepared for any machining area information for which the tool path data is once prepared.

Figure 54A:
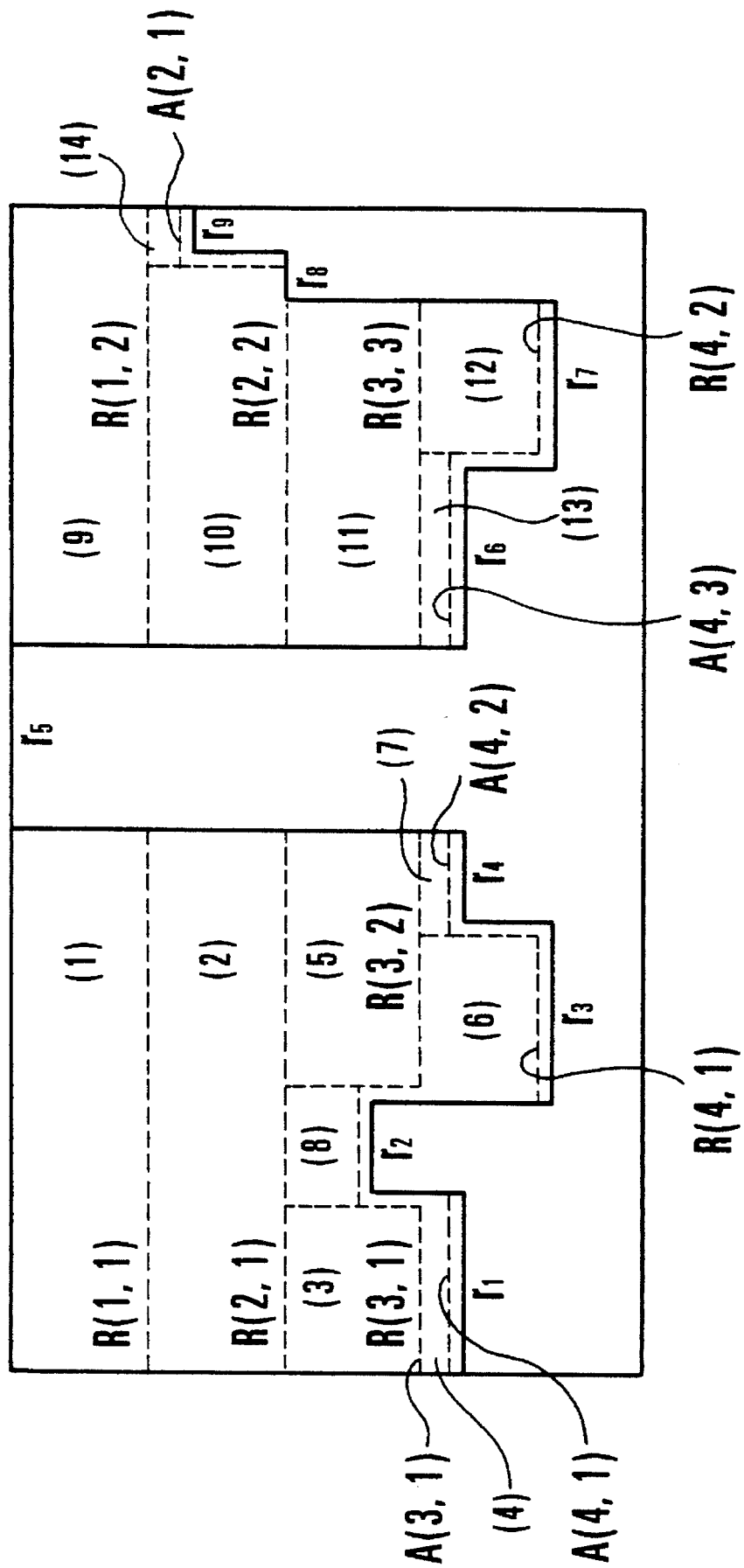
FIGS. 54(a) and 54(b) show the tree structure of machining area information obtained in a case where a cutting part which is shown in FIGS. 39(a) to 39(c) divides into a plurality of parts.
Figure 54B:
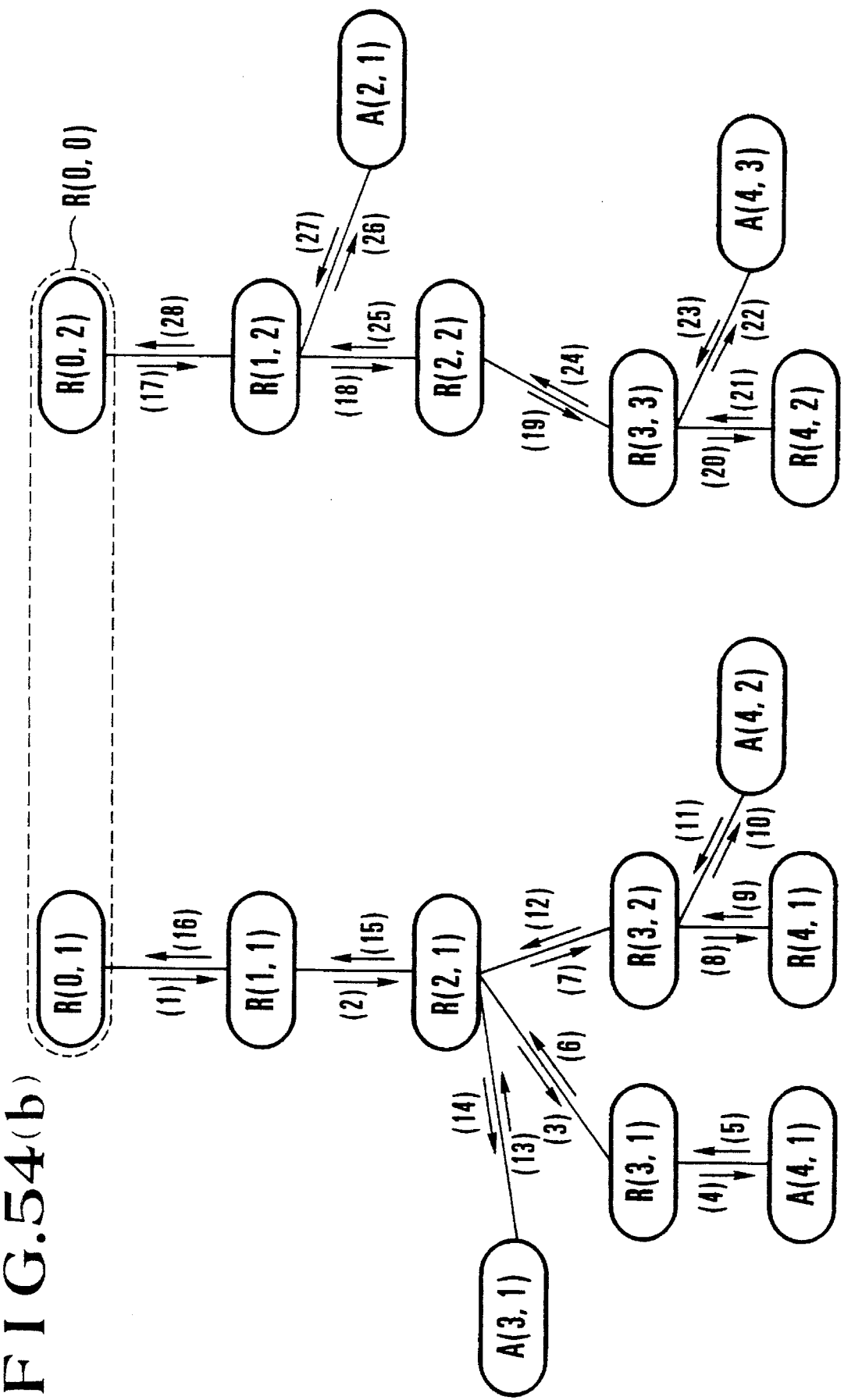

FIGS. 54(a) and 54(b) show by way of example a tree structure of machining area information prepared in a case where a cutting part divides into a plurality of parts as shown in FIG. 39. Even with the cutting part dividing into a plurality of parts according to different cutting heights, the units of the machining information can be interconnected by the tree structure. Therefore, the cutting part can be machined by tracing the parts (1) to (28) of the machining area search tree in sequence from the part (1) to the part (28) as shown in FIG. 54(b).

According to the arrangement of the example of improvement described, the work is machined by setting areas which can be machined at the standard cutting amounts of tools and areas to be machined at cutting amounts smaller than the standard cutting amounts. The arrangement permits machining the work by fully utilizing the performance of the tools, so that the efficiency of machining can be greatly enhanced.

Two examples of improvement have been described above in addition to the embodiment of this invention. While the advantages of this invention can be enhanced by an individual application of each of the two improvements, a combined application of them further enhances the advantages.

What is claimed is:

1. A data preparation device for preparation of data to be used in machining a work, comprising:

input means for inputting at least a machining target shape of said work;

first shape preparation means for preparing a relief shape for machining said work by expanding the machining target shape inputted by said input means;

second shape preparation means for preparing a first interference critical shape for the purpose of avoiding interference of a cutting edge;

machining area preparation means for preparing a machining area on the basis of the relief shape and the interference critical shape which are respectively prepared by said first and second shape preparation means; and third shape preparation means for preparing a second interference critical shape for the purpose of avoiding interference of tool parts other than the cutting edge, said machining area preparation means being arranged to prepare a machining area on the basis of the relief shape, the interference critical shape and the shank interference critical shape prepared respectively by said first, second and third shape preparation means.

2. A device according to claim 1, further comprising:

tool center locus preparation means for preparing a tool center locus on the basis of the machining area prepared by said machining area preparation means;

contour cutting path preparation means for preparing a contour cutting path on the basis of the tool center locus prepared by said tool center locus preparation means;

fill-out cutting area preparation means for preparing a fill-out cutting area on the basis of the tool center locus prepared by said tool center locus preparation means;

fill-out cutting path preparation means for preparing a fill-out cutting path on the basis of the fill-out cutting area prepared by said fill-out cutting area preparation means;

tool path data preparation means for preparing tool path data on the basis of the contour cutting path and the fill-out cutting path prepared respectively by said contour cutting path preparation means and said fill-out cutting path preparation means; and composite tool path data preparation means for preparing composite tool path data by combining tool path data which are prepared by said tool path data preparation means and which correspond to tool center loci.

3. A device according to claim 2, further comprising leftover uncut area preparation means for preparing a leftover uncut area on the basis of the machining area and the contour cutting path prepared respectively by said machining area preparation means and said contour cutting path preparation means.

4. A device according to claim 2, wherein said tool path data preparation means includes:

standard cutting area setting means for setting areas to be machined by cutting at a standard cutting amount of tool; and nonstandard cutting area setting means for setting areas to be machined by cutting at a cutting amount smaller than the standard cutting amount of tool.

5. A device according to claim 4, wherein said tool path data preparation means further includes:

selection means for selecting areas which are machinable at a cutting height corresponding to the standard cutting areas set by said standard cutting area setting means;

grouping means for grouping on the basis of a neighboring relation the areas selected by said selection means;

center locus preparation means for preparing a tool center locus for every group of areas grouped by said grouping means;

closed area preparation means for preparing a closed area by enlarging, as much as a tool radius, the tool center locus prepared by said center locus preparation means; and machining area information preparation means for preparing machining area information composed of information on cutting heights, cutting ranges, machining areas and a parent-child relationship by preparing areas having parts in common with the closed area prepared by said closed area preparation means.

6. A device according to claim 2 or 4, wherein said tool path data preparation means includes:

storage means for storing a contour graphic form to be used for machining the contour of a machining area;

offset means for causing each of line segments composing the contour graphic form stored by said storage means to be offset inwardly on the inner side of the contour graphic form as much as the radius of a tool for the purpose of preparing a tool center path for contour machining; and connection means for interconnecting, in a case where any adjacent offset line segments are parted from each other among offset line segments offset by said offset means, the parted adjacent offset line segments by line segment in such a way as to cause the tool to move away temporarily from an angular part of the contour graphic form and to again come into contact with the contour graphic form.

7. A day Lee according to claim 2 or 4, wherein said tool path data preparation means includes:

storage means for storing a contour graphic form to be used for machining the contour of a machining area;

first offset means for causing each of line segments composing the contour graphic form stored by said storage means to be offset inwardly on the inner side of the contour graphic form as much as the radius of a tool for the purpose of preparing tool center path data for contour machining;

first connection means for interconnecting, in a case where any adjacent offset line segments are parted from each other among offset line segments offset by said first offset means, the parted adjacent offset line segments by a line segment in such a way as to cause the tool to move away temporarily from an angular part of the contour graphic form and to again come into contact with the contour graphic form;

second offset means for causing line segments which are interconnected to compose a graphic form by said first connection means to be offset outwardly on the outer side of the graphic form as much as the radius of the tool for the purpose of preparing tool path data for contour machining; and second connection means for interconnecting, in a case where any adjacent offset line segments are parted from each other among offset line segments offset by said second offset means, the parted adjacent offset line segments.

8. A device according to claim 2 or 4, wherein said tool path data preparation means includes:

storage means for storing a contour graphic form to be used for machining the contour of a machining area;

first graphic form preparation means for preparing a first graphic form by causing line segments which compose the contour graphic form stored by said storage means to be offset inwardly on the inner side of the contour graphic form as much as the radius of a tool;

second graphic form preparation means for preparing a second graphic form by causing line segments which compose the first graphic form prepared by said first graphic form preparation means to be offset outwardly on the outer side of the first graphic form as much as the radius of the tool;

third graphic form preparation means for preparing a third graphic form by causing line segments which compose the second graphic form prepared by said second graphic form preparation means to be offset inward on the inner side of the second graphic form as much as the radius of the tool, the third graphic form being prepared for the purpose of preparing tool center path data for contour machining; and fourth graphic form preparation means for preparing a fourth graphic form by causing line segments which compose the third graphic form prepared by said third graphic form preparation means to be offset outward on the outer side of the third graphic form as much as the radius of the tool, the fourth graphic form being prepared for the purpose of preparing tool path data for contour machining.

9. A tool path data preparation device for preparing tool path data on the basis of set machining areas, comprising:

standard cutting area setting means for setting a cutting area to be cut at a standard cutting amount of tool;

nonstandard cutting area setting means for setting a cutting area to be cut at a cutting amount which is smaller than the standard cutting amount of tool;

selection means for selecting areas machinable at a cutting height corresponding to the standard cutting areas set by said standard cutting area setting means;

grouping means for grouping on the basis of a neighboring relation the areas selected by said selection means;

center locus preparation means for preparing a tool center locus for every group of areas grouped by said grouping means;

closed area preparation means for preparing a closed area by enlarging, as much as the radius of a tool, the tool center locus prepared by said center locus preparation means; and machining area information preparation means for preparing machining area information composed of information on cutting heights, cutting ranges, machining areas and a parent-child relationship by preparing areas having parts in common with the closed area prepared by said closed area preparation means.

10. A tool path data preparation device comprising:

storage means for storing a contour graphic form to be used for machining the contour of a machining area;

offset means for causing line segments composing the contour graphic form stored by said storage means to be offset inwardly on the inner side of the contour graphic form as much as the radius of a tool for the purpose of preparing a tool center path for contour machining; and connection means for interconnecting, in a case where any adjacent offset line segments are parted from each other among offset line segments offset by said offset means, the parted adjacent offset line segments by a line segment in such a way as to cause the tool to move away temporarily from an angular part of the contour graphic form and to again come into contact with the contour graphic form.

11. A tool path data preparation device comprising:

storage means for storing a contour graphic form to be used for machining the contour of a machining area;

first offset means for causing each of offset line segments composing the contour graphic form stored by said storage means to be offset inwardly on the inner side of the contour graphic form as much as the radius of a tool for the purpose of preparing tool center path data for contour machining;

first connection means for interconnecting, in a case where any adjacent offset line segments are parted from each other among offset line segments offset by said offset means, the parted adjacent offset line segments by a line segment in such a way as to cause the tool to move away temporarily from an angular part of the contour graphic form and to again come into contact with the contour graphic form:

second offset means for causing each of line segments which are interconnected to compose a graphic form by said first connection means to be offset outwardly on the outer side of the graphic form as much as the radius of the tool for the purpose of preparing tool path data for contour machining; and second connection means for interconnecting, in a case where any adjacent offset line segments are parted from each other among offset line segments offset by said second offset means, the parted adjacent offset line segments.

12. A tool path data preparation device comprising:

storage means for storing a contour graphic form to be used for machining the contour of a machining area;

first graphic form preparation means for preparing a first graphic form by causing line segments composing the contour graphic form stored by said storage means to be offset inwardly on the inner side of the contour graphic form as much as the radius of a tool;

second graphic form preparation means for preparing a second graphic form by causing line segments composing the first graphic form prepared by said first graphic form preparation means to be offset outwardly on the outer side of the first graphic form as much as the radius of the tool;

third graphic form preparation means for preparing a third graphic form by causing line segments composing the second graphic form prepared by said second graphic form preparation means to be offset inwardly on the inner side of the second graphic form as much as the radius of the tool, the third graphic form being prepared for the purpose of preparing tool center path data for contour machining; and fourth graphic form preparation means for preparing a fourth graphic form by causing line segments which compose the third graphic form prepared by said third graphic form preparation means to be offset outward on the outer side of the third graphic form as much as the radius of the tool, the fourth graphic form being prepared for the purpose of preparing tool path data for contour machining.

13. A method of preparation of data for machining a work on the basis of information inputted from input means comprising:

a step of inputting a machining target shape and machining information including at least a machining height;

a step of preparing a relief shape for machining said work by expanding the machining target shape inputted;

a step of preparing a first interference critical shape for the purpose of avoiding interference of a cutting edge;

a step of preparing a machining area on the basis of the relief shape and the interference critical shape prepared; and a step of preparing a second interference critical shape for the purpose of avoiding interference of tool parts other than the cutting edge, said machining area preparing step being arranged to prepare the machining area on the basis of the relief shape, the interference critical shape and the shank interference critical shape prepared.

* * * * *

UNITED STATES PATENT AND TRADEMARK OFFICE
CERTIFICATE OF CORRECTION

PATENT NO. : 5,526,272
DATED : June 11, 1996
INVENTOR(S) : Satoshi Kondo, et al.

It is certified that error appears in the above-indentified patent and that said Letters Patent is hereby corrected as shown below:

Col. 3, line 29, change "Fig. 25" to -- FIGS. 25A and 25B --.

Col. 11, line 65, change "FIG. 25" to -- FIGS. 25A and 25B --.

Col. 16, line 25, change "Of" to -- of --.

Col. 28, line 17, change "day Lee" to -- device --.

Signed and Sealed this

Thirty-first Day of December, 1996

Attest:

BRUCE LEHMAN

*Attesting Officer*  *Commissioner of Patents and Trademarks*